United States Patent [19]

Cheng et al.

[11] Patent Number: 5,731,965
[45] Date of Patent: Mar. 24, 1998

[54] POWER LINE HARMONIC REDUCTION BY HYBRID PARALLEL ACTIVE/PASSIVE FILTER SYSTEM WITH SQUARE WAVE INVERTER AND DC BUS CONTROL

[75] Inventors: Po-Tai Cheng; Subhashish Bhattacharya; Deepakraj M. Divan, all of Madison, Wis.

[73] Assignee: Wisconsin Alumni Research Foundation, Madison, Wis.

[21] Appl. No.: 669,010

[22] Filed: Jun. 21, 1996

[51] Int. Cl.⁶ .................... H02M 1/12; H02M 1/14
[52] U.S. Cl. ................... 363/41; 363/40; 307/105
[58] Field of Search .................. 307/105; 327/552; 363/40, 41

[56] References Cited

U.S. PATENT DOCUMENTS

| | | |
|---|---|---|
| 4,053,820 | 10/1977 | Peterson et al. |
| 5,198,746 | 3/1993 | Gyugyi et al. |
| 5,329,222 | 7/1994 | Gyugyi et al. |
| 5,355,025 | 10/1994 | Moran et al. |
| 5,465,203 | 11/1995 | Bhattacharya et al. |
| 5,513,090 | 4/1996 | Bhattacharya et al. |
| 5,548,165 | 8/1996 | Mohan et al. .......... 363/39 |
| 5,567,994 | 10/1996 | Davis et al. .......... 363/41 |
| 5,614,770 | 3/1997 | Suelzle .......... 307/105 |

OTHER PUBLICATIONS

L. Gyugyi & E.C. Strycula, "Active AC Power Filters", IEEE-IAS Conf. Rec., pp. 529-535, 1976.

N. Mohan, et al., "Active Filters for AC Harmonic Suppresion", IEEE/PES Winter Power Meeting, pp. 168-174, 1977.

I. Takahashi & A. Nabae, "Universal Power Distortion Compensator of Line Commutated Thyristor Converter", Proc. IEEE/IAS Annu. Meeting, pp. 858-864, 1980.

Hirofumi Akagi, et al., "Instantaneous Reactive Power Compensators Comprising Switching Devices without Energy Storage Components", IEEE Trans. Indus. App., vol. IA-20, No. 3, pp. 625-630, 1984.

D.M. Divan, "Non Dissipative Switched Networks for High Power Applications", Electronics Letters, vol. 20, No. 7, pp. 277-279, Mar. 1984.

F.Z. Peng, et al., "A New Approach to Harmonic Compensation in Power Systems", IEEE-IAS Conf. Rec., pp. 874-880, 1988.

Hideaki Fujita & Hirofumi Akagi, "A Practical Approach to Harmonic Compensation in Power Systems—Series Connection of Passive and Active Filters—", IEEE-IAS Conf. Rec., pp. 1107-1112, 1990.

(List continued on next page.)

*Primary Examiner*—Stuart N. Hecker
*Attorney, Agent, or Firm*—Foley & Lardner

[57] ABSTRACT

A hybrid parallel active/passive filter system is provided which provides line power harmonic isolation and compensation for power systems connected to high power non-linear loads. The hybrid filter includes a passive filter connected in series with an active filter inverter. The active filter inverter is controlled to generate inverter voltages such that the filter terminal voltage tracks the supply voltage harmonics at a selected dominant harmonic frequency to regulate the supply current harmonics to zero. A synchronous reference frame (SRF) based controller is used to generate harmonic inverter voltage commands based on measured supply current values. A feed forward command signal generator may be used to improve the response of the control system. The active filter inverter is preferably implemented as a square-wave inverter. The active filter inverter DC bus is controlled to achieve power balancing and to provide real power to compensate for losses of the inverter. Power balancing is achieved by exchanging energy at the fundamental and dominant harmonic frequency of the active filter inverter. Control of the active filter inverter to achieve DC bus control and harmonic isolation simultaneously is accomplished using DC bus control inverter voltage command signals generated at the fundamental frequency in combination with harmonic inverter voltage command carrier signals at the dominant harmonic frequency to form low frequency switching signals for the square-wave inverter switching devices.

54 Claims, 38 Drawing Sheets

OTHER PUBLICATIONS

N. Balbo, et al., "Hybrid Active Filter for Parallel Harmonic Compensation".

Isao Takahashi, et al., "Low Price and High Power Active Filter", IEEE Japan National Convention, pp. E95–E98, 1991.

S. Bhattacharya, et al., "Synchronous Frame Harmonic Isolator Using Active Series Filter", EPE' 91 Conf. Rec., vol. 3, pp. 30–35, Florence, 1991.

S. Bhattacharya, "A Unified Power Flow Control to Flexible AC Transmission Systems", ECE 714 Project Report, Univ. of Wisconsin—Madison, May 1992.

Hirohito Funato & Atsuo Kawamura, "Proposal of Variable Active–Passive Reactance", IEEE IECON Conf. Rec., vol. 1, pp. 381–388, 1992.

Hirohito Funato & Atsuo Kawamura, "Analysis of Variable Active–Passive Reactance", IEEE PCC Conf. Rec., pp. 647–652, 1993.

S. Bhattacharya, et al., "Control and Reduction of Terminal Voltage Total Harmonic Distortion (THD) in a Hybrid Series Active and Parallel Passive Filter System", IEEE PESC Conf.Rec., pp. 779–786, 1993.

Hirohito Funato & Atsuo Kawamura, "Control of Variable Active–Passive Reactance (VAPAR) and Negative Inductance", IEEE PESC Conf., Rec., pp. 189–196, 1994.

H. Akagi, "New Trends in Active Filter", EPE '91 Conf. Rec., vol. 0, pp. 017–026, 1995.

Mukul Rastogi, et al., "Hybrid–Active Filtering of Harmonic Currents in Power Systems", presented at the 1995 IEE/PES Winter Meeting, New York, Jan. 29–Feb. 2, 1995.

Ned Mohan & Girish R. Kamath, "A Novel, Per–Phase Interface of Power Electronic Apparatus for Power System Applications", presented at NAPS 95, Bozeman, Montana, 1995.

J. Hafner, et al., "A Combined System of a Passive Filter and a Shunt Active Power Filter to Reduce Line Current Harmonics", Proc. 1995 IPEC, Yokohama, Japan, pp. 388–393, 1995.

S. Bhattacharya, et al., "Optimizing Three Phase Current Regulators for Low Inductance Loads", IEEE–IAS Conf. Rec., pp. 2357–2364, 1995.

Subhashish Bhattacharya & Deepak Divan, "Synchronous Frame Based Controller Implementation for a Hybrid Series Active Filter System", IEEE–IAS Con. Rec., pp. 2531–2540, 1995.

S. Bhattacharya, et al., "Active Filter Solutions for Utility Interface", IEEE–ISIE Conf. Rec., pp. 53–63, 1995.

Subhashish Bhattacharya & Deepak Divan, "Design and Implementation of a Hybrid Series Active Filter System", IEE PESC Conf. Rec., pp. 189–195, 1995.

$F_q^s = F_a$ $F_d^s = \frac{-1}{\sqrt{3}} F_a - \frac{2}{\sqrt{3}} F_b$ $\begin{vmatrix} F_q^e \\ F_d^e \end{vmatrix} = \begin{vmatrix} \cos\theta & -\sin\theta \\ \sin\theta & \cos\theta \end{vmatrix} \begin{vmatrix} F_q^s \\ F_d^s \end{vmatrix}$

VECTOR ROTATION EQUATIONS $\hat{F}_{qd} = \varepsilon^{-j\theta} \hat{F}_{qd}^s$ WHERE $\hat{F}_{qd} = F_q - jF_d$ $\hat{F}_{qd}^s = F_q^s - jF_d^s$ $$\begin{vmatrix} F_q^s \\ F_d^s \end{vmatrix} = \begin{vmatrix} \cos\theta & \sin\theta \\ -\sin\theta & \cos\theta \end{vmatrix} \begin{vmatrix} F_q \\ F_d \end{vmatrix}$$

$$F_a = F_q$$
$$F_b = \frac{-1}{2}F_q - \frac{3}{2}F_d$$
$$F_c = -F_a - F_b$$

VECTOR ROTATION $$\hat{F}_{qd}^s = \varepsilon^{j\theta}\hat{F}_{qd}$$

WHERE $$\hat{F}_{qd} = F_q - jF_d$$

$$\hat{F}_{qd}^s = F_q^s - jF_d^s$$

POWER LINE HARMONIC REDUCTION BY HYBRID PARALLEL ACTIVE/PASSIVE FILTER SYSTEM WITH SQUARE WAVE INVERTER AND DC BUS CONTROL

FIELD OF THE INVENTION

This invention pertains generally to power conditioning devices and methods for reducing terminal voltage and supply current harmonic distortion, and more particularly to hybrid parallel active/passive filter systems employing inverters for harmonic compensation of large non-linear loads and harmonic isolation in the presence of supply voltage harmonic distortion, and methods for controlling the filter inverter to achieve inverter DC bus control.

BACKGROUND OF THE INVENTION

The proliferation of certain power electronic loads, such as three phase diode and thyristor bridge inverters used in DC power supplies, adjustable speed drives (ASDs), and Uninterruptible Power Supplies (UPS), has brought power utilities to a crossroad. These non-linear loads cause harmonic distortion in the power supply lines, such as by injecting harmonic current into the power system, that generates transient and spurious frequencies in the power signal. Thus, utilities frequently encounter harmonic related problems, including substantially higher transformer and line losses. The harmonic current injected into the power system by these non-linear loads cause harmonic related problems that can require derating of distribution system equipment such as transformers. Harmonic currents can also result in severe harmonic interactions and resonance problems between harmonic loads or between the utility system and the load. Harmonic currents also reduce system stability and safe operating margins. To alleviate harmonic related problems, utilities are beginning to implement and enforce recommended harmonic standards, such as IEEE 519, to limit harmonic pollution from degrading the power quality of the utility grid. IEEE 519 is a customer-utility point of common coupling (PCC) specification.

Passive filters, composed of passive capacitors and inductors, have traditionally been used to absorb harmonic distortion generated by large industrial loads. Passive filters can provide harmonic filtering at the load, i.e., at the source of harmonics, to reduce harmonic current at the power lines, and/or they can be installed at power distribution substations, to provide both harmonic filtering and reactive power compensation for the entire power system substation load. Installation at power distribution substations has the advantage of one point installation, but results in higher voltage distortion. Passive filters are favored because of their low cost and high efficiency. However, they have several drawbacks. Passive filters are highly susceptible to undesirable series and parallel resonances with the supply and load, respectively. Passive filters are also susceptible to load and line switching transients. Most significantly, passive filters are sensitive to L-C component tolerances and utility system impedance variations. Since the L-C components which form the passive filter have typically ±10% L and C component tolerances, passive filters are usually mis-tuned, which defeats their very purpose as harmonic sinks. Power supply system impedances also strongly influence the compensation characteristics of passive filters. It is particularly difficult to design passive filters, with sharp tuning and high quality (Q) factors to absorb a significant percentage of load harmonic currents, for industrial non-linear loads connected to stiff utility power supplies. Stiff utility power supplies are characterized by low supply inductances, requiring a passive filter with a lower impedance than the supply to sink a significant portion of load harmonic currents. Hence, the effectiveness of passive filters reduces for stiff power supply systems. Tuned passive filters are also susceptible to being overloaded due to ambient harmonic loads and/or supply voltage distortions. Thus, passive filters are often intentionally off-tuned to avoid being overloaded due to ambient harmonic loads, supply voltage distortions, and resonance problems. It is apparent that effective passive filter design requires extensive system studies and engineering effort. These efforts are typically justified only for high voltage transmission systems, for which detailed system studies are invariably done, and for which engineering cost is only a small fraction of the total system cost.

Active filters were developed to mitigate the drawbacks of passive filters. Active filters typically employ an inverter, connected in series or parallel with the power supply lines, to provide the harmonic filtering function. The optimal active filter solution is application and utility interface specific, and hence requires a systems approach to its design. For example, parallel active filters usually require an inverter with a large kVA rating and high bandwidth, and hence do not constitute a cost-effective harmonic filtering solution for non-linear loads above 1 MVA due to their large rating requirement.

Harmonic filtering may be accomplished using active filters alone, such as active filters connected in parallel or series between the power supply and the load, or in combination with passive filters. A harmonic filtering solution employing both active and passive filters is known as a hybrid active filter solution. Hybrid active filters effectively mitigate the drawbacks of both active and passive filters alone, and offer the possibility of several additional value-added features, which increase their practical viability. The value added features of hybrid active filters include line voltage regulation, reactive power compensation, and harmonic isolation. A hybrid active filter may be employed to perform any of these functions besides, or simultaneously with, harmonic compensation. More detailed descriptions of hybrid active filters, including descriptions of the use of hybrid active filters to perform the value added features mentioned, may be found in: I. Takahashi & A. Nabae, "Universal Power Distortion Compensator of Line Commutated Thyristor Converter", Proc. IEEE/IAS Annu. Meeting, pp. 858–864, 1980; F. Z. Peng, et al., "A New Approach to Harmonic Compensation in Power Systems", IEEE-IAS Conf. Record, 1988, pp. 874–880; Hideaki Fujita and Hirofumi Akagi, "A Practical Approach to Harmonic Compensation in Power Systems—Series Connection of Passive and Active Filters", IEEE-IAS Conf. Record, 1990, pp. 1107–1112; Isao Takahashi, et al., "Low Price and High Power Active Filter", IEE/IAS National Convention, Japan, 1991, pp. E95–E98; D. M. Divan, "Non Dissipative Switched Networks for High Power Applications", Electronics Letters, vol. 20, no. 7, pp. 277–279, March 1984; Hirohito Funato & Atsuo Kawamura, "Proposal of Variable Active-Passive Reactance", IEEE IECON Conf. Record, 1992, vol. 1, pp. 381–388; Hirohito Funato & Atsuo Kawamura, "Analysis of Variable Active-Passive Reactance", IEEE PCC Conf. Record, Yokohama, 1993, pp. 647–652; Hirohito Funato & Atsuo Kawamura, "Control of Variable Active-Passive Reactance (VAPAR) and Negative Inductance", IEEE PESC Conf. Record, 1994, pp. 189–196; U.S. Pat. No. 5,198,746 to L. Gyugyi, et al., entitled "Transmission Line Dynamic Impedance Compensation System";

and U.S. Pat. No. 5,465,203 to Bhattacharya, et al., entitled "Hybrid Series Active/Parallel Passive Power Line Conditioner with Controlled Harmonic Injection."

Increasing enforcement of harmonic standards; such as IEEE 519, by utilities, especially for large industrial customers, has perpetrated the need for cost-effective hybrid active filters. As a result, viable and cost-effective hybrid active filter topologies have been developed which use small rated active filters (rated at <5% of load power) in combination with passive filters. Hybrid active filters may be connected so that the passive portion of the hybrid filter is connected in parallel with the load, with the active portion of the filter connected in series or parallel with the load, or with the passive and active filters connected together in series, with the series combination of active and passive filters connected in parallel with the load. Hybrid active filters improve the compensation characteristics of the passive filters, making possible a reduction in the active filter rating. However, hybrid filters typically include active filters that are implemented using high switching frequency PWM inverters to achieve either harmonic compensation or harmonic isolation. Filters using such inverters are generally limited to medium power non-linear loads due to the large switching losses associated with the high frequency inverter. Moreover, it is difficult to construct high power and high switching frequency inverters. The devices used to implement such an inverter will be expensive.

An example of a hybrid active/passive filter system employing a square-wave active filter inverter is described in Isao Takahashi, et al., "Low Price and High Power Active Filter", IEEE/IAS Japan National Convention, pp. E95–E98, 1991. In this hybrid filter system, a square wave inverter is connected in series with a passive L-C filter tuned to a dominant (5th or 7th) harmonic frequency. The series connected active/passive filter is connected in parallel with the load. The use of a simple square wave inverter allows the hybrid filter to be employed in high power applications. The active filter inverter is controlled to cancel the voltage drop of the internal resistance of the passive L-C filter. The active/passive filter combination thus achieves a near infinite quality factor Q at the selected dominant harmonic frequency. Harmonic voltage components are thereby eliminated by controlling the active filter inverter based on measured filter terminal voltages. This method of inverter control has several limitations. This method assumes that the passive filter is perfectly tuned. The elimination of the passive filter impedance at dominant harmonic frequencies may require the simulation of a negative resistance by the active filter. This requires real power flow out of the active filter inverter, thus, a DC power source is required. The strategy of controlling the active filter inverter to achieve an infinite quality factor enhances system resonances. Also, this method of active filter control is highly susceptible to supply voltage harmonics and to sustained oscillations due to load/supply transients. The control strategy presented in Takahashi, et al. will not successfully control the active filter inverter to meet IEEE 519 harmonic standards in the presence of supply voltage harmonics. This is because it is the load voltage harmonics, rather than supply current harmonics, that are regulated to zero by this control strategy. Thus, the effectiveness of this active filter system is limited under certain supply, passive filter, and load conditions.

Active filter inverters used in hybrid active/passive filter systems include a DC bus, across which a DC voltage is maintained, from which the active filter inverter signal is synthesized by control of the inverter switching devices. The inverter switching devices may be controlled to provide both the active filter harmonic isolation/compensation function, and to maintain the DC bus voltage. In parallel active filter systems, and other hybrid active filter systems such as hybrid series active filter systems, the DC bus voltage is maintained by controlling the inverter to generate either a fundamental frequency current in phase with the fundamental frequency voltage across the active filter inverter, or by generating a fundamental frequency voltage output by the active filter inverter in phase with the fundamental frequency current through the active filter inverter. This provides the required real power to compensate for the losses of the inverter. Hence, in parallel active filters and other hybrid active filter systems, real power flow occurs only at the fundamental frequency. The hybrid filter system given in Takahashi, et al., as described above, requires a DC energy storage device or additional power supply for the inverter DC bus, to support the real power flow out of the inverter, because there isn't any other power balancing mechanism in the system.

Control of active filter inverters in hybrid active filter systems is often accomplished using a synchronous reference frame (SRF) based controller. An SRF based controller receives measured voltages or currents in the three phase a-b-c reference frame as inputs, and transforms the three phase quantities into a synchronously rotating two phase d-q reference frame. Inverter control signals are initially generated from the measured quantities in the two phase synchronous reference frame, and then converted back to the three phase reference frame to be applied to control the inverter.

The transformation from a three phase reference frame to a synchronously rotating two phase reference frame is illustrated in FIG. 1. For exemplification purposes, the three phase quantities may be three phase currents $i_b$ and $i_c$. The transformation of the three phase currents $i_a$, $i_b$, and $i_c$ into synchronously rotating two phase currents $i^e_q$ and $i^e_d$ is a two step process. First, the three phase currents are transformed to a two phase ds-qs reference frame that is stationary with respect to the three phase system. This three phase to two phase stationary transformation is equivalent to a set of linear equations with constant coefficients, as shown in FIG. 1. The two phase stationary currents $i^s_q$ and $i^s_d$ are vectors that are 90° out of phase with each other. This three phase to stationary two phase transformation may be accomplished by a conventional three phase to two phase transformation device 20 which executes the following equation:

$$\begin{bmatrix} i_q^s \\ i_d^s \end{bmatrix} = k_1 \begin{bmatrix} 1 & -1/2 & -1/2 \\ 0 & -\sqrt{3}/2 & \sqrt{3}/2 \end{bmatrix} \begin{bmatrix} i_a \\ i_b \\ i_c \end{bmatrix}, \quad (1)$$

where $k_1$ is a constant equal to $\sqrt{(2/3)}$. The second step of the three phase to two phase synchronous reference frame transformation is the transformation of the stationary two phase reference frame quantities ds and qs into synchronous rotating reference frame quantities de and qe. This stationary to rotating transformation 21 is achieved by multiplying the stationary reference frame values ds and qs by unit vectors cosθ and sinθ. Transformation from the stationary to rotating two phase reference frame is accomplished by execution of the following equation:

$$\begin{bmatrix} i_q^e \\ i_d^e \end{bmatrix} = \begin{bmatrix} \cos\theta_n & -\sin\theta_n \\ \sin\theta_n & \cos\theta_n \end{bmatrix} \begin{bmatrix} i_q^s \\ i_d^s \end{bmatrix}. \quad (2)$$

The rotation transformation is often referred to as a "vector rotation", since the d-q quantities can be combined as a vector. The transformation then amounts to the rotation of one vector with respect to another. FIG. 1 includes the vector rotation equations.

The unit vectors cosθ and sinθ are obtained from a phase-locked loop (PLL). An exemplary prior art PLL is illustrated at 22 in FIG. 2. The PLL obtains an instantaneous vector sum of (for example) the three phase input voltages ($V_{ia}$, $V_{ib}$ and $V_{ic}$) by using a three-to-two phase transformation 23 that generates signals $V_{di}$ and $V_{qi}$ in the synchronously rotating two phase reference frame. These signals are conveyed to a phase detector 24. The phase detector output may be defined as:

$$\sin(\text{phase error}) = V_{di} \cos\theta - V_{qi} \sin\theta \quad (3)$$

In Equation 3, sinθ and cosθ are the values presently pointed to in a look-up table 25. The phase detector 24 output is processed by a proportional plus integral (PI) controller 26 that provides fast response and zero steady-state tracking error. The PI controller 26 is used to determine the count parameter of a timer or digital oscillator 27. The timer count value is decremented from the count parameter value at a constant rate, when zero is reached, the sinθ and cosθ pointers in the look-up table 25 are incremented. Since this is a closed-loop system, the count parameter value is either increased or decreased, depending on the PI controller 26 output, so as to reduce the phase error until a phase-locked condition is achieved.

The transformation from a synchronously rotating two phase de-qe reference frame to a three phase a-b-c reference frame is illustrated in FIG. 3. A rotating to stationary transformation 28 first transforms rotating two phase quantities, for example, voltages $V_d^e$ and $V_q^e$, to stationary two phase values using the equation:

$$\begin{bmatrix} V_q^s \\ V_d^s \end{bmatrix} = \begin{bmatrix} \cos\theta_n & \sin\theta_n \\ -\sin\theta_n & \cos\theta_n \end{bmatrix} \begin{bmatrix} V_q^e \\ V_d^e \end{bmatrix} \quad (4)$$

where cosθ and sinθ are derived from a PLL. The resulting stationary two phase values $V_d^s$ and $V_q^s$ are then transformed by a two phase to three phase transformation 29 to three phase voltage quantities using:

$$\begin{bmatrix} V_a \\ V_b \\ V_c \end{bmatrix} = k_1 \begin{bmatrix} 1 & 0 \\ -1/2 & -\sqrt{3}/2 \\ -1/2 & \sqrt{3}/2 \end{bmatrix} \begin{bmatrix} V_q^s \\ V_d^s \end{bmatrix}. \quad (5)$$

The vector rotation equations for the two phase to three phase transformations are also presented in FIG. 3.

An exemplary modified SRF based controller for a series active filter in a hybrid filter system is described in Subhashish Bhattacharya, et al., "Control and Reduction of Terminal Voltage Total Harmonic Distortion (THD) in a Hybrid Series Active and Parallel Passive Filter System", IEEE PESC Conf. Record, 1993, pp. 779–786. The functions of an SRF based controller are also discussed in U.S. Pat. No. 5,465,203, mentioned above.

SUMMARY OF THE INVENTION

The present invention provides a hybrid parallel active/passive filter system for supply line harmonic current reduction for high power non-linear loads. The hybrid filter system of the present invention preferably employs a small rated square-wave inverter to implement the active filter. Thus, the present invention is applicable to high power loads in the range of 1–50 MW and higher. The hybrid filter system of the present invention is capable of reducing harmonics in such high power systems to comply with harmonic standards, such as IEEE 519. A hybrid filter system in accordance with the present invention is general, and achieves harmonic isolation in the presence of supply voltage harmonic distortions for selected dominant harmonic frequencies, such as the dominant fifth and seventh harmonics (for six pulse rectifier loads) or dominant eleventh and thirteenth harmonics (for twelve pulse rectifier loads). The present invention is particularly suited for harmonic isolation/compensation of non-linear loads connected to stiff supply systems, for which it is difficult to design passive filters with sharp tuning and high quality factors. In such cases, the active filter employed in the present invention provides tuning of the passive filter by balancing supply side voltage harmonics, and actively steering harmonic currents into the passive filter and out of the utility line. The hybrid filter system of the present invention achieves harmonic isolation under any supply, passive filter, or load conditions, including ambient harmonic load conditions. The filter system of the present invention may also be extended to provide harmonic isolation of dominant AC side line harmonic currents in HVDC applications.

In a hybrid active/passive filter system in accordance with the present invention, an active filter is connected in series with a passive filter. The active filter is preferably implemented using a square-wave inverter. The passive filter is implemented using inductor and capacitor components that are approximately tuned to a selected dominant harmonic frequency, e.g., the fifth or seventh harmonic. The series connected active and passive filters are connected in parallel with the non-linear load. A separate series combination of active/passive filters may be employed for each dominant harmonic frequency for which harmonic isolation/compensation is required. Preferably the capacitance of the passive filters in two parallel connected hybrid filter branches should be approximately equally distributed between the passive filters to minimize circulating currents between the passive filters and the active filter ratings by evenly distributing the fundamental reactive filter current among the two filter branches. Alternatively, harmonic isolation/compensation at multiple harmonic frequencies may be achieved using a single active filter inverter connected in series with separate passive filters, or with a power factor correction capacitor passive filter. In such alternative topologies, the active filter is implemented using a PWM inverter that is controlled to provide harmonic isolation/compensation at multiple selected dominant harmonic frequencies simultaneously.

In accordance with the present invention, the active filter inverter is preferably controlled using a synchronous reference frame (SRF) based controller to achieve harmonic isolation for selected dominant (e.g., fifth and seventh) harmonic load currents in the presence of supply voltage harmonics. The SRF based controller achieves the objective of harmonic isolation by regulating the supply current harmonics at the dominant harmonic frequencies to zero, by controlling the active filter inverter to generate inverter voltages such that the filter terminal voltage, or load voltage, tracks the supply voltage harmonics. The objective of harmonic isolation is thereby achieved by the present invention under any supply, passive filter, or load conditions. In the absence of supply voltage harmonics, the SRF based controller of the present invention controls the active filter inverter to effectively tune the passive filter of the hybrid filter system to provide required harmonic compensation at the selected dominant harmonic frequency. This tuning is also achieved by the SRF based controller regulating the dominant harmonic frequency supply currents to zero. This is contrasted with previously known hybrid parallel active/passive filter systems employing square wave inverters, in which the same end result of tuning the passive filters is achieved by regulating dominant harmonic load voltages to zero.

The SRF based controller of the present invention employs measured source currents to generate harmonic inverter voltage command signals that control the active filter inverter to generate an inverter voltage that tracks the supply voltage harmonics, thereby regulating the dominant supply current harmonics to zero. Measured three-phase supply currents are transformed into two-phase synchronously rotating reference frame signal values at the selected dominant harmonic frequency by a three-phase to two-phase synchronous reference frame transformation device. The three-phase to two-phase SRF transformation employs $\sin\theta_n$ and $\cos\theta_n$ values, at the selected dominant harmonic n, to perform the three phase to synchronously rotating two phase transformation. The $\sin\theta_n$ and $\cos\theta_n$ values may preferably be derived from a phase lock loop (PLL) on the filter terminal voltage waveform and a look-up table of $\sin\theta$ and $\cos\theta$ values. The resulting synchronously rotating two phase supply current signal values are filtered using low pass filters to extract the DC component therefrom. This signal corresponds to the supply current at the selected dominant harmonic frequency. The filtered two phase signals are compared to supply current reference signals, that are preferably set to zero, to form supply current harmonic error signals that are, in turn, provided to proportional-integral (PI) controllers to generate harmonic inverter voltage command signals in the two-phase synchronously rotating reference frame. The two phase harmonic inverter voltage command signals are then transformed, by a two phase to three phase transformation at the selected dominant harmonic frequency, into three phase harmonic inverter voltage command signals which, in turn, are provided to the active filter square wave inverter to control the inverter switches to generate the desired inverter voltage signal at the selected dominant harmonic frequency.

To improve the dynamic response of the hybrid filter system of the present invention, feed forward command signals may be effectively used in the SRF based controller. Feedforward command signals are preferably generated in the two phase synchronously rotating reference frame by a feedforward command generator. Such feedforward command signals may, for example, be based on measured load current and supply voltage values, that are transformed from the three phase reference frame to the synchronously rotating two phase reference frame at the selected dominant harmonic frequency to form feedforward command signals in the two phase reference frame. The feedforward command signals are designed to control the active filter inverter to generate an inverter voltage such that the filter terminal voltage, or load voltage, tracks the source voltage at the selected dominant harmonic frequency. The two phase feedforward command signals are combined with the two phase harmonic inverter voltage command signals before the combined signals are transformed to the three phase reference frame to produce the three phase harmonic inverter voltage command signals.

In accordance with the present invention, the active filter square wave inverter is also preferably controlled to achieve power balancing of the inverter DC bus. Power balancing is achieved by exchanging energy at the fundamental frequency and at a selected dominant harmonic frequency, e.g., at the fifth harmonic for a fifth harmonic active filter. Unlike previously known parallel active and other hybrid active filter systems, in which real power flow occurs only at the fundamental frequency, in a hybrid parallel active filter system in accordance with the present invention, there exists a real power flow due to the interaction (product) of the current at the dominant harmonic frequency and the voltage at the dominant harmonic frequency generated by the active filter inverter. In the present invention, the active filter inverter generates a harmonic voltage so as to achieve harmonic isolation between the supply and load. This causes a real power flow into the inverter at the selected dominant harmonic frequency, which charges and discharges the inverter DC bus capacitor. This real power flow into the inverter, due to the product of the harmonic voltage and current in the filter, cannot be actively controlled, and hence requires balancing by real power at some other frequency. In accordance with the present invention, this function of balancing the DC bus is achieved at the fundamental frequency. The active filter inverter is controlled to generate a fundamental frequency voltage in phase with the fundamental frequency current in the filter to achieve real power balancing and to compensate for the losses of the inverter. The harmonic isolation function of the system is not affected by adding fundamental voltage in the inverter output, because the fundamental voltage is independent of the harmonic frequency voltage generated by the active filter inverter. This method of DC bus control eliminates the need for an energy storage device or additional power supply to supply the active filter inverter in the hybrid parallel active/passive filter system.

Control of the active filter inverter to achieve power balancing of the DC bus is preferably achieved using an SRF based controller to generate DC bus control inverter voltage command signals. The DC bus control inverter voltage command signals may be combined with the harmonic inverter voltage command signals to control the active filter inverter to simultaneously fulfill the harmonic isolation and DC bus control functions. The three-phase harmonic inverter voltage command signals produced by the SRF based harmonic controller are converted into three-phase triangular carrier signals at the selected dominant harmonic frequency. The harmonic controller may employ feedforward command signals in addition to the feedback command signals in generating the harmonic inverter voltage command signals. The feedforward command signals, which are generated in the two phase d-q reference frame, may include a tuning voltage command signal designed to control the active filter inverter to synthesize an active impedance at the selected dominant harmonic frequency to tune the passive filter, and a tracking voltage command signal designed to control the active filter inverter to generate an inverter voltage signal such that the filter terminal voltage, or load voltage, tracks the supply voltage at the selected dominant harmonic frequency to eliminate supply voltage current harmonics. The tuning voltage command signal may be derived from active impedance commands and the filter current at the selected dominant harmonic frequency. The tracking voltage command signal may be derived from the selected dominant harmonic component of the supply voltage. The tuning and tracking voltage command signals are added together to form the feedforward command signals which, in turn, are added to the two-phase harmonic inverter voltage command signals.

The two-phase harmonic inverter voltage command signals generated by the harmonic SRF based controller, in the two phase synchronously rotating reference frame, are used to generate a DC bus voltage reference signal corresponding to the magnitude of the DC bus voltage to be generated by the active filter inverter at the dominant harmonic frequency. This DC bus voltage reference signal is compared to a measured DC bus voltage signal, with the difference between the two voltage signals provided to a PI controller to generate a DC bus voltage command signal. Simultaneously, the three phase currents through the hybrid filter are measured and transformed into two phase synchronously rotating reference frame signal values at the fundamental frequency using a three phase to two phase synchronous frame transformation. The three phase to two phase transformation thus employs $\sin\theta_1$ and $\cos\theta_1$ values, derived from a PLL and look-up table, at the fundamental frequency. Low pass filters are used to extract the DC component from the two-phase current signals. The resulting DC signals correspond to the filter current component at the fundamental frequency. The fundamental component filter current signals are then multiplied by the DC bus voltage command signals to generate DC bus control inverter voltage command signals in the two phase synchronously rotating reference frame. These two-phase signals are transformed into three phase DC bus control inverter voltage command signals using a two phase to three phase SRF transformation at the fundamental frequency. The three phase DC bus control inverter voltage command signals are combined with the three phase triangular carrier signals, generated from the three-phase harmonic inverter voltage command signals at the selected dominant harmonic frequency, to provide switching control signals that are applied to the switching devices of the active filter inverter. Thus, the process of generating the inverter switching signals is preferably a PWM process involving three phase fundamental frequency references and three phase harmonic frequency carriers. The active filter inverter is thus controlled to generated a voltage signal that provides for both harmonic isolation at the selected dominant harmonic frequency and power balancing of the DC bus by the exchange of energy at the harmonic frequency and the fundamental frequency. Since the inverter is directly controlled by the generated harmonic (at the selected dominant harmonic frequency) and DC bus control (at the fundamental frequency) inverter voltage commands, low band width, and hence higher efficiency, inverters, including square wave inverters, can be used. This increases the practical viability and cost effectiveness of a hybrid parallel active/passive filter system in accordance with the present invention, especially for high power applications.

Detailed simulations of hybrid parallel active/passive filter systems in accordance with the present invention demonstrate effectiveness over a wide range of practically encountered power system conditions, including line voltage harmonics and mistuned passive filters. The use of square wave active filter inverters allows the extension of operation to high power systems. Active filter ratings of approximately 1.5% of load kVA allow realizations of IEEE 519 compatible systems at power levels of 1–50 MW and higher. The active filter inverters in the hybrid active/passive filter provide both dynamic compensation for mistuned passive filters and harmonic isolation at selected dominant harmonic frequencies. Hybrid parallel active/passive filter systems in accordance with the present invention are particularly applicable to harmonic compensation of loads connected to stiff supply systems that pose a particular problem for the design of tuned passive filters. Small rated active filters used in the hybrid filter systems of the present invention enable sharp tuning of passive filters to provide effective harmonic compensation for stiff supply systems.

Further objects, features, and advantages of the present invention will be apparent from the following detailed description taken in conjunction with the accompanying drawings.

DETAILED DESCRIPTION OF THE INVENTION

Figure 4:
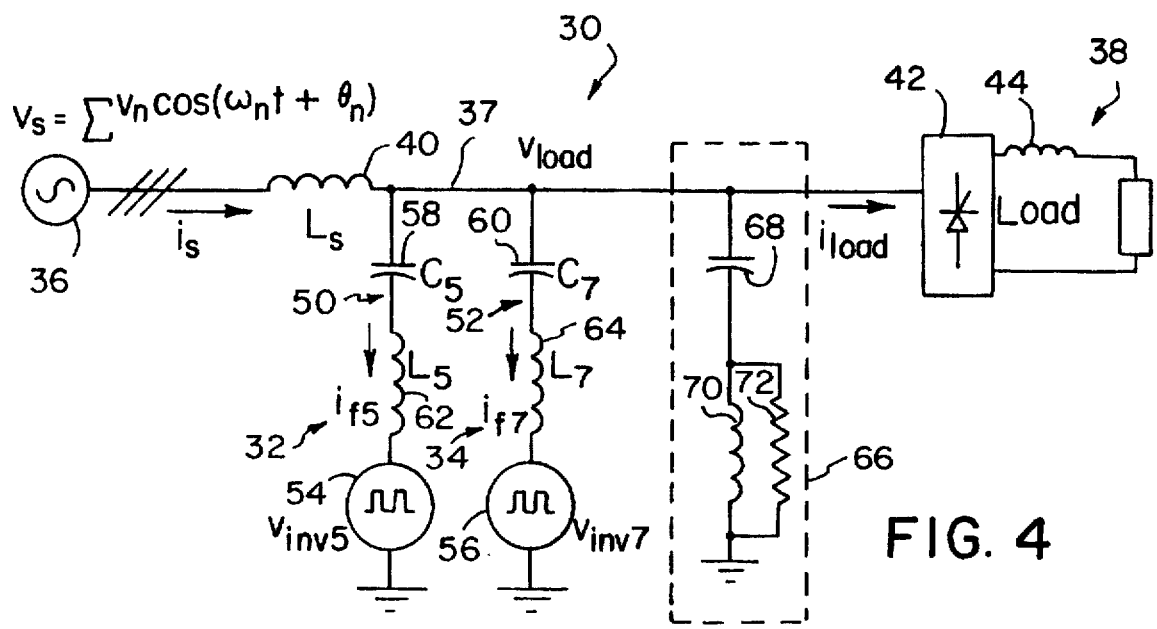
FIG. 4 is a schematic circuit diagram of a parallel hybrid active/passive filter system in accordance with the present invention.

A single line diagram of a power system 30 employing two hybrid parallel active/passive filter systems 32 and 34 in accordance with the present invention, to provide line power harmonic reduction by isolation of line harmonic currents at two dominant harmonic frequencies, is illustrated in FIG. 4. FIG. 4 illustrates the components of one phase of a three phase power system 30 in which the hybrid parallel active/passive filter system of the present invention will typically be employed. A typical power system 30 includes a three phase power supply 36 connected by three-phase power lines 37 to a non-linear load 38. The supply voltage $V_s$, provided by the power supply 36, may include supply voltage harmonic distortion. Typically, the fifth and seventh harmonics will dominate the total harmonic distortion of the supply voltage and current. Typically, measured supply voltage harmonic distortion at 480V source voltage levels are in the range of 1%–3% at PCC due to harmonic currents from other loads or nonlinearities of transformers. IEEE 519 limits the maximum allowable (total) voltage distortion to 5% with no individual harmonics exceeding 3% at PCC. The supply side is also characterized by an inductance 40, of value $L_s$, which represents primarily the leakage inductance of the point of common coupling (PCC) transformer by which the power supply 36 is connected to the power lines 37.

A typical non-linear load 38, common in high power applications, includes a six pulse thyristor or diode bridge rectifier front-end 42 with a DC side inductor 44. Such a non-linear load 38 places dominant fifth and seventh harmonics on the supply line 37. Thyristor rectifier front-ends typically require reactive power compensation. Hybrid active filters are suitable for such applications as passive filters can be designed to provide the reactive power demand of the load. Hybrid filters 32 and 34 for the dominant fifth and seventh harmonic frequencies are illustrated in FIG. 4. This is appropriate for harmonic compensation of six pulse rectifier loads, and this exemplary application will be used throughout the remainder of this detailed description. However, it should be understood that a single dominant harmonic frequency, or other combinations of dominant harmonic frequencies, may also be filtered using hybrid parallel active/passive filter systems in accordance with the present invention. For a twelve pulse rectifier load, the eleventh and thirteenth harmonics dominate. Thus, for twelve pulse rectifier loads, hybrid filters controlled for filtering the dominant eleventh and thirteenth harmonic frequencies would be appropriate. Other non-linear, and mixed linear/non-linear loads 38 may also be connected to the power supply 36. Hybrid parallel active/passive filter systems in accordance with the present invention may be designed and controlled, and thereby actively tuned, to provide harmonic compensation and isolation for any combination of dominant harmonic frequencies that is required for the particular supply 36 and load 38 with which the hybrid filters are employed.

Each hybrid parallel active/passive filter 32 and 34 includes a passive filter 50 or 52 connected in series with an active filter inverter 54 or 56, respectively. The series connected active/passive filters 32 and 34 are adapted to be connected in parallel with the load 38. Each passive filter 50 or 52 includes a capacitive element 58 or 60 and an inductive element 62 or 64, respectively. It should be understood that, for the typical three phase applications of the present invention, the passive filters 50 and 52 will be implemented with separate capacitor/inductor pairs for each phase of the power system 30. The resonant circuits formed by the capacitors 58 or 60 and inductors 62 or 64 are tuned approximately to the selected dominant harmonic frequencies for which harmonic compensation and isolation is required. Thus, in the exemplary topology shown in FIG. 4, capacitor 58 and inductor 62 are preferably tuned approximately to the fifth harmonic frequency, with capacitor 60 and inductor 64 tuned approximately to the seventh harmonic frequency. As has been noted previously, however, precise tuning of the passive filters 50 and 52 is not easily achieved due to L-C component tolerances. Moreover, the capability of the filters 50 and 52 to absorb harmonic current will be affected by variations in the total impedance of the power system 30 of which they are a part, including variations in the source inductance 40. If the total impedance of the supply 36 drops below that of the passive filters 50 or 52, at the selected dominant harmonic frequencies more harmonic current will be drawn into the supply 36 than into the passive filter. The active filter inverters 54 and 56 are therefore employed to provide active tuning of the hybrid filters 32 and 34, to achieve harmonic compensation and isolation at the selected dominant harmonic frequencies for any supply, passive filter, or load conditions.

The active filter inverters 54 and 56 are preferably implemented as square-wave inverters. Any conventional square-wave inverter topology may be employed. Other inverter topologies, such as PWM inverters, may also be used. However, the large switching losses resulting from the high switching frequency of PWM inverters will usually limit their application to power systems with medium power non-linear loads 38, in the range of 0.5–5 MW. The use of active filters implemented as square wave inverters allows for harmonic compensation of large rated industrial loads in the range of 1–50 MW and higher.

The active filter inverters 54 and 56 are three phase inverters, with each inverter phase connected in series with one of the capacitor/inductor pairs forming the passive filter portion of each phase of the hybrid filter. The active filter inverters 54 and 56 may be connected directly in series with the passive filters 50 and 52 or, preferably, may be connected in series with the passive filters 50 and 52 by use of conventional coupling transformers (see FIG. 24). Whether a direct connection or a coupling transformer should be used to connect the active filter inverters 54 and 56 to the passive filters 50 and 52 will depend on a cost optimization between active filter inverter switching devices having the required rating, the DC bus capacitor, and the coupling transformer to be employed. This cost optimization can be done according to manufacturers' cost structures for inverters and transformers. For the hybrid parallel active/passive filter system topologies described herein, transformer coupling is typically required to reduce the DC bus capacitance requirement, and hence DC bus voltage ripple. This is different from other active filtering systems in which a transformer is applied only for matching the current or voltage rating of PWM inverters.

The hybrid parallel active/passive filter systems 32 and 34 of the present invention reduce the line harmonics at the dominant harmonic frequencies to meet harmonic standards, such as IEEE 519. Higher order load current harmonics may be filtered from the supply line 37 using an optional, entirely passive, high-pass filter branch 66 connected in parallel with the hybrid active/passive filters 32 and 34. The passive high-pass filter 66 includes capacitor 68, inductor 70, and resistor 72 elements connected to each phase of the three phase power system power line 37.

Figure 5:
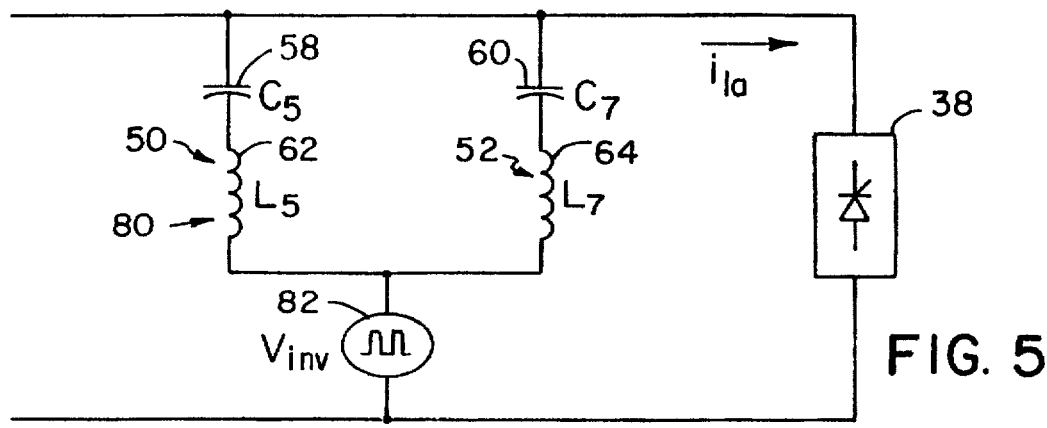
FIG. 5 is a schematic circuit diagram of an alternative parallel hybrid active/passive filter system topology in accordance with the present invention, employing two passive filters connected in series with a single inverter for providing harmonic isolation at multiple different dominant harmonic frequencies simultaneously.

In the exemplary circuit topology illustrated in FIG. 4, separate active filter inverters 54 and 56 are employed for each dominant harmonic frequency to be filtered. An alternative hybrid parallel active/passive filter system topology 80 in accordance with the present invention is illustrated in FIG. 5. In this alternative topology system 80, a single active filter inverter 82 is connected in series with the two passive filters 50 and 52. The two passive filters 50 and 52 may be tuned approximately to two separate dominant harmonic frequencies. Alternatively, the passive filters 50 and 52 may be tuned to other frequencies, e.g., tuned to anti-resonance at the fundamental frequency. The single active filter inverter 82 is controlled in accordance with the present invention to generate a voltage signal at multiple dominant harmonic frequencies simultaneously, to simultaneously provide harmonic compensation and isolation at the multiple dominant harmonic frequencies. In this alternative hybrid filter system topology 80, the active filter inverter 82 is preferably implemented as a PWM inverter.

Figure 6:
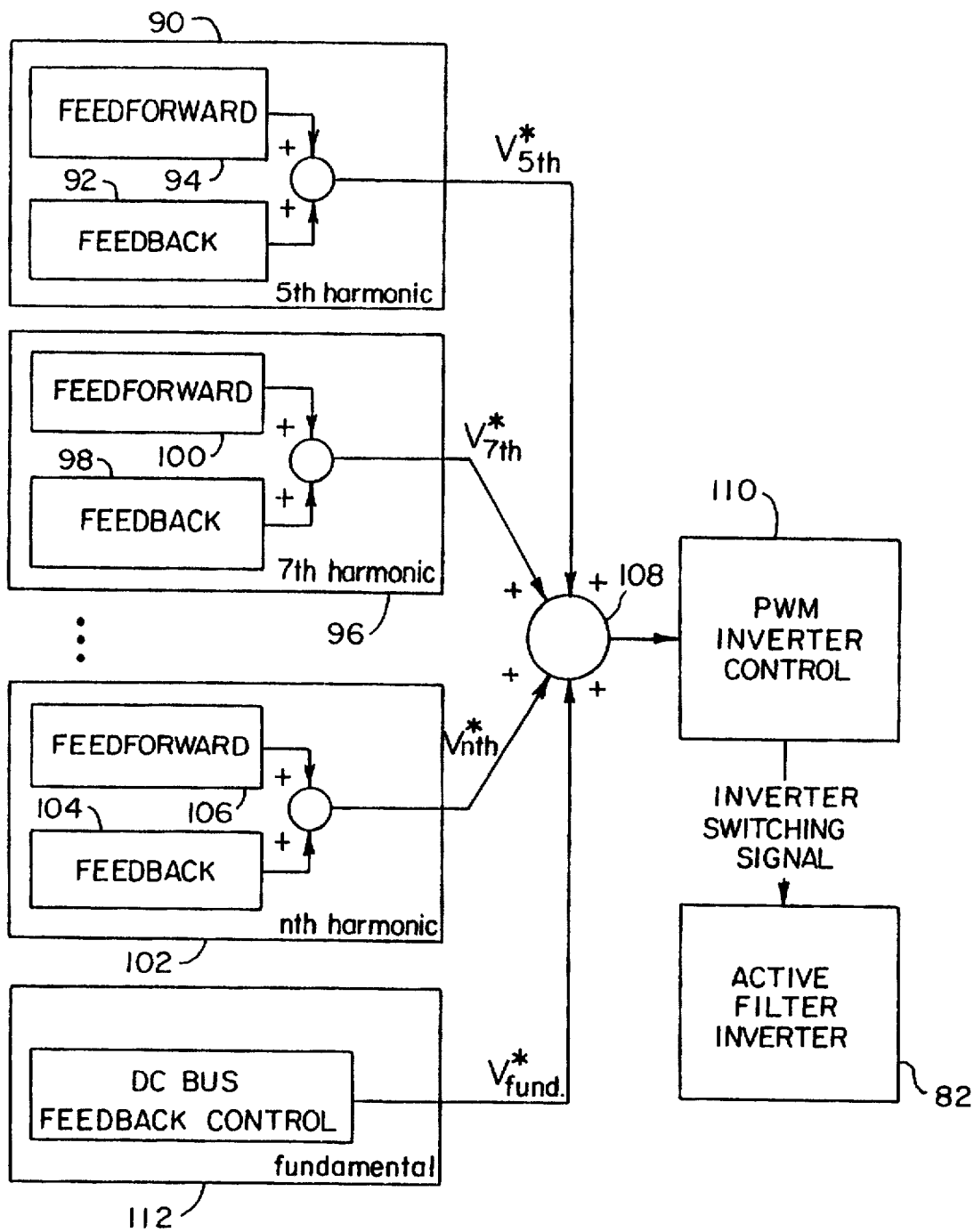
FIG. 6 is a block diagram of a controller for alternative parallel hybrid active/passive filter system topologies wherein a single active filter inverter is used for providing harmonic isolation at multiple different dominant harmonic frequencies simultaneously.

An exemplary control system for the active filter inverter 82 of the alternative topology system 80 is illustrated in FIG. 6. To control the active filter inverter 82 to provide harmonic compensation and isolation at more than one dominant harmonic frequency simultaneously, inverter control signals are generated in the manner to be described below for each individual dominant harmonic frequency, with the control signals for each dominant harmonic frequency added together before being provided to control the active filter inverter 82. Thus, for example, a harmonic controller 90 provides harmonic inverter voltage command signals for harmonic isolation at the fifth harmonic frequency. The fifth harmonic controller 90 generates control signals to control the active filter inverter, and may be implemented, in the manner to be described in more detail below. The fifth harmonic controller 90 may thus include feedback 92 and feedforward 94 components for generating the fifth harmonic inverter voltage command signals. Similarly, a seventh harmonic controller 96, which may include feedback 98 and feedforward 100 components, provides harmonic inverter voltage command signals at the seventh harmonic frequency. Additional harmonic controllers 102, with feedback 104 and feedforward 106 components, may be used to provide harmonic inverter voltage command signals at other selected dominant harmonic frequencies as well. The inverter voltage command signals at the multiple dominant harmonic frequencies are combined at a summing junction 108, and provided to a modulator 110 for generating inverter switching signals to control the active filter inverter 82. DC bus control inverter voltage command signals may also be combined with the harmonic inverter voltage command signals at the summing junction 108. The DC bus control inverter voltage command signals are generated at the fundamental frequency by a DC bus controller 112, in a manner to be described in more detail below, and are designed to control the active filter inverter 82 to provide compensation of the inverter DC bus.

Figure 7:
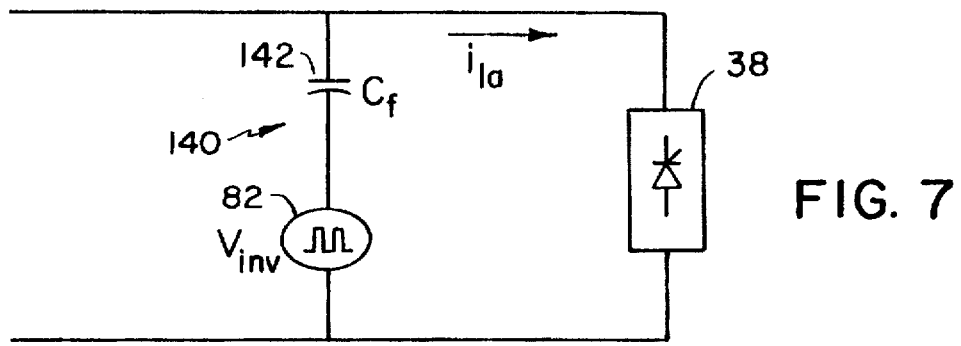
FIG. 7 is a schematic circuit diagram of another alternative parallel hybrid active/passive filter system topology in accordance with the present invention, employing a power factor correction capacitor passive filter in series with an inverter for providing harmonic isolation at multiple dominant harmonic frequencies simultaneously.

Another alternative topology 140 for a hybrid parallel active/passive filter system in accordance with the present invention is illustrated in FIG. 7. In this alternative embodiment 140, the passive filter is implemented with a cost-effective power correction capacitor 142. The active filter inverter 82 is controlled to generate an inverter voltage signal at one or more selected dominant harmonic frequencies, to provide harmonic compensation and isolation in combination with the power factor correction capacitor passive filter 142 at the selected dominant harmonic frequencies. The active filter inverter 82 may be controlled to provide harmonic isolation and compensation at more than one dominant harmonic frequency simultaneously by generating harmonic inverter voltage commands independently for each dominant harmonic frequency, and then adding the inverter voltage commands for each dominant harmonic frequency together before applying them to control the active filter inverter 82 (see the discussion above with respect to FIG. 6). For simultaneous compensation and isolation control at multiple dominant harmonic frequencies, the active filter inverter 82 is preferably implemented as a PWM inverter.

A hybrid parallel active/passive filter system in accordance with the present invention is controlled so as to minimize dominant harmonic frequency currents in the input AC line 37 in the presence of supply voltage harmonic distortions. This is accomplished by adjusting the phase and amplitude of the active filter inverter voltages such that the source currents $i_s$ at the dominant harmonic frequencies are brought to zero. This control strategy automatically tracks voltage harmonics present in the incoming AC supply. A controller for the active filter inverter is preferably capable of implementing this control strategy to achieve harmonic isolation and compensation with mis-tuned passive filter elements. The active filter controller is also preferably capable of controlling a square-wave active filter inverter in a manner to provide required DC bus regulation. An active filter inverter controller in accordance with the present invention to provide DC bus regulation will be described in more detail later.

Figure 2:
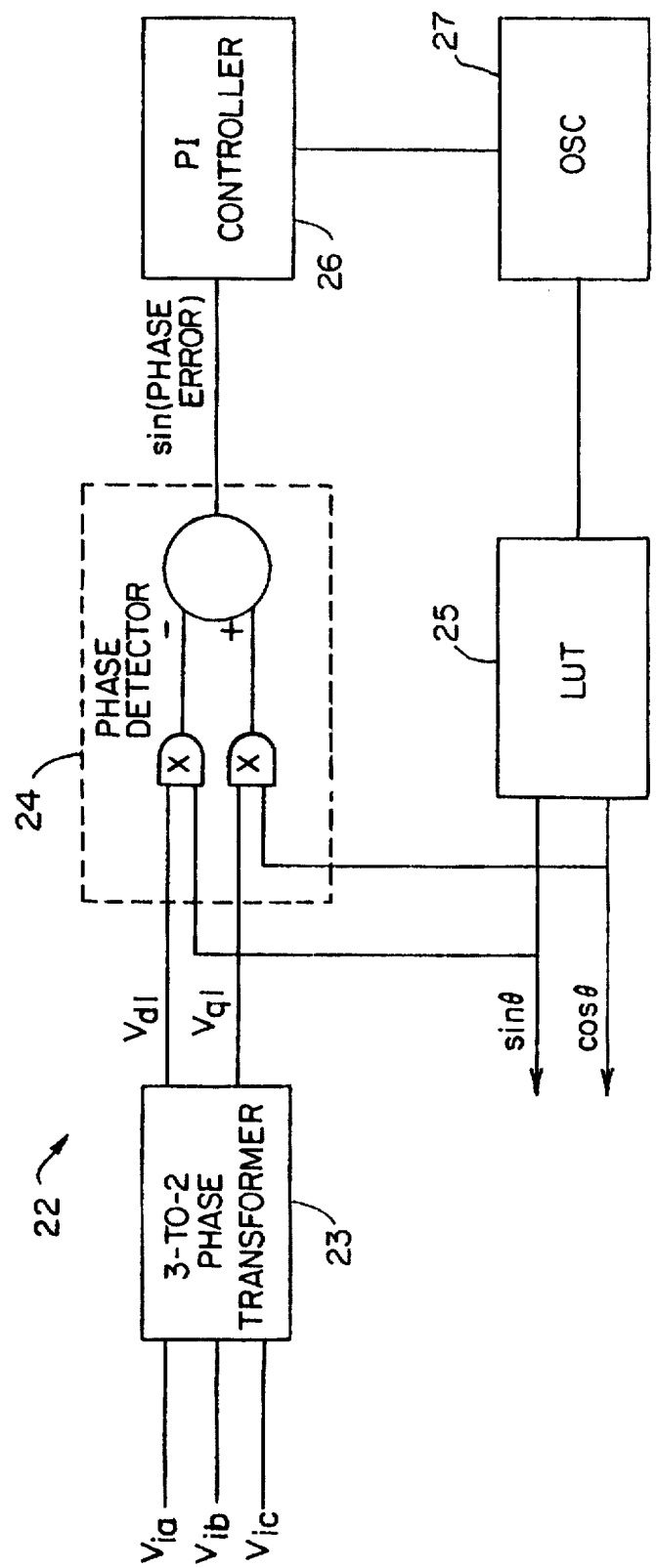
FIG. 2 is a block diagram of a phase-locked loop which may be used in conjunction with a synchronous reference frame based controller.
Figure 8:
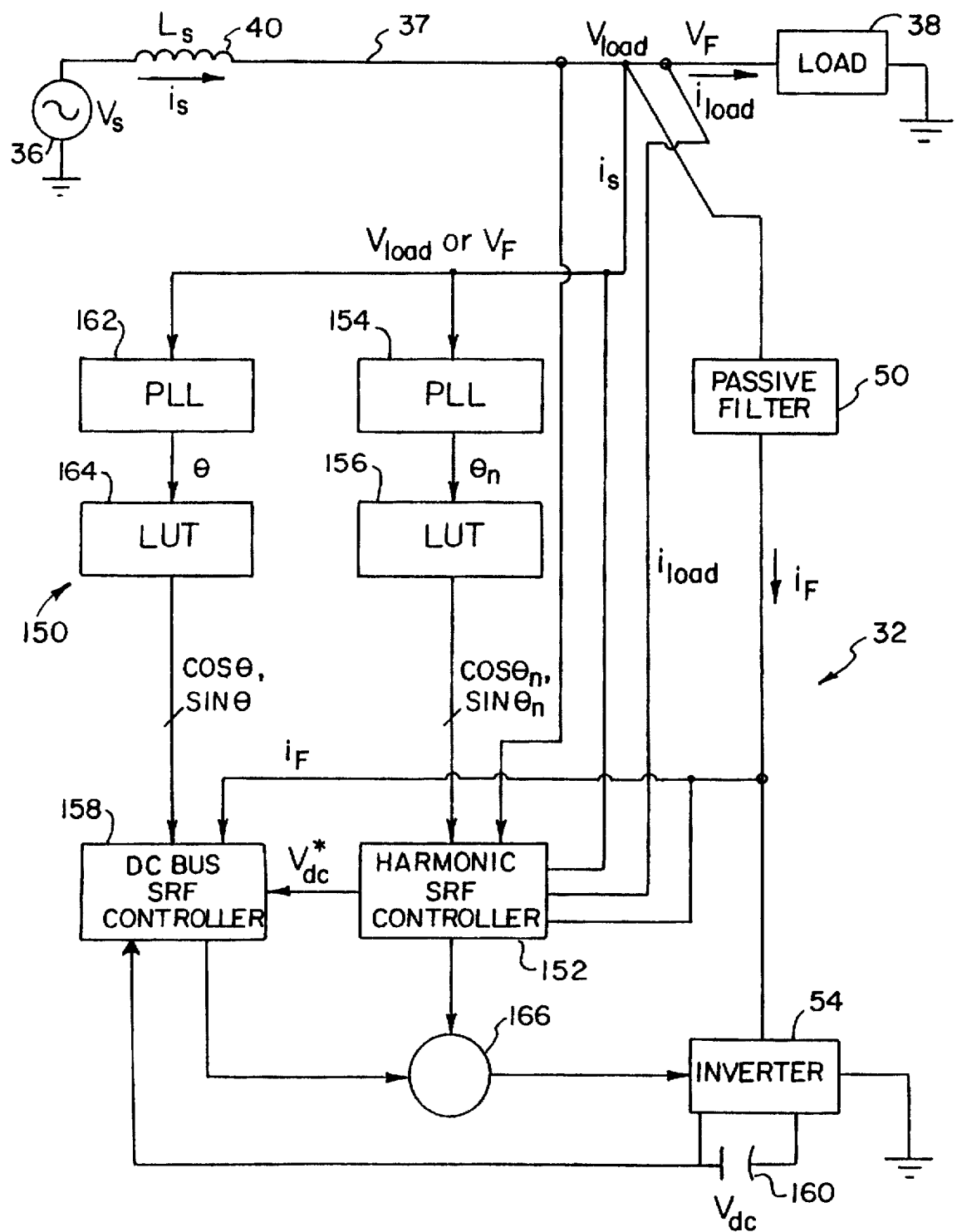
FIG. 8 is a block diagram of a parallel hybrid active/passive filter system in accordance with the present invention showing the main functional components of the active filter inverter control system.

The schematic block diagram of FIG. 8 illustrates a hybrid parallel active/passive filter system 32 in accordance with the present invention, along with functional elements of an active filter controller 150 for providing control signals to the active filter inverter 54 of the hybrid filter 32, to control the active filter inverter 54 in accordance with the present invention so as to minimize the dominant frequency harmonic currents in the input AC line 37 in the presence of supply voltage harmonic distortion. An active filter harmonic controller 152 generates harmonic inverter control signals that are provided to the active filter inverter 54 to generate an inverter voltage signal at a selected dominant harmonic frequency to fulfill the harmonic isolation and compensation function. The harmonic controller 152 is preferably implemented as a synchronous reference frame (SRF) based controller. An SRF based controller operates by transforming measured three phase signal values into two phase synchronously rotating reference frame signal values, manipulating these two phase reference frame signal values to generate two phase inverter voltage command signals, and transforming the two phase inverter voltage command signals to three phase inverter voltage command signals that are provided to control the active filter inverter 54. In accordance with the present invention, the measured three phase values used to generate the harmonic inverter voltage command signals are the three phase supply currents $i_s$. The supply current $i_s$ may be measured in a conventional manner, such as using a current transformer, etc. The measured three phase current values are transformed into synchronously rotating two phase reference frame signal values at the selected dominant harmonic frequency that is to be filtered. This transformation may be accomplished in a conventional manner. As described previously, the three phase to two phase transformation requires $\cos\theta_n$ and $\sin\theta_n$ signal values calculated from a phase angle signal value $\theta_n$ at the dominant harmonic n. These signal values may be generated in a conventional manner, as previously described with respect to FIG. 2, using, for example, a phase lock loop (PLL) 154 on a measured filter terminal voltage $V_{load}$, to produce the $\theta_n$ signal value, and a look-up table 156 to provide the $\cos\theta_n$ and $\sin\theta_n$ signal values from the phase locked angle $\theta_n$. The filter terminal voltage, which is also the load voltage, $V_{load}$, may be measured in a conventional manner. The PLL 154 and look-up table 156 are also used in transforming the two phase harmonic inverter voltage command signals into three phase harmonic inverter voltage command signals. For a faster response, the harmonic controller 152 may also include a feedforward command calculator, to be described in more detail below. The feedforward command calculator generates feedforward commands in the two phase synchronously rotating reference frame. Depending upon the particular feedforward command generator employed (two options are described in detail in this disclosure), the feedforward command generator may require measured three phase load current $i_{load}$, supply voltage $V_s$, and/or filter current $i_f$, values that are transformed into two phase synchronously rotating reference frame signal values at the selected dominant harmonic frequency. These currents and voltages may be measured in a conventional manner. The three phase to two phase transformation of the measured currents and voltages may be accomplished in a conventional manner using $\sin\theta_n$ and $\cos\theta_n$ values at the dominant harmonic n provided by the PLL 154 and look-up table 156.

The active filter inverter 54 synthesizes the inverter voltage signal at the selected dominant harmonic frequency from the voltage across a DC bus 160. A DC bus controller 158 generates DC bus control inverter voltage command signals that are used to control the active filter inverter 54 to achieve power balancing of the inverter DC bus 160, and to compensate for the losses of the inverter 54, by maintaining a desired DC bus voltage level across the DC bus capacitor 160. As will be described in more detail below, power balancing of the DC bus 160 is achieved by exchanging energy at the fundamental and at the dominant harmonic frequency. The DC bus controller 158 is preferably also implemented as an SRF based controller, and, as described in more detail below, may share selected components with the harmonic controller 152. The DC bus controller 158 generates three phase DC bus control inverter voltage command signals based on a DC bus reference voltage signal $V_{dc}*$, that may be conveniently generated from signals produced by the harmonic controller 152, the measured voltage $V_{dc}$ across the DC bus capacitor 160, and measured three phase filter current values $i_f$. The filter current values if may be measured in a conventional manner using, for example, a current transformer, etc. The DC bus controller 158 requires transformation of the measured three phase filter current values if into two phase synchronously rotating reference frame signal values at the fundamental frequency. This may be achieved in a conventional manner, as described previously, using a PLL 162 on the filter terminal voltage $V_{load}$ to generate the phase angle $\theta$ at the fundamental frequency, and a look-up table 164 to provide the required $\cos\theta$ and $\sin\theta$ signal values to the DC bus controller 158. In a similar manner, two phase DC bus control inverter voltage command signals are transformed into the three phase DC bus control inverter voltage command signals using the signals provided by the PLL 162 and look-up table 164. Note that the harmonic controller 152 and DC bus controller 158 need not be implemented as entirely independent elements. Thus, they may be implemented using shared components.

The harmonic active filter inverter voltage command signals generated by the harmonic controller 152 are combined with the DC bus control inverter voltage command signals from the DC bus controller 158 at a junction 166 before being applied to control the active filter inverter 54. At the junction 166 a PWM modulation (to be described in more detail below) takes place in which switching signals for the active filter inverter are generated from the combined harmonic and DC bus control inverter voltage command signals. The active filter inverter 54 is thereby controlled simultaneously to perform both functions of harmonic isolation/compensation, at the selected dominant harmonic frequency, and DC bus control and power balancing. Note that FIG. 8 only illustrates a single parallel hybrid active/passive filter system in accordance with the present invention for filtering a single dominant harmonic frequency. A separate harmonic controller 152 and DC bus controller 158 is used for each separate active filter inverter used for filtering a selected dominant harmonic frequency. Where a single active filter inverter 82 is to be used for harmonic isolation and compensation of more than one dominant harmonic frequency at the same time, such as in the alternative hybrid parallel active/passive filter system topologies 80 and 140 described with reference to FIGS. 5 and 7, active filter inverter control signals from multiple harmonic controllers 152 may be combined before the control signals are applied to control the active filter inverter 82, as illustrated in FIG. 6.

Figure 1:
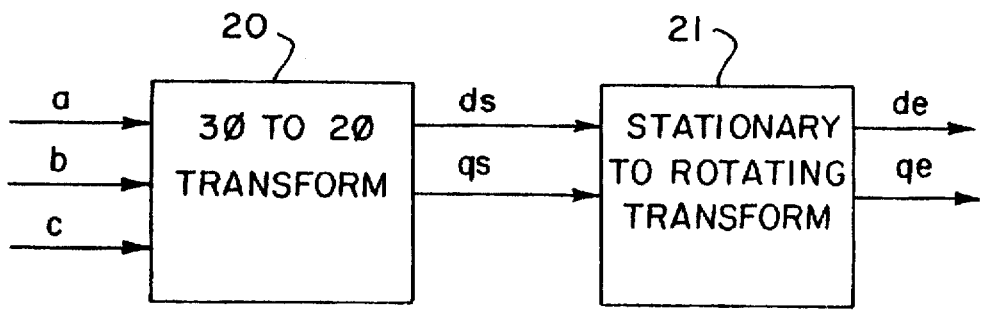
FIG. 1 illustrates a three-phase to synchronously rotating two-phase reference frame transformation, as used in a synchronous reference frame based controller, and its corresponding mathematical model.

An exemplary SRF based harmonic controller 152, for use with the present invention, is described in more detail with reference to FIG. 9. This exemplary controller provides control signals for controlling an active filter inverter 54 to provide harmonic compensation/isolation at a 5th harmonic frequency. Controllers for other dominant harmonic frequencies would be implemented similarly. Feedback control is based on the three phase supply currents $i_{sa}$, $i_{sb}$, and $i_{sc}$ that are measured using a current transformer or other conventional current measuring device. The measured supply current signal values are applied to a three phase to two phase synchronous reference frame transformation device 170. The three phase to two phase transformation device 170 may be implemented in a conventional manner to transform the three phase supply current signal values $i_{sa}$, $i_{sb}$, and $i_{sc}$ into two phase synchronously rotating supply current signal values $i_q^e$ and $i_d^e$ at the selected dominant harmonic frequency, i.e. in this case, the fifth harmonic frequency, in the manner described previously with respect to FIG. 1. The three phase to two phase synchronous reference frame transformation 170 thus employs $\sin\theta_5$ and $\cos\theta_5$ signal values, that may be generated by the PLL 154 on the measured terminal voltage $V_{load}$, and the look-up table 156, to perform the three phase to two phase transformation.

Figure 10A:
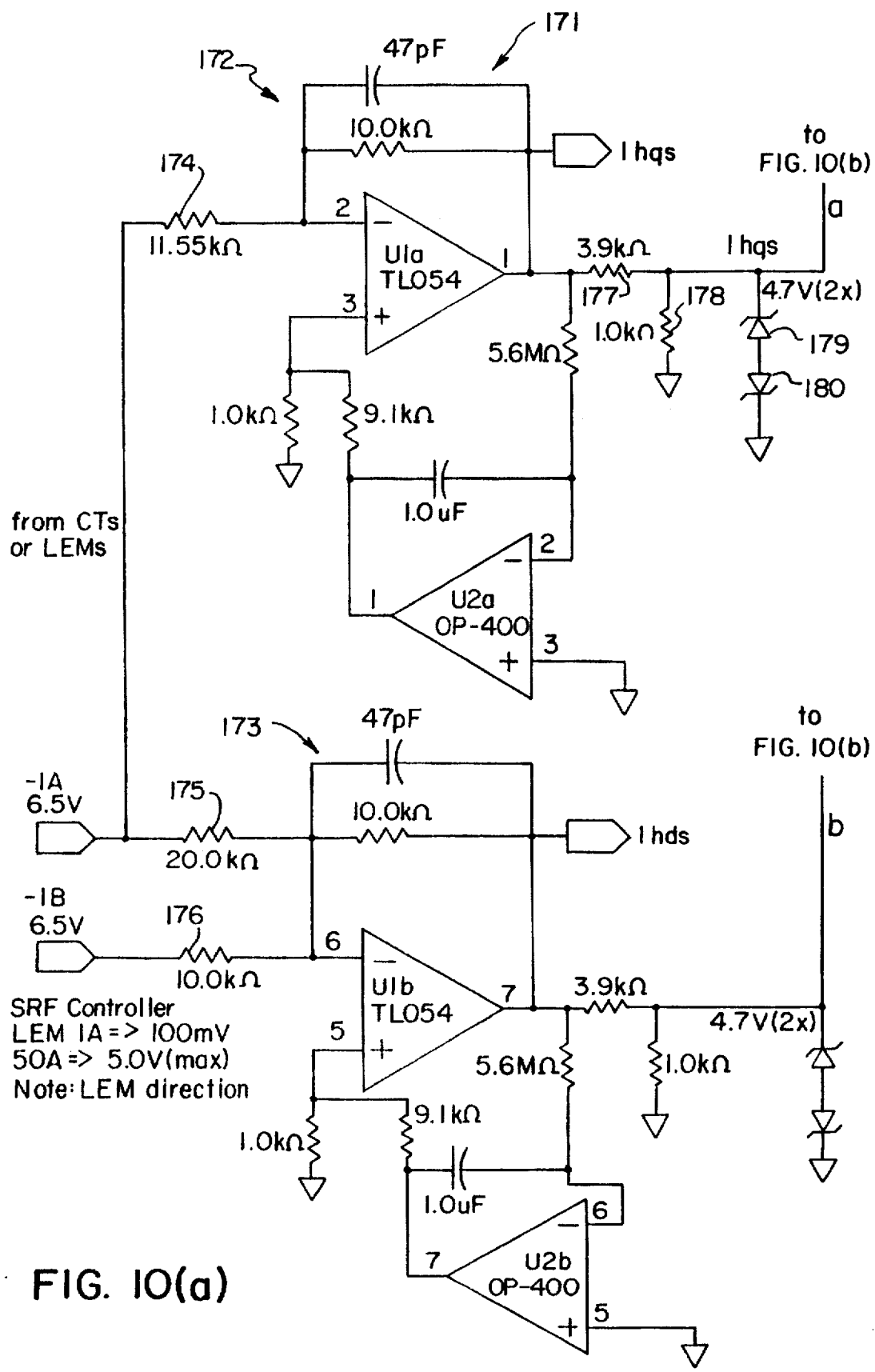
FIG. 10 is a schematic circuit diagram of a three phase to two phase synchronous reference frame transformation device that may be employed in the controller for the active filter inverter of the present invention.
Figure 10B:
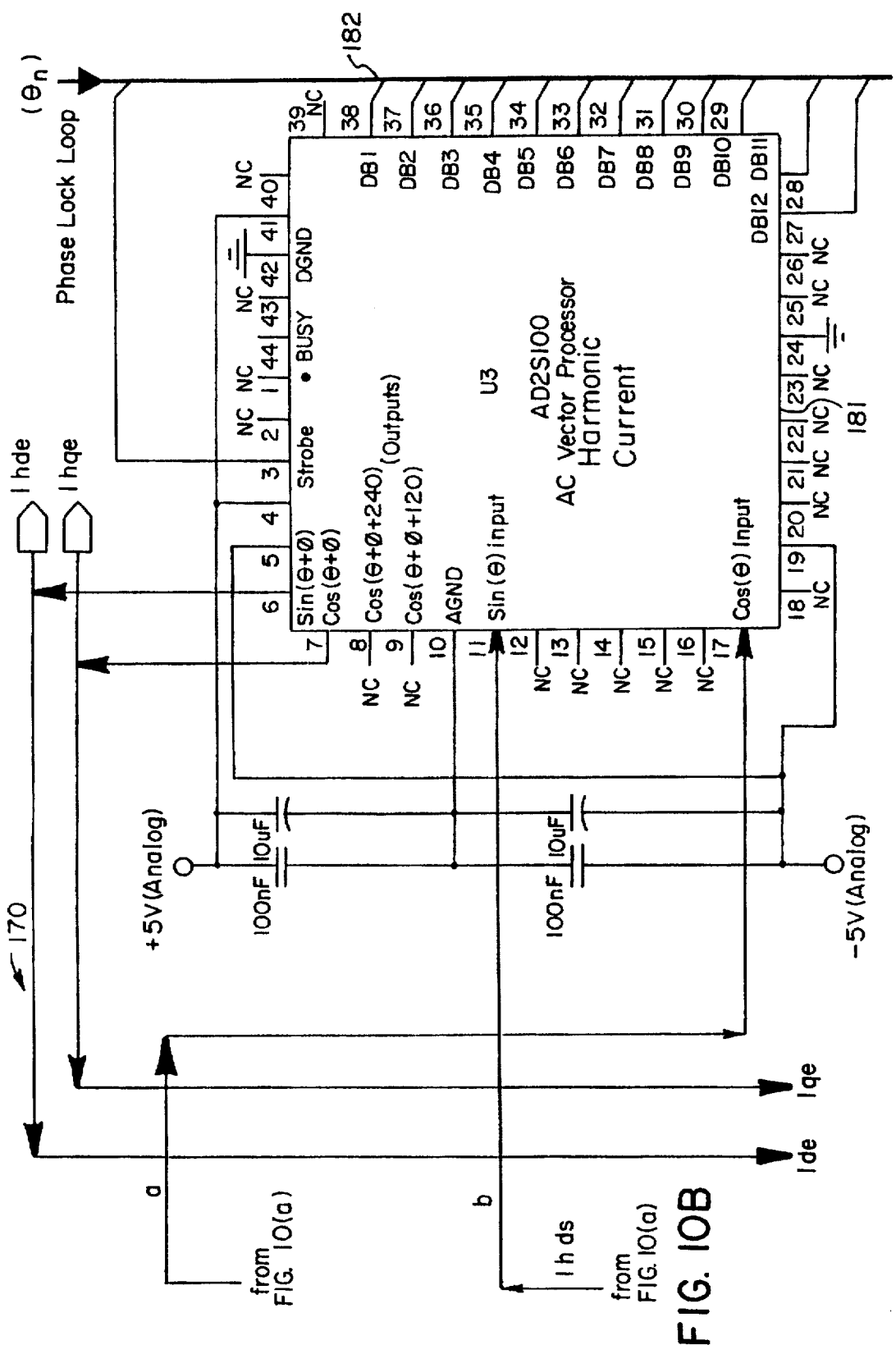

An exemplary circuit for implementing the three phase to two phase synchronous reference frame transformation 170 is illustrated in FIG. 10. An amplifier circuit 171 is used to perform the initial transformation of the three phase signal to the two phase stationary ds-qs reference frame. This circuit takes advantage of the relationship between the three phase reference currents $i_a$, $i_b$, and $i_c$. Since $i_c = -i_a - i_b$, only two measured phase currents $i_a$ and $i_b$ are needed to perform the phase transformation. Thus, a first amplifier circuit 172 generates $i_q^s$ from $i_a$. In a similar manner, a second amplifier circuit 173 generates signal $i_d^s$ in the stationary two phase reference frame based on measured three phase current signals $i_a$ and $i_b$. The amplifier circuits 172 and 173 generate $i_d^s$ and $i_q^s$ in the stationary two phase reference frame by combining $i_a$ and $i_b$ multiplied by the appropriate constants as defined by Equation 1. Note that the two amplifier circuits 172 and 173 are identical; however, resistor 174 in amplifier circuit 172, and resistors 175 and 176 in amplifier circuit 173, have resistance values chosen to provide multipliers of the desired ratio between $i_a$ and $i_b$ to form $i_q^s$ and $i_d^s$. Resistors 177 and 178, and back to back zener diodes 179 and 180, in each amplifier circuit 172 and 173, provide a voltage divider for reducing the scale of the $i_q^s$ and $i_d^s$ quantities and a voltage limiter, respectively.

Multiplication by the $\sin\theta_n$ and $\cos\theta_n$ unit vectors is achieved in the SRF transformation circuit 170 shown in FIG. 10 by use of an integrated circuit AC vector processor chip 181, such as the AD2S100 or AD2S105. The stationary two phase reference frame signals $i_q^s$ and $i_d^s$ are input to the vector processor 181 at the $\sin\theta$ and $\cos\theta$ inputs, respectively. The rotating two phase reference frame signal values $i_q^e$ and $i_d^e$ are output from the vector processor 181. The amount by which the stationary two phase reference frame signal values $i_q^s$ and $i_d^s$ are rotated to form the rotating two phase reference frame signal values $i_q^e$ and $i_d^e$ is determined by a digital signal, representative of the phase angle $\theta$, which is applied on lines 182 to the inputs of the vector processor 181. The lines 182 are inputs to a look-up table within the vector processor 181 that correspond to the $\cos\theta_n$ and $\sin\theta_n$ values at the nth harmonic frequency that are required by Equation 2. Thus, the look-up table function 156 of FIG. 8 is implemented in the vector processor 181. Other circuits may also be used to accomplish the three phase to stationary two phase reference frame transformation, and to achieve the transformation from stationary to synchronous rotating two phase quantities. For example, digital implementation of the three phase to two phase transformation 170, using a microprocessor or digital signal processor (DSP), may be used.

Figure 11A:
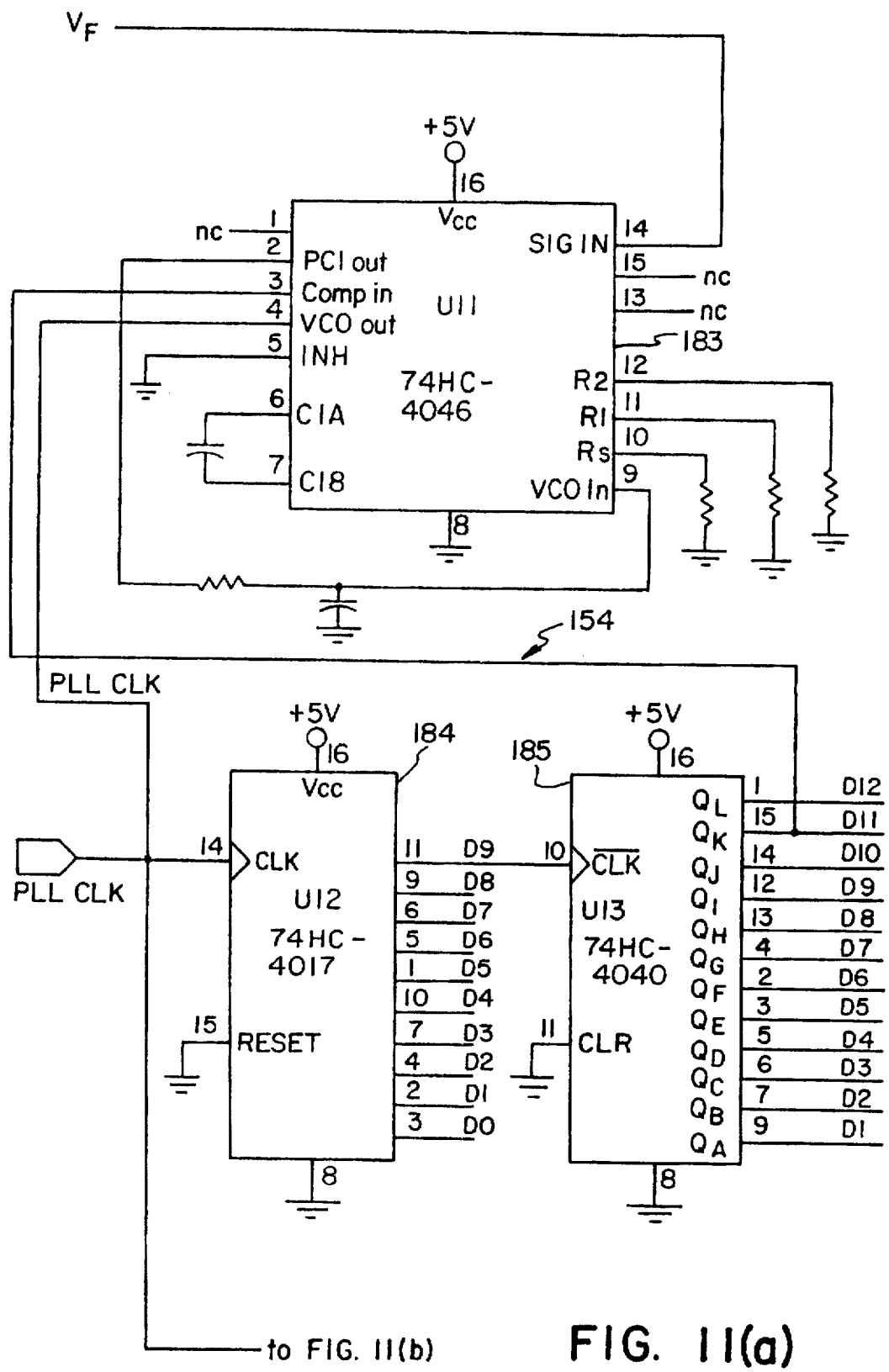
FIG. 11 is a schematic circuit diagram of a phase lock loop that may be employed in the controller for the active filter inverter of the present invention.
Figure 11B:
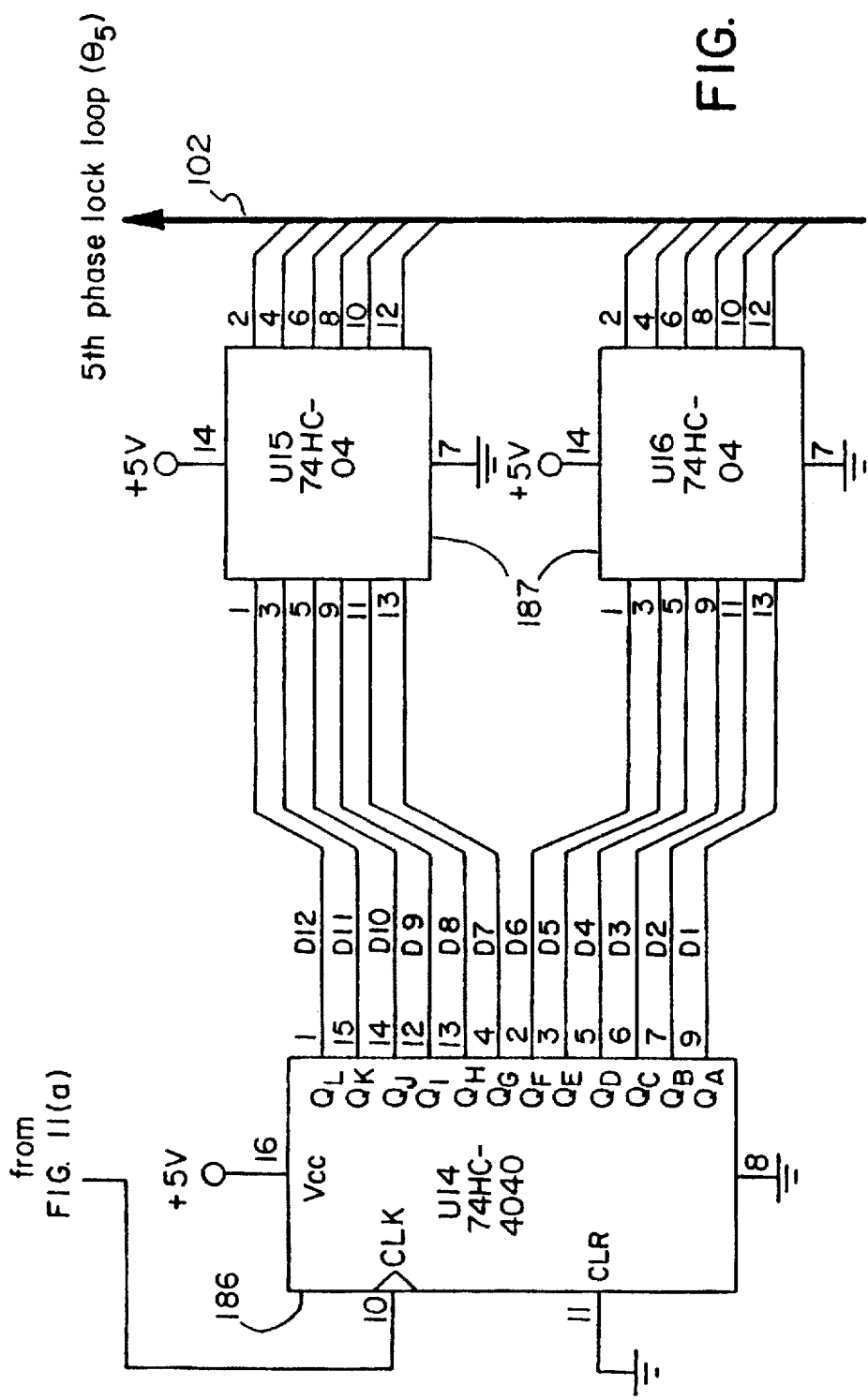

The stationary to rotating two phase transformation is preferably based on $\cos\theta_n$ and $\sin\theta_n$ values that are derived from a phase lock loop (PLL) 154 on the measured filter terminal voltage $V_{load}$. For the three phase to two phase SRF transformation circuit 170 shown in FIG. 10, the corresponding PLL 154 is illustrated in FIG. 11. The line to neutral filter terminal voltage $V_{load}$, which may also be designated $V_f$, for any one phase, is applied to the input of integrated circuit 183. A clocking signal output of the circuit 183 increments the counts in series connected decade counter 184 and binary counter 185, and binary counter 186. The outputs of binary counter 186 are address signals corresponding to $\theta n$, where, in this case, n=5 (the fifth harmonic). These signals are inverted by inverters 187 and applied to the line 182 where they may be used by vector processor circuits, such as vector processor 181 in FIG. 10, as addresses for internal look-up tables containing the desired $\sin\theta_n$ and $\cos\theta_n$ values. The inverters 187 are used, in this case, because the fifth harmonic has a negative or reversed direction of rotation with respect to the fundamental frequency. The output of the binary counter 185 is a signal pulse at the fundamental frequency of $V_f$, e.g., 60 Hz. This signal is fed back as an input to the integrated circuit 183. The integrated circuit 183 adjusts its clocking rate output to bring the signal received from the counter 185 into phase lock with the $V_f$ input signal. Other PLL circuits, including PLLs implemented digitally in microprocessors or digital signal processors (DSPs) may also be used. It should be noted that the exemplary three phase to two phase transformation and PLL circuits just described may be used, with slight modification, wherever use of a three phase to two phase transformation or PLL is called for in this application.

In transforming the three phase supply current signal values $i_{sa}$, $i_{sb}$, and $i_{sc}$, into the two phase synchronously rotating source current signal values $i_q^e$ and $i_d^e$, at the selected dominant harmonic frequency, the dominant harmonic frequency component of the measured supply current signal values is converted into a DC component of the two phase source current signal values $i_q^e$ and $i_d^e$. Thus signals $i_{qf}^e$ and $i_{df}^e$, corresponding to the dominant harmonic current component of the supply current $i_s$, may be easily extracted without any phase delay by low pass filtering of the two phase supply current signal values $i_q^e$ and $i_d^e$. Low pass filters 188 and 190, used to extract the DC dominant harmonic component from the two phase supply current signals $i_q^e$ and $i_d^e$, may preferably be realized by maximally flat butterworth low-pass filters. Other conventional low pass filter designs may also be used, such as 6th order switched-capacitor low-pass filters with an appropriate cut-off frequency (e.g., 10 Hz). The ability to extract the dominant harmonic component from a measured current or voltage signal using a low pass filter, without introducing any phase delay, is a significant advantage of SRF based controllers. Most other controllers will introduce significant phase shift at both harmonic and fundamental frequencies.

Figure 12:
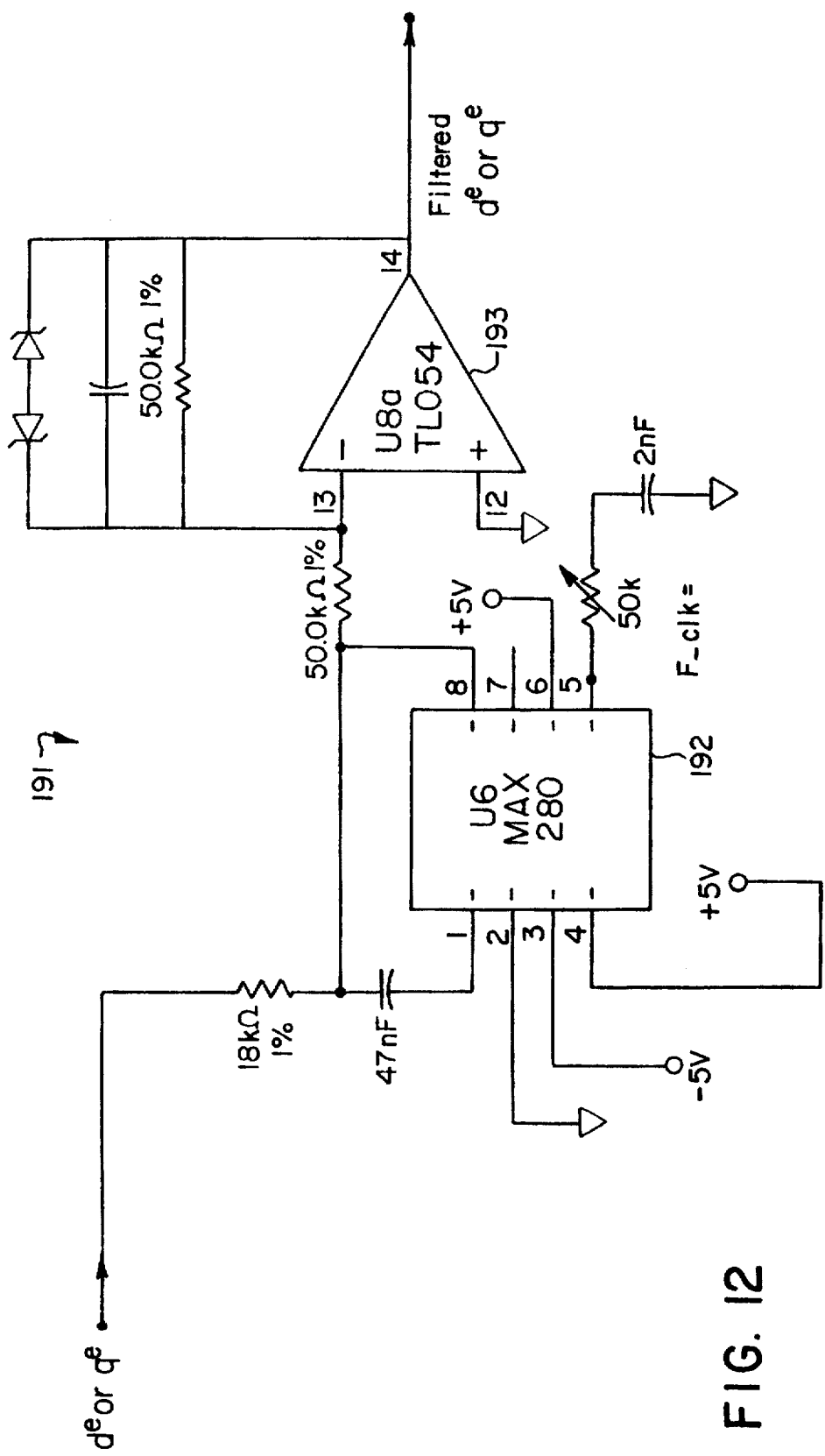
FIG. 12 is a schematic circuit diagram of a switched capacitor low-pass filter that may be employed in the controller for the active filter inverter of the present invention.

The low pass filters 188 and 190 may be implemented using switched capacitor low pass filters 191, of the type illustrated in FIG. 12. In the switched capacitor low pass filter 191, an integrated circuit switch 192 switches to extract the DC component from an input signal. An amplifier circuit 193 provides an output buffer for the low pass filter 191. Of course, other low pass filter designs may also be employed, such as LPFs using an analog Sallen-key approach, or digital LPFs implemented in a digital signal processor (DSP). It should also be noted that the switched capacitor LPF just described may be used wherever use of a LPF is called for in this specification.

Figure 3:
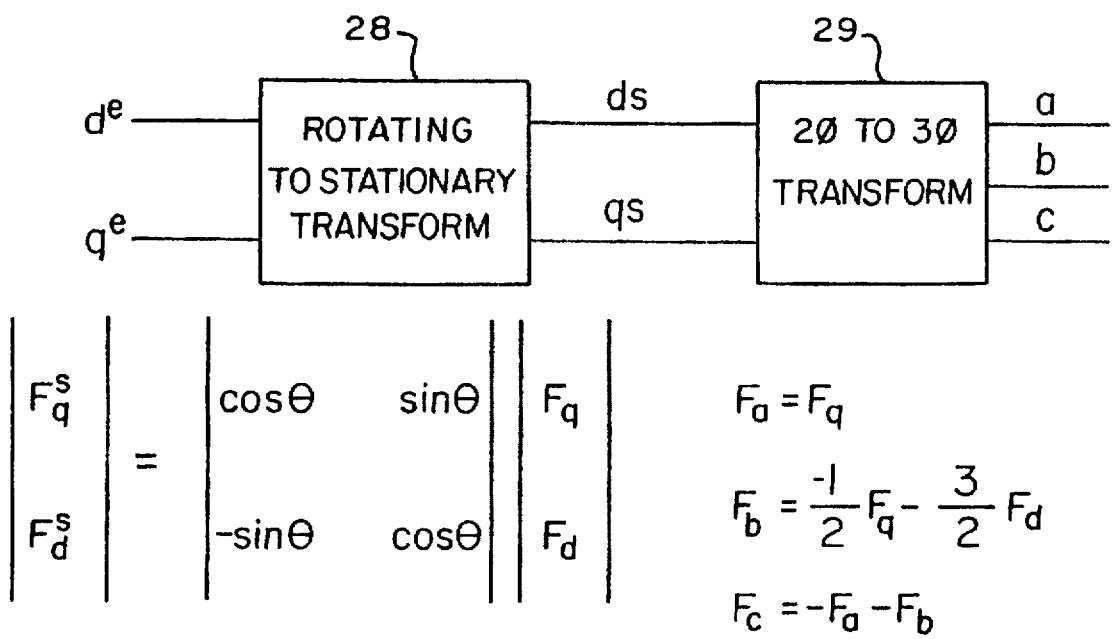
FIG. 3 illustrates a synchronously rotating two-phase to three-phase reference frame transformation, as used in a synchronous reference frame based controller, and its corresponding mathematical model.

The filtered signal values corresponding to the dominant harmonic component of the measured supply current are compared with supply current reference command signal values $i_q^{e*}$ and $i_d^{e*}$ at junctions 194 and 196 respectively, to produce supply current harmonic error signals. Since the objective is to drive the dominant harmonic component of the supply current to zero, the dominant harmonic supply current reference command signal values $i_q^{e*}$ and $i_d^{e*}$ preferably are both set to zero. The supply current harmonic error signals, representing the difference between the measured supply current at the selected dominant harmonic frequency and the desired supply current at the selected dominant harmonic frequency, are applied to proportional-integral (PI) regulators 200 and 202. The PI regulators 200 and 202 may be implemented in a conventional manner. The output of the PI regulators 200 and 202 are harmonic inverter voltage command signals $V_q^{e*}$ and $V_d^{e*}$ in the two phase synchronously rotating reference frame. The two phase harmonic inverter voltage command signals may be combined with feedforward voltage command signals from a feedforward command calculator 240, at summing junctions 210 and 212. The feedforward command calculator 240 will be described in more detail below. The two phase harmonic inverter voltage command signals are transformed from the two phase synchronously rotating reference frame into three phase inverter voltage command signals $V_{inva}^*$, $V_{invb}^*$ and $V_{invc}^*$ by a two phase to three phase synchronous frame transformation 214. The two phase to three phase synchronous frame transformation device 214 may be implemented in a conventional manner to perform the two phase to three phase transformation described earlier with respect to FIG. 3. The two phase to three phase reference frame transformation is accomplished at the dominant harmonic frequency, and hence, in this case, requires $\sin\theta_5$ and $\cos\theta_5$ signal values that may be provided by the PLL 154 on the filter terminal voltage $V_{load}$, and the look-up table 156.

Figure 13A:
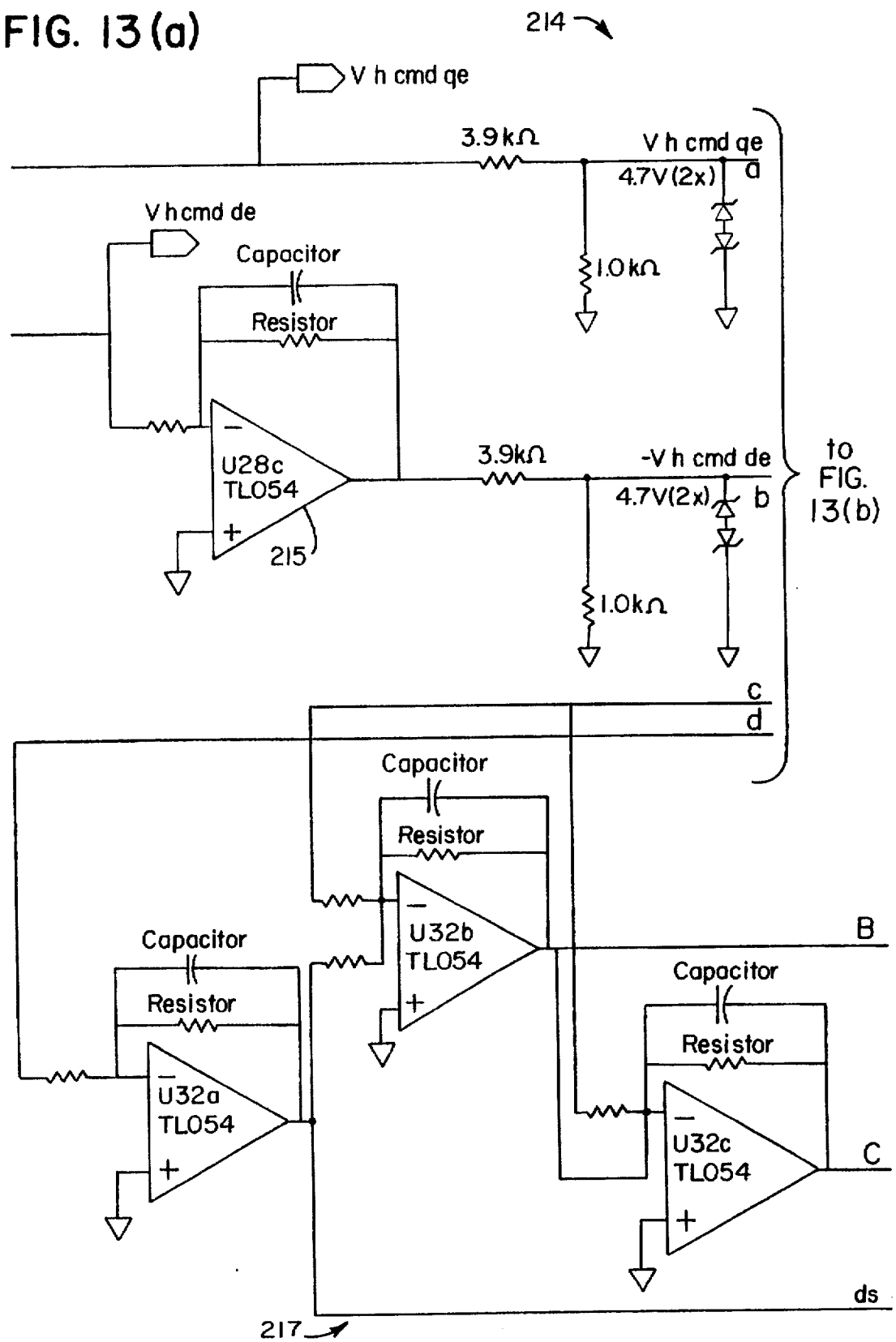
FIG. 13 is a schematic circuit diagram of a two phase to three phase synchronous reference frame transformation device that may be employed in the controller for the active filter inverter of the present invention.
Figure 13B:
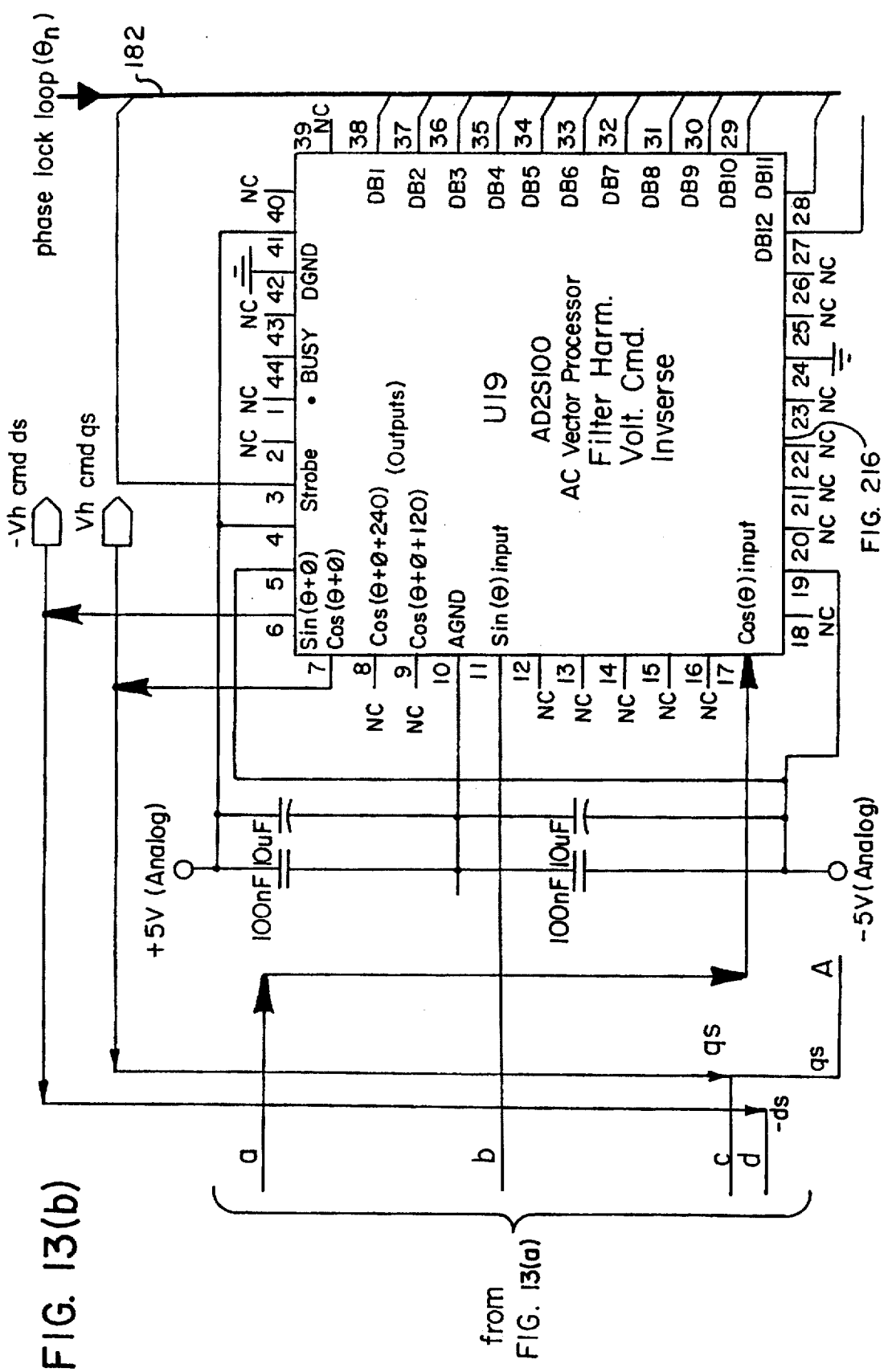

A schematic circuit diagram of an exemplary two phase to three phase transformation circuit 214 is illustrated in FIG. 13. An inverting amplifier 215 implements a multiplication by $k=-1$, for, in this case, the $V_d^e$ value. This is appropriate for negative sequences, such as for the fifth harmonic. An integrated circuit vector processor chip 216 performs the two phase rotating to two phase stationary transformation. The required multiplications by $\sin\theta_n$ and $\cos\theta_n$, as required by Equation 4, are implemented in the circuit 216 by an internal look-up table addressed by the address signals on lines 182 from the PLL 154 corresponding to $\theta_n$. The outputs of the vector processor 216, representing voltage values in the stationary two phase reference frame, are applied to an amplifier circuit 217 that multiplies the stationary two phase reference frame signal values by the constants required by Equation 5, to transform the two phase signal values into three phase signal values. Other analog or digital circuits, including digital signal processor circuits, may be used to implement the two phase to three phase transformation 214. It should also be noted that this exemplary two phase to three phase transformation circuit may be used, with slight modification, wherever use of a two phase to three phase transformation is called for in this specification.

The three phase harmonic inverter voltage command signals $V_{inva}^*$, $V_{invb}^*$ and $V_{invc}^*$, are provided to a modulator 218. The modulator 218 generates inverter switching signals $S_a$, $S_b$, and $S_c$, for switching devices in the active filter inverter 54, from the inverter voltage command signals. Thus, for example, the modulator 218 may be implemented as a square-wave or switching angle calculator that generates square-wave inverter gate signals for the inverter switches of a square-wave active filter inverter 54. An exemplary structure and method for generating the inverter switching signals will be described in more detail below with respect to DC bus control of the inverter 54. The resulting three phase inverter voltage signals $V_a$, $V_b$, and $V_c$, generated by the inverter 54, will cause the filter terminal voltage, or load voltage $V_{load}$, to track the supply voltage $V_s$ at the selected dominant harmonic frequency, to regulate the supply current at the selected dominant harmonic frequency to approximately zero.

Figure 9:
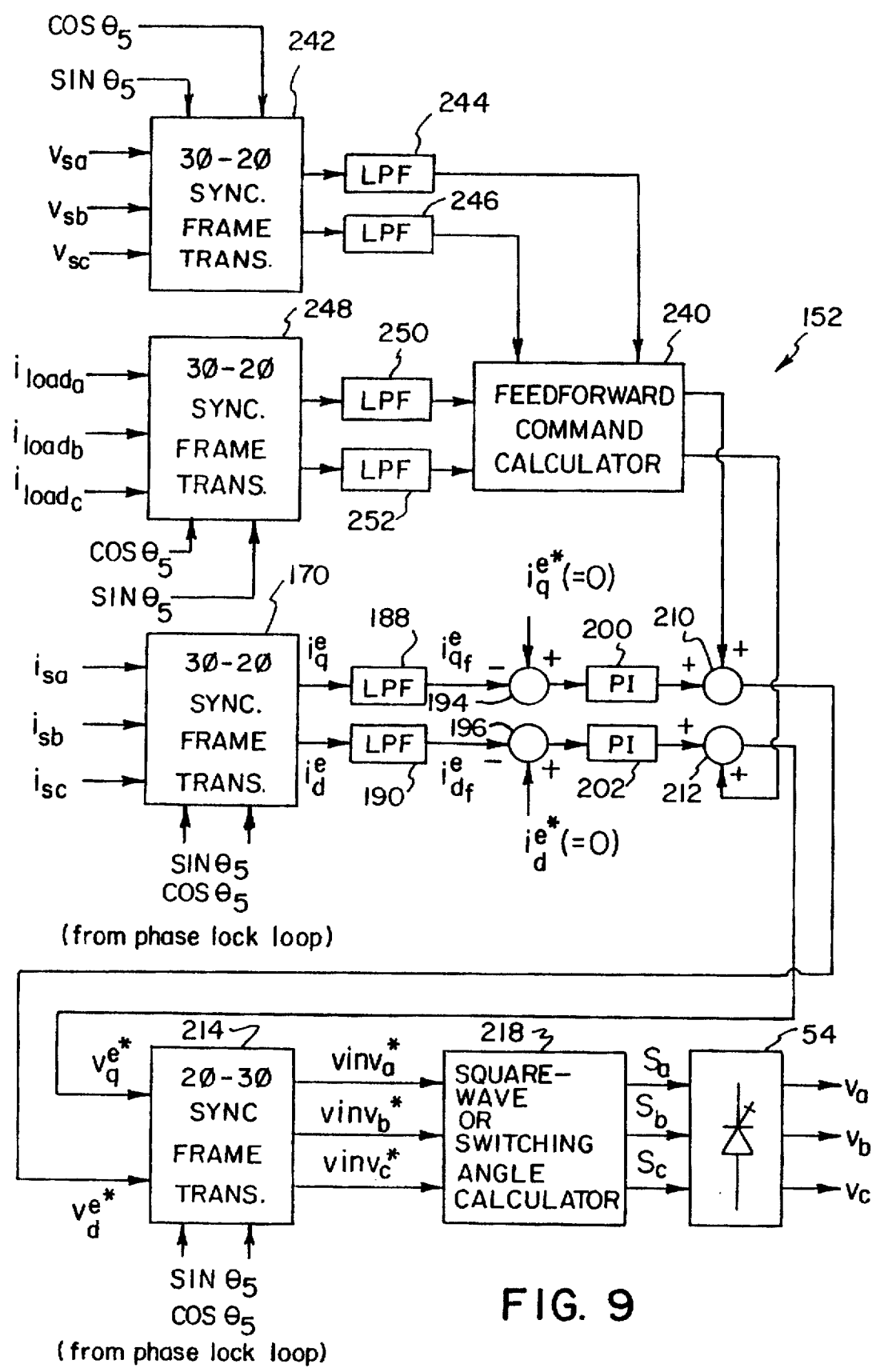
FIG. 9 is a block diagram of a synchronous reference frame based controller for the hybrid parallel active/passive filter system of the present invention.

As described previously, a similar SRF based controller topology to that illustrated in FIG. 9 may be used to control the active filter inverter 56 (see FIG. 4) to provide harmonic isolation and compensation at another dominant harmonic frequency, such as the seventh harmonic. In such a controller, the synchronous reference frame will rotate at the other dominant harmonic frequency. For example, at the seventh harmonic frequency, the synchronous reference frame will rotate at seven times the fundamental frequency. The SRF transformations are, therefore, achieved using $\sin\theta_7$ and $\cos\theta_7$ values to perform the three phase to two phase and two phase to three phase synchronous frame transformations. The heterodyning feature of the SRF based controller 152, whereby the dominant harmonic component of the measured source current is able to be extracted without any phase delay, allows effective use of PI based regulators 200 and 202 with zero steady state error. The controller 152 ensures harmonic isolation at the selected dominant harmonic frequency, and constrains all dominant harmonic frequency load current harmonics into the corresponding passive filter. Note that the controller topology 152 may be implemented using analog hardware, a combination of analog and digital hardware, or by a digital signal processor (DSP) or similar digital programmable device.

The operation of the feedforward command calculator 240 will now be described. The feed forward command calculator 240 provides feedforward command signals in the two phase synchronously rotating reference frame that are combined with the two-phase harmonic inverter voltage command signals generated by the PI regulators 200 and 202 (which are feedback control signals). The effect of the feedforward command signals is to more effectively control the active filter inverter 54 to more rapidly respond to harmonic distortions on the supply line 37, to thereby more effectively reduce harmonic distortion. It should be noted that the feed forward command calculator 240 is an optional feature of the harmonic controller 152, and may not be necessary in all applications, including high power applications of the hybrid parallel active/passive filter system 32. It should also be noted that various methods and structures may be employed to generate feedforward command signals. One such option is described in detail immediately below; another feedforward command generator topology will be described in detail later with respect to the active filter inverter controller of FIG. 21.

Figure 14:
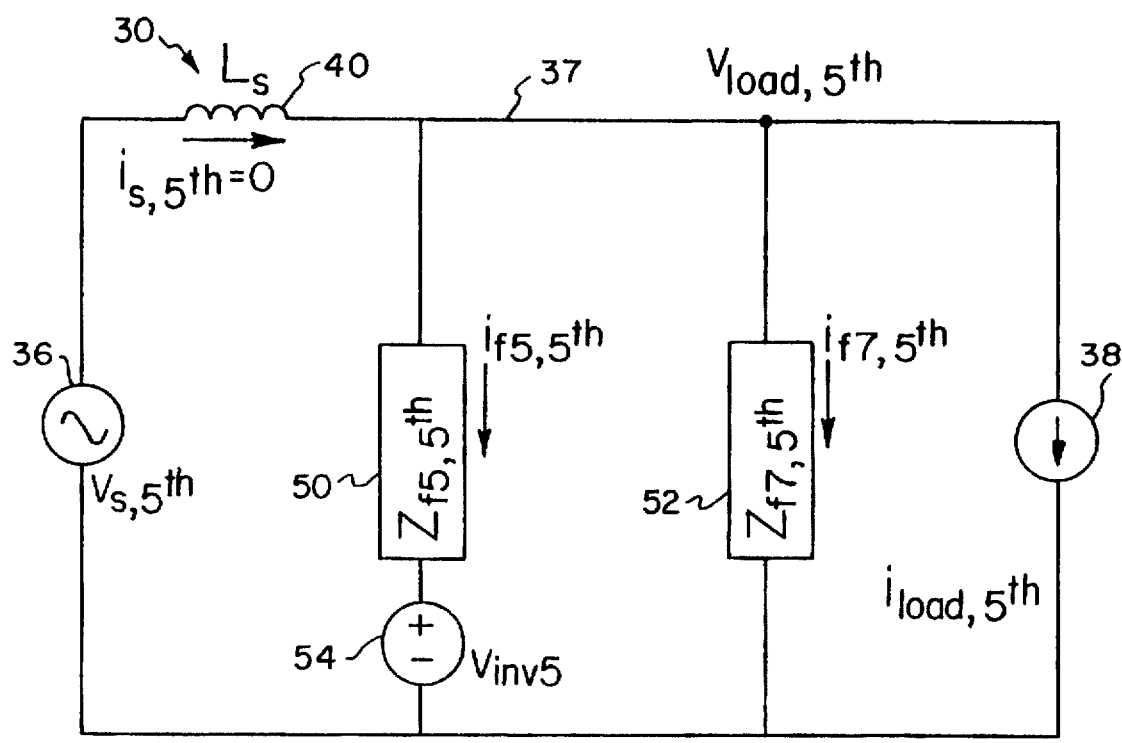
FIG. 14 is a schematic circuit diagram of a fifth harmonic equivalent circuit of a parallel hybrid active/passive filter system in accordance with the present invention as used to derive feedforward command signals for the active filter controller of FIG. 9.

Operation of the feedforward command calculator 240 may best be explained with reference to FIG. 14. Recall that a hybrid parallel active/passive filter system in accordance with the present invention is controlled by the SRF based controller 152 to achieve harmonic isolation at a selected dominant harmonic frequency. FIG. 14 illustrates a fifth harmonic equivalent circuit of the power system 30 illustrated in FIG. 4 under such harmonic isolation conditions. Under harmonic isolation, the fifth harmonic supply current, $i_{s5}=0$. The fifth harmonic current in the fifth harmonic passive filter 50, $i_{f5,5th}$, and the fifth harmonic current in the seventh harmonic passive filter, $i_{f7,5th}$, can be expressed in terms of the inverter voltage $v_{inv5}$ generated by the fifth harmonic active filter square wave inverter 54, and the fifth harmonic load current $i_{load,5th}$, by the following equations:

$$i_{f5,5th} = \frac{-Z_{f7,5th} i_{load,5th}}{Z_{f5,5th} + Z_{f7,5th}} - \frac{V_{inv5}}{Z_{f5,5th} + Z_{f7,5th}} \quad (6)$$

$$i_{f7,5th} = \frac{-Z_{f5,5th} i_{load,5th}}{Z_{f5,5th} + Z_{f7,5th}} + \frac{V_{inv5}}{Z_{f5,5th} + Z_{f7,5th}} \quad (7)$$

where:

$Z_{f5,5th}$ and $Z_{f7,5th}$ are the passive filter impedances at the fifth harmonic frequency for the fifth harmonic passive filter 50 and seventh harmonic passive filter 52, respectively. Thus, $$Z_{f5,5th} = r_5 + j\omega_5 L_{f5} + \frac{1}{j\omega_5 C_{f5}} \quad (8)$$

$$Z_{f7,5th} = r_7 + j\omega_5 L_{f7} + \frac{1}{j\omega_5 C_{f7}} \quad (9)$$

where $\omega_5$ is $-5\omega_e$ (five times the fundamental frequency), $r_5$ and $r_7$ are resistances of the fifth and seventh harmonic passive filters 50 and 52, respectively, $L_{f5}$ and $L_{f7}$ are the inductances 62 and 64 of the fifth and seventh harmonic passive filters 50 and 52, respectively, and $C_{f5}$ and $C_{f7}$ are the capacitances 58 and 60 of the fifth and seventh harmonic passive filters 50 and 52, respectively.

Harmonic isolation at the fifth harmonic frequency in the supply current $i_s$ is achieved in accordance with the present invention by controlling the inverter voltage $v_{inv5}$ such that the filter terminal voltage at the fifth harmonic frequency $V_{load,5th}$ tracks the source voltage at the fifth harmonic frequency $v_{s,5th}$. Thus, $$v_{load,5th} = v_{s,5th} = i_{f5,5th} Z_{f5,5th} + v_{inv5} \quad (10)$$

$$v_{inv5} = \left(1 + \frac{Z_{f5,5th}}{Z_{f7,5th}}\right)\left(v_{s,5th} + \frac{Z_{f5,5th} Z_{f7,5th}}{Z_{f5,5th} + Z_{f7,5th}} i_{load,5th}\right). \quad (11)$$

The inverter voltage for the seventh harmonic frequency active filter inverter 56 can be determined in a similar manner to be:

$$v_{inv7} = \left(1 + \frac{Z_{f7,7th}}{Z_{f5,7th}}\right)\left(v_{s,7th} + \frac{Z_{f5,7th} Z_{f7,7th}}{Z_{f5,7th} + Z_{f7,7th}} i_{load,7th}\right). \quad (12)$$

The active filter inverter voltages $v_{inv5}$ and $v_{inv7}$ derived in Equations 11 and 12 show the feasibility of achieving harmonic isolation at selected frequencies. The solutions for $v_{inv5}$ and $v_{inv7}$ may effectively be used as feedforward command signals, to be combined with the two phase harmonic inverter voltage command signals, to improve the dynamic response of the hybrid filter systems of the present invention. Note that in the simplified equivalent circuit of the power system 30, i.e., FIG. 14, a single point solution exists for inverter voltage amplitude and phase. For more complex systems, a more sophisticated optimal search algorithm may be used.

For the fifth harmonic active filter inverter controller 152, illustrated in FIG. 9, the feed forward command calculator 240 implements equation 11 to generate $v_{inv5}$ as feed forward command signals in the two phase synchronously rotating reference frame. Examination of equation 11 reveals that the fifth harmonic component of the supply voltage $v_{s,5th}$ and the fifth harmonic component of the load current $i_{load,5th}$ are required to generate the feed forward command $v_{inv5}$. These harmonic frequency component signal values may be derived using three phase to two phase synchronous frame transformations at the fifth harmonic frequency. Thus, measured three phase supply voltage values $v_{sa}$, $v_{sb}$, and $v_{sc}$ may be provided to a three phase to two phase synchronous frame transformation device 242. The three phase supply voltage values may be measured in a conventional manner. The synchronous frame transformation 242 converts the three phase supply voltage values into two phase synchronously rotating reference frame signal values at the fifth harmonic frequency using $\cos\theta_5$ and $\sin\theta_5$ signal values provided by the PLL 154 on the measured filter terminal voltage, and the look-up table 156. The fifth harmonic component of the supply voltage is thereby transformed into DC signal values in the two phase synchronously rotating reference frame that are, in turn, extracted by low pass filters 244 and 246 without any phase delay. The low pass filters 244 and 246 may be implemented in the manner described previously using maximally flat butterworth or switched capacitor low-pass filters. Alternatively, the fifth harmonic component of the supply voltage may be obtained by performing a Fast Fourier Transform on the measured supply voltage. Measured three phase load current values $i_{loada}$, $i_{loadb}$, and $i_{loadc}$ are provided to a three phase to two phase synchronous frame transformation device 248. The three phase load currents may be measured in a conventional manner using, for example, a current transformer or similar current measuring device. The three phase to two phase transformation 248 transforms the three phase load current signals into two phase synchronously rotating reference frame signal values at the fifth harmonic frequency using $\cos\theta_5$ and $\sin\theta_5$ values provided, for example, by the PLL 154 on the measured passive filter terminal voltage, and the look-up table 156. The synchronous reference frame transformation 248 transforms the fifth harmonic component of the load current into a DC signal in the two phase synchronously rotating reference frame. This DC component is extracted by low pass filters 250 and 252 without any phase delay. The low pass filters 250 and 252 may be implemented in the manner described previously, using maximally flat butterworth or switched capacitor low pass filters. The DC signals output from the low pass filters 244 and 246, and 250 and 252, corresponding to the fifth harmonic components of the source voltage and load current, respectively, are provided to the feedforward command calculator 240. The feedforward command calculator 240 generates the feed forward command voltage signal $v_{inv5}$ in accordance with Equation 11, using the supply voltage and load current harmonic component signal values. Note that in the simplified equivalent circuit (FIG. 14) of the power system 30, a single point solution exists for inverter amplitude and phase. For more complex systems, a more sophisticated optimal search algorithm may be required. In such a case, the feed forward command calculator 240 would generate the feed forward inverter voltage command signals based on the resulting, more sophisticated, solution for the fifth harmonic active filter inverter voltage $v_{inv5}$. The feedforward command calculator may be implemented in analog circuitry, using a digital processor, or with a combination of analog and digital circuitry.

In designing a hybrid parallel active/passive filter system that includes separate hybrid active filter branches for filtering more than one dominant harmonic frequency, it is important to ensure that circulating current does not overload the passive filters. In the hybrid parallel active/passive filter system application illustrated in FIG. 4, the circulating current refers to the harmonic currents between the fifth and seventh passive filters 50 and 52. When harmonic isolation at the fifth and seventh harmonic frequencies is achieved, the fifth harmonic current in the fifth and seventh harmonic passive filters 50 and 52 can be derived by substituting Equation 11 into Equations 6 and 7:

$$i_{f5,5th} = -i_{load,5th} - \frac{v_{s,5th}}{z_{f7,5th}} \quad (13)$$

$$i_{f7,5th} = \frac{v_{s,5th}}{z_{f7,5th}} \quad (14)$$

Similarly, the seventh harmonic current in the seventh and fifth harmonic passive filters 52 and 50 can be derived as follows:

$$i_{f7,7th} = -i_{load,7th} - \frac{v_{s,7th}}{z_{f5,7th}} \quad (15)$$

$$i_{f5,7th} = \frac{v_{s,7th}}{z_{f5,7th}} \quad (16)$$

The circulating fifth and seventh harmonic currents between the passive filter branches 50 and 52 can be clearly identified as $v_{s,5th}/z_{f7,5th}$ and $v_{s,7th}/z_{f5,7th}$, respectively, as a result of harmonic isolation under the presence of supply voltage harmonics given by $v_{s,5th}$ and $v_{s,7th}$.

Figure 15:
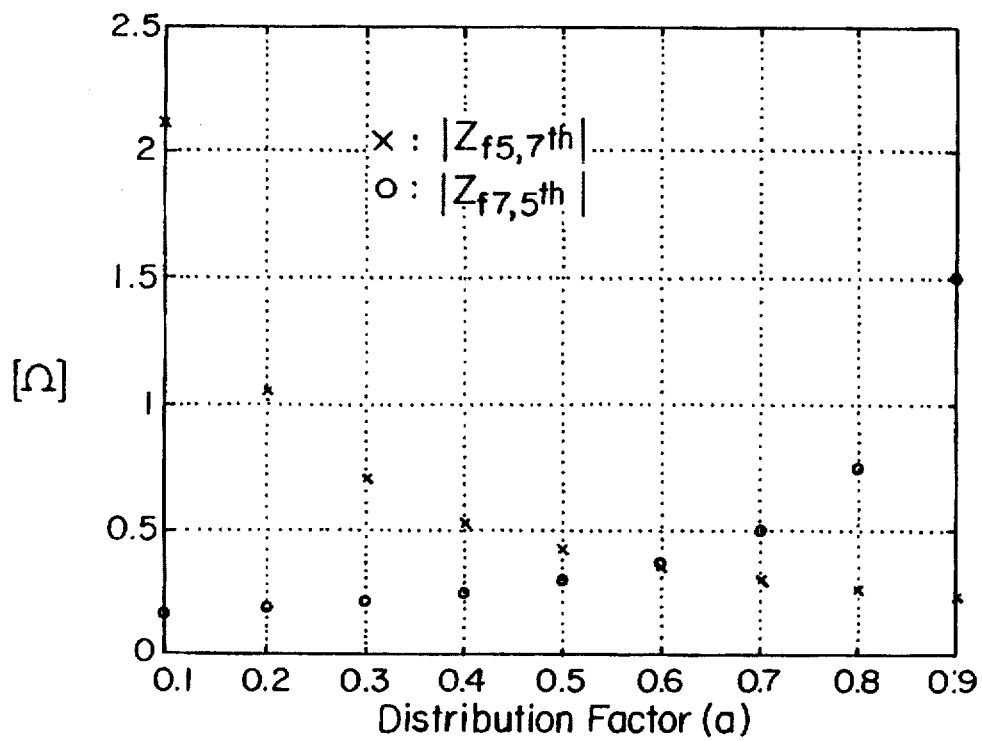
FIG. 15 is a plot of passive filter impedances versus capacitance distribution factor as used in selecting the impedance characteristics of passive filters to minimize total circulating current between parallel active/passive filter branches for harmonic isolation at different dominant harmonic frequencies and to minimize total active filter inverter ratings.

In the design of the fifth and seventh passive filters 50 and 52, the total capacitance is constrained by the fundamental reactive power requirement of the load 38. By distributing the capacitance in different ratios between the fifth and seventh passive filter branches 50 and 52, their impedance characteristics can be controlled with the objective of minimizing the total circulating current and active filter rating. FIG. 15 illustrates the seventh harmonic frequency impedance of the fifth harmonic passive filter 50, $z_{f5,7th}$, and the fifth harmonic frequency impedance of the seventh harmonic passive filter 52, $z_{f7,5th}$, versus different capacitance distribution ratios a between the fifth harmonic passive filter 50 and the seventh harmonic passive filter 52. To minimize circulating current, the fifth harmonic passive filter should exhibit high impedance at the seventh harmonic frequency, and vice-versa. To minimize active filter rating, the fundamental reactive filter current should be evenly distributed. Hence, the optimum solution is to equally distribute the capacitance between the passive filters, as illustrated in FIG. 15. Thus, the capacitance 58 of the fifth harmonic passive filter 50, $C_5 = a \times C_{total}$, and the capacitance 60 of the seventh harmonic passive filter 52, $C_7 = (1-a) \times C_{total}$, inductances 62 and 64, $L_{f5}$ and $L_{f7}$, of the fifth and seventh harmonic passive filters 50 and 52 are designed accordingly to tune the passive filters 50 and 52 at the fifth and seventh harmonic frequencies, respectively. In the preferred implementation of the system, the capacitances are distributed evenly with $a = 0.6$ to minimize the active filter inverter rating. This design approach also evenly distributes the reactive power compensation between the passive filter branches 50 and 52.

The exemplary parallel hybrid active/passive filter system application illustrated in FIG. 4 (without the optional high-pass passive filter branch 66) was simulated under various passive filter tuning and supply voltage harmonic distortion operating conditions. The active filter inverters 54 and 56, connected in series with the fifth and seventh harmonic passive filters 50 and 52, respectively, were simulated as square-wave inverters. The simulation did not include an inverter switching ripple filter. The system was simulated with a supply voltage of 480 volts, and a 515 kVA, 620 Amp (rms) thyristor rectifier front end load 38, with DC side inductance $L_{dc} = 250.0$ µH, capacitance $C_{dc} = 50$ mF, resistance $R_{dc} = 0.7\Omega$, and having a delay angle of 10°.

Passive filter capacitor and inductor components usually have tolerances of ±10%. Mis-tuned and tuned passive filter component values used for the simulations are presented in Table 1. The mis-tuned passive filter case is considered with +10% component tolerances.

TABLE 1

| Simulated Passive Filter Components | | | | | |
|---|---|---|---|---|---|
| $L_5$ (µH) | $C_5$ (µF) | $F_0$ | $L_7$ (µH) | $C_7$ (µF) | $F_0$ |
| mistuned | 297 | 1100 | 4.6 | 220 | 770 | 6.4 |
| tuned | 270 | 1000 | 5.0 | 200 | 700 | 7.0 |

$L_s = 100$ µH (8.4%),
$R_s = 2.0$ mΩ

As shown in Table 1, for the mistuned case, the fifth and seventh harmonic passive filters are mis-tuned to the 4.6 and 6.4 harmonic frequencies, respectively. The short circuit ratio (SCR) for the simulated circuit is 12, for which the IEEE 519 line current total harmonic distortion limit is 5%, with 4% limits on the fifth and seventh harmonics.

Figure 16A:
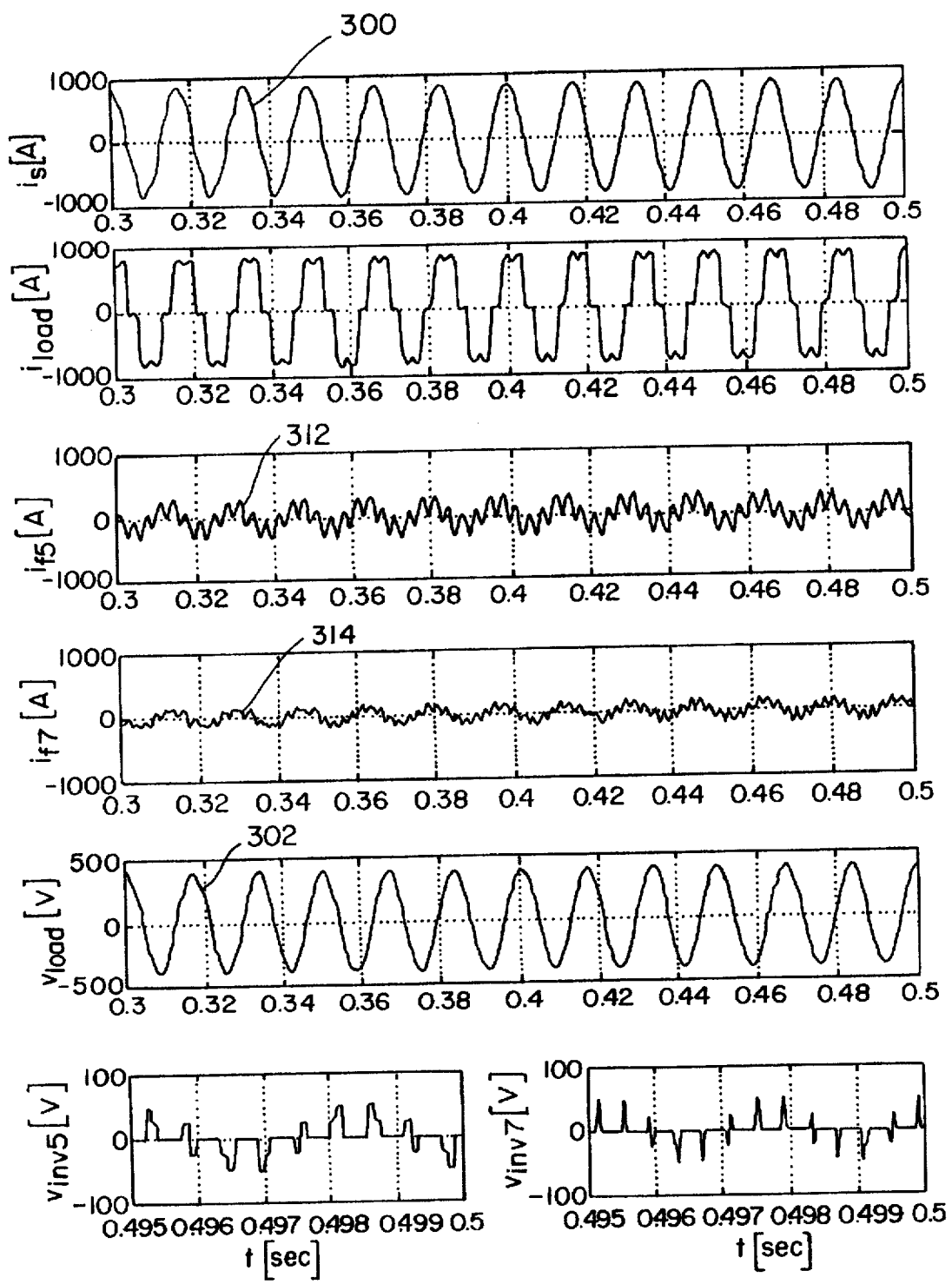
FIGS. 16(a) and 16(b) show graphs illustrating simulated voltage and current waveforms in the time domain and frequency domain, respectively, for operation of a hybrid parallel active/passive filter system in accordance with the present invention using the controller of FIG. 9 under mis-tuned passive filter conditions without supply voltage harmonic distortion.
Figure 16B:
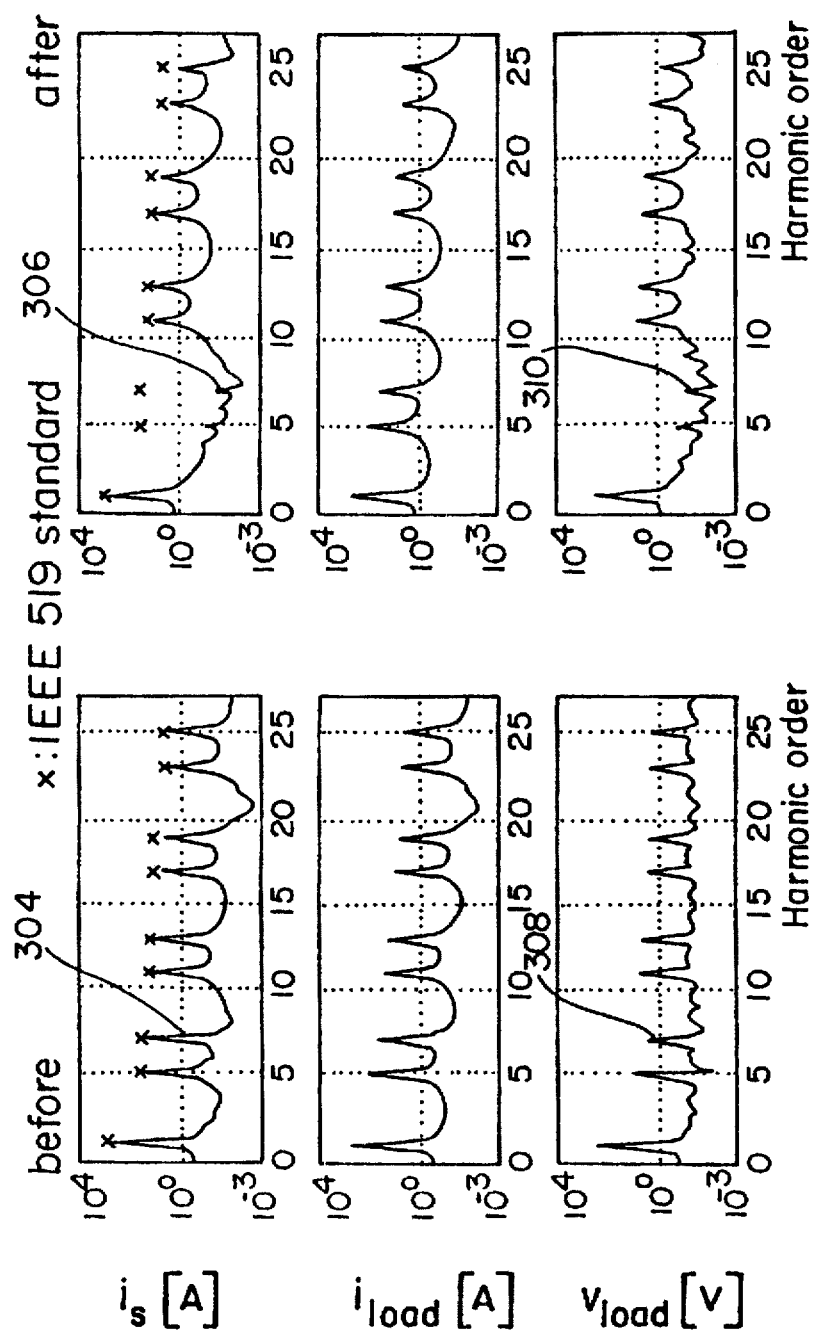

Time domain waveforms and frequency domain spectra of voltages and currents from the simulation of the exemplary hybrid filter application of FIG. 4, without supply voltage harmonics and with mis-tuned passive filters, are shown in FIGS. 16(a) and 16(b), respectively. Mis-tuning of the passive filters reduces the effectiveness of the passive filters 50 and 52 for harmonic compensation. This results in a supply current $i_s$ total harmonic distortion of 8.6% before the active filter inverters 54 and 56 are started at time t=0.35 seconds (waveform 300). This also results in a higher load voltage $v_{load}$ total harmonic distortion of 5.1% before the active filter inverters 54 and 56 are started (waveform 302). After the active filter inverters 54 and 56 are started, harmonic isolation is achieved between the supply 36 and load 38 at the fifth and seventh harmonics, as shown by the before and after supply current and load voltage spectra illustrated at 304, 306, 308, and 310, respectively. Thus, with the active filter inverters 54 and 56 in operation, $v_{load,5th} = v_{s,5th} = 0$ and $v_{load,7th} = v_{s,7th} = 0$. During inverter operation, the voltages across the DC buses of the active filter inverters 54 and 56 are 75V.

The effect of harmonic isolation in accordance with the present invention in the absence of supply voltage harmonics results in tuning of the passive filters 50 and 52, and provides the base case simulation results. The fifth and seventh harmonic filter currents $i_{f5}$ and $i_{f7}$, (waveforms 312 and 314) have fundamental reactive current in addition to harmonic currents, and hence the passive and active filter components should be rated appropriately.

During operation of the active filter inverters 54 and 56, the supply current total harmonic distortion is reduced to 3.5%, which is within IEEE 519 limits of 5% THD. The load voltage THD is 4.4%, and is primarily due to higher ($\geq$ 11th) load harmonics in the passive filters 50 and 52. Since the active filters 54 and 56, preferably implemented by square-wave inverters, in this case generate only fifth and seventh harmonic voltages, they do not influence the higher order ($\geq$ 11th) harmonic currents in the supply line 37 or in the passive filters 50 and 52. The higher order harmonic load currents are divided in the passive filters 50 and 52, and the supply 36, by their relative impedances. Note that the passive filters 50 and 52 may be designed with the objective of supplying the reactive power demand of the load 38, so as to achieve unity displacement power factor, and also to attenuate higher order ($\geq$ 11th) harmonics in the supply line 37 to comply with IEEE 519 line current harmonic limits.

Figure 17A:
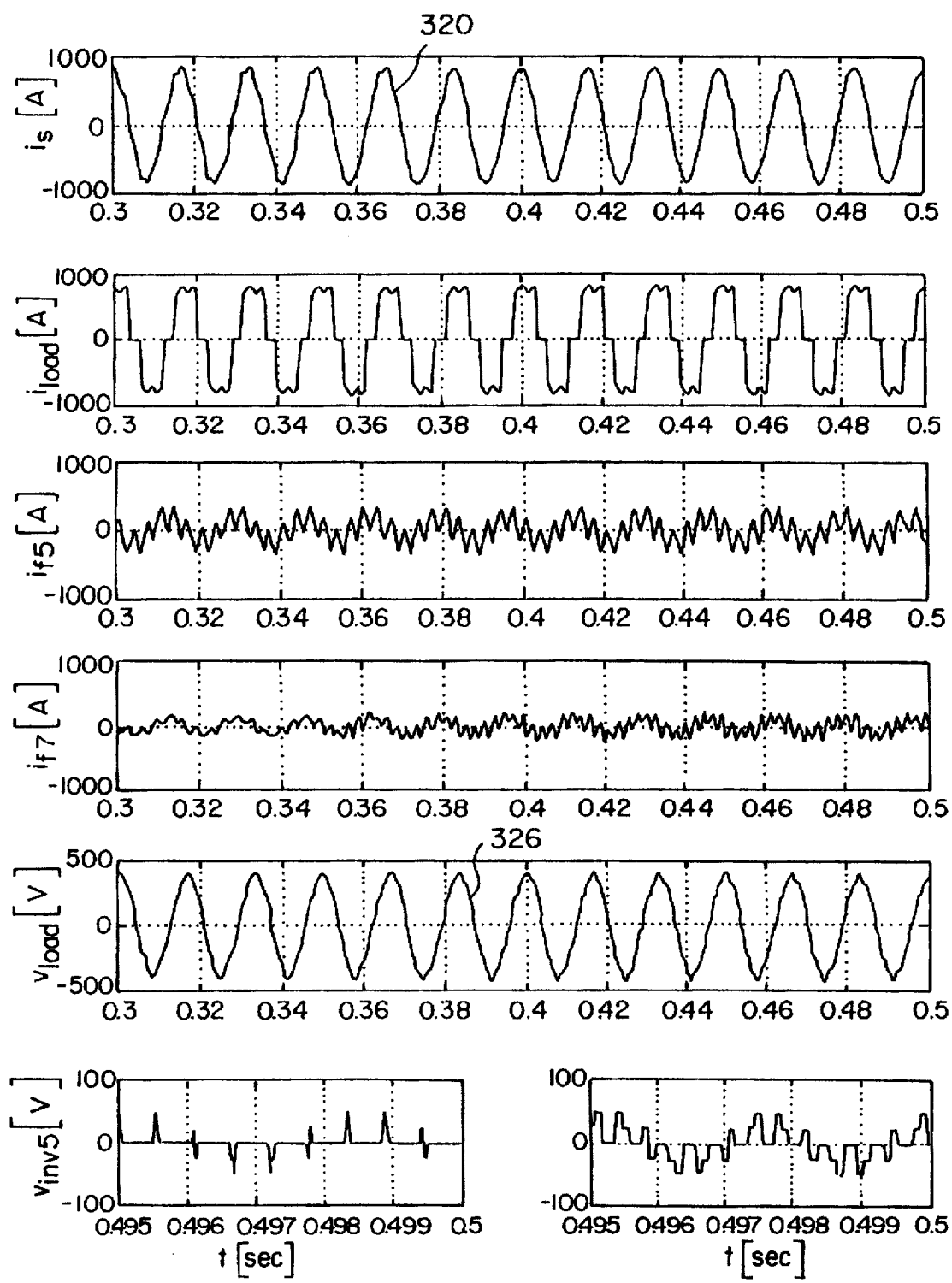
FIGS. 17(a) and 17(b) show graphs illustrating simulated voltage and current waveforms in the time domain and frequency domain, respectively, for operation of a hybrid parallel active/passive filter system in accordance with the present invention using the controller of FIG. 9 under mis-tuned passive filter and supply voltage harmonic distortion conditions.
Figure 17B:
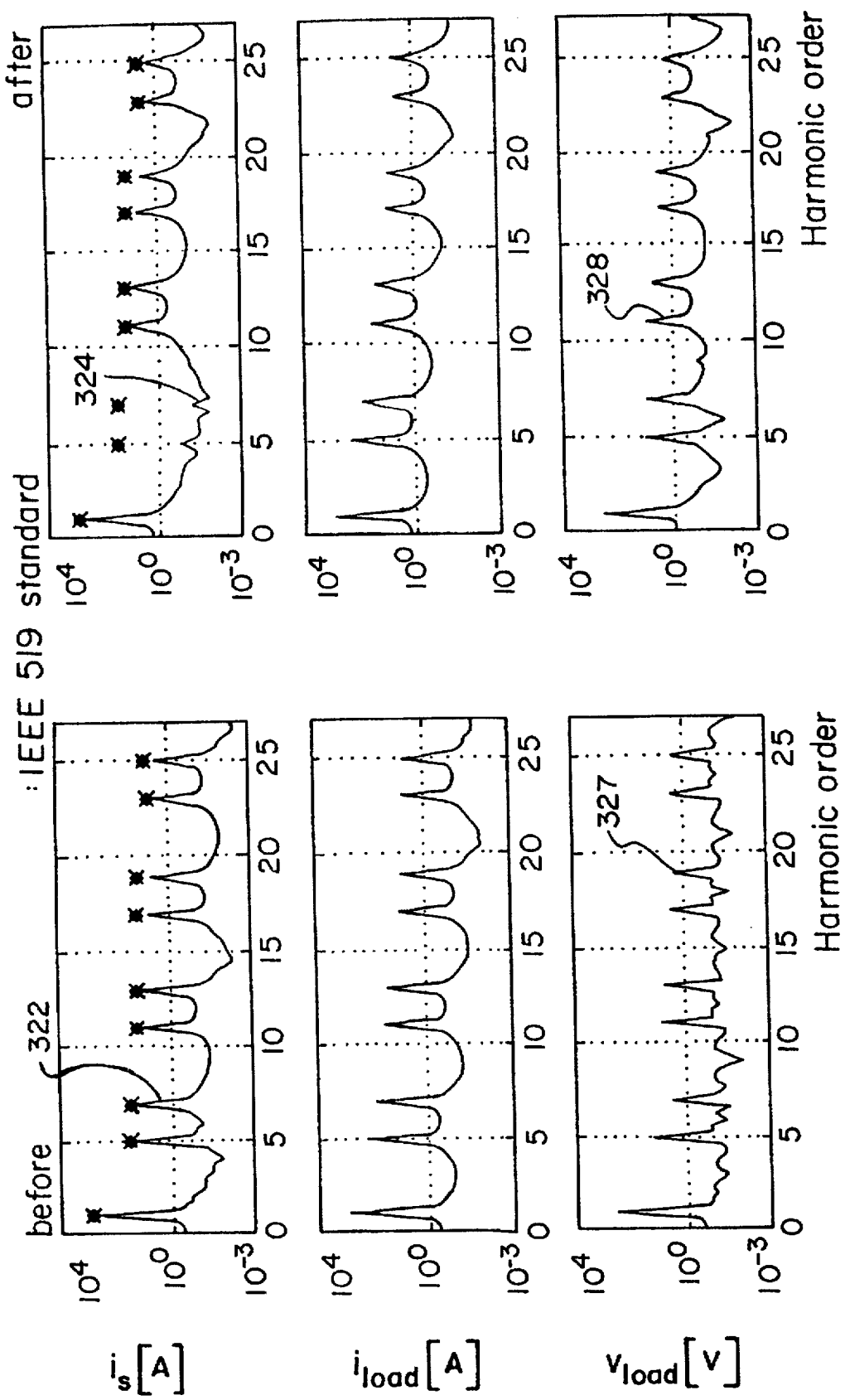

Time domain waveforms and frequency domain spectra of voltages and currents from the simulation of the same circuit simulated with respect to FIGS. 16(a) and 16(b), but with 3% fifth and seventh harmonic supply voltage distortions along with the mis-tuned passive filters, are shown in FIGS. 17(a) and 17(b), respectively. The simulation results illustrated in FIGS. 16(a) and 16(b) showed that mis-tuned passive filters 50 and 52 alone will result in supply current distortion. In the presence of supply voltage harmonics, the supply current $i_s$ THD is 7.7% before the active filter inverters 54 and 56 are started at time t=0.35 seconds (waveform 320). Mere tuning of the passive filters 50 and 52 by active filter inverters 54 and 56 will not be sufficient to guarantee harmonic isolation, as supply voltage harmonics will cause overloading of the passive filters 50 and 52. The SRF based controller of the present invention, however, achieves harmonic isolation by regulating the fifth and seventh supply current harmonics to zero, thereby constraining all of the fifth and seventh load current harmonics into the passive filters 50 and 52, as shown by the spectrum of the supply current $i_s$ before and after the active filter inverters 54 and 56 are started (illustrated at 322 and 324, respectively). After the active filter inverters 54 and 56 are started, at time t=0.35 seconds, the supply current THD is reduced to 3.6%, which is within IEEE 519 limits. During operation of the active filter inverters 54 and 56, the voltages across the DC buses of the active filter inverters are 75 V.

The active filter inverters 54 and 56 achieve harmonic isolation by injecting fifth and seventh harmonic voltages onto the supply line 37, to track the supply voltage harmonics, in addition to tuning of the passive filters. Hence, the load voltage $v_{load}$ THD increases from 5.6% to 6.3% after the active filter inverters 54 and 56 are started (waveform 326, spectra 327 and 328). Higher ($\geq$ 11th) load current harmonics in the passive filters 50 and 52 also contribute to load voltage distortion. This can be reduced by increasing passive filter capacitance. However, assuming that there is already sufficient capacitance in the filters to provide fundamental reactive power compensation, increasing the capacitance above this amount to deal with higher order harmonics introduces a tradeoff between the high-pass impedance characteristics and fundamental reactive power compensation provided by the passive filters.

Based on the foregoing simulation results, inverter ratings for the active filter square-wave inverters 54 and 56 were determined. Active filter inverter ratings of 1.5% of load kVA for the fifth harmonic active filter inverter 54, and 1.8% of load kVA for the seventh harmonic active filter inverter 56, were determined based on the product of rms filter current and rms active filter inverter voltages provided by the simulation under conditions of 3% of fifth and seventh supply voltage harmonics. Thus, the ratings of the active filter square-wave inverters for both dominant harmonic frequencies are less than 2%. To achieve harmonic isolation in accordance with the present invention, the active filter inverter voltages are required to track the supply voltage harmonics, which determines the active filter inverter ratings. For mis-tuned passive filters 50 and 52; the degree of mis-tuning from nominal values determines the active filter inverter ratings. For mis-tuned passive filters with supply voltage harmonics, the active filter inverter rating is given by their combined effect. The small active filter inverter ratings that may be achieved using a hybrid parallel active/passive filter system in accordance with the present invention make practically viable harmonic isolation of 1-50 MW or higher non-linear loads. The hybrid parallel active/passive filter system of the present invention can also be applied for harmonic filtering in HVDC applications. Based on these simulation results, for harmonic isolation of a 50 MW non-linear load, with 3% fifth and seventh supply voltage harmonics, square-wave inverters rated at 750 kVA and 900 kVA are required in series with +10% mis-tuned fifth and seventh passive filters 50 and 52, respectively.

Figure 18A:
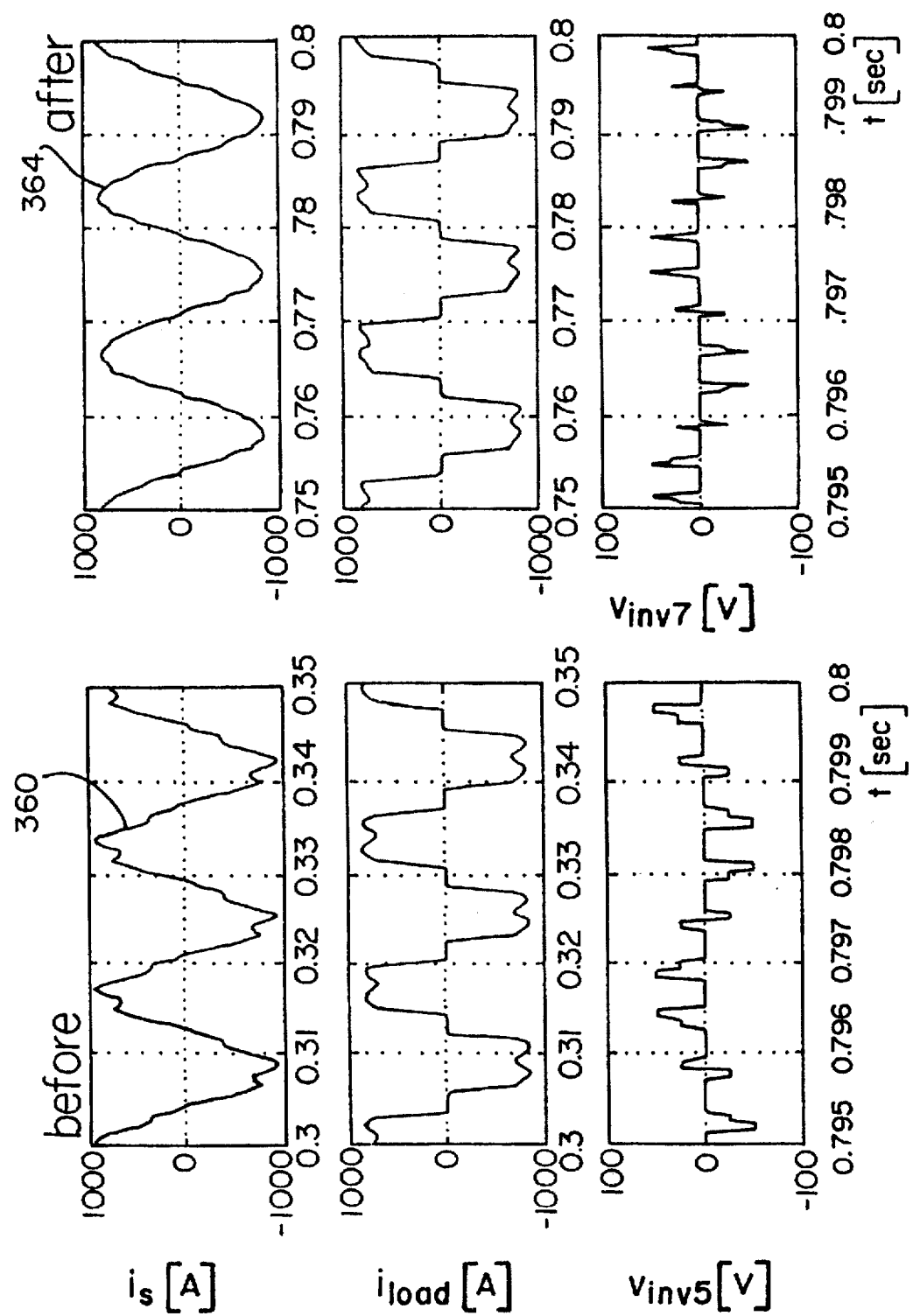
FIGS. 18(a) and 18(b) show graphs illustrating simulating voltage and current waveforms in the time domain and frequency domain, respectively, for operation of a hybrid parallel active/passive filter system in accordance with the present invention using the controller of FIG. 9 under supply voltage harmonic distortion conditions with tuned passive filters.
Figure 18B:
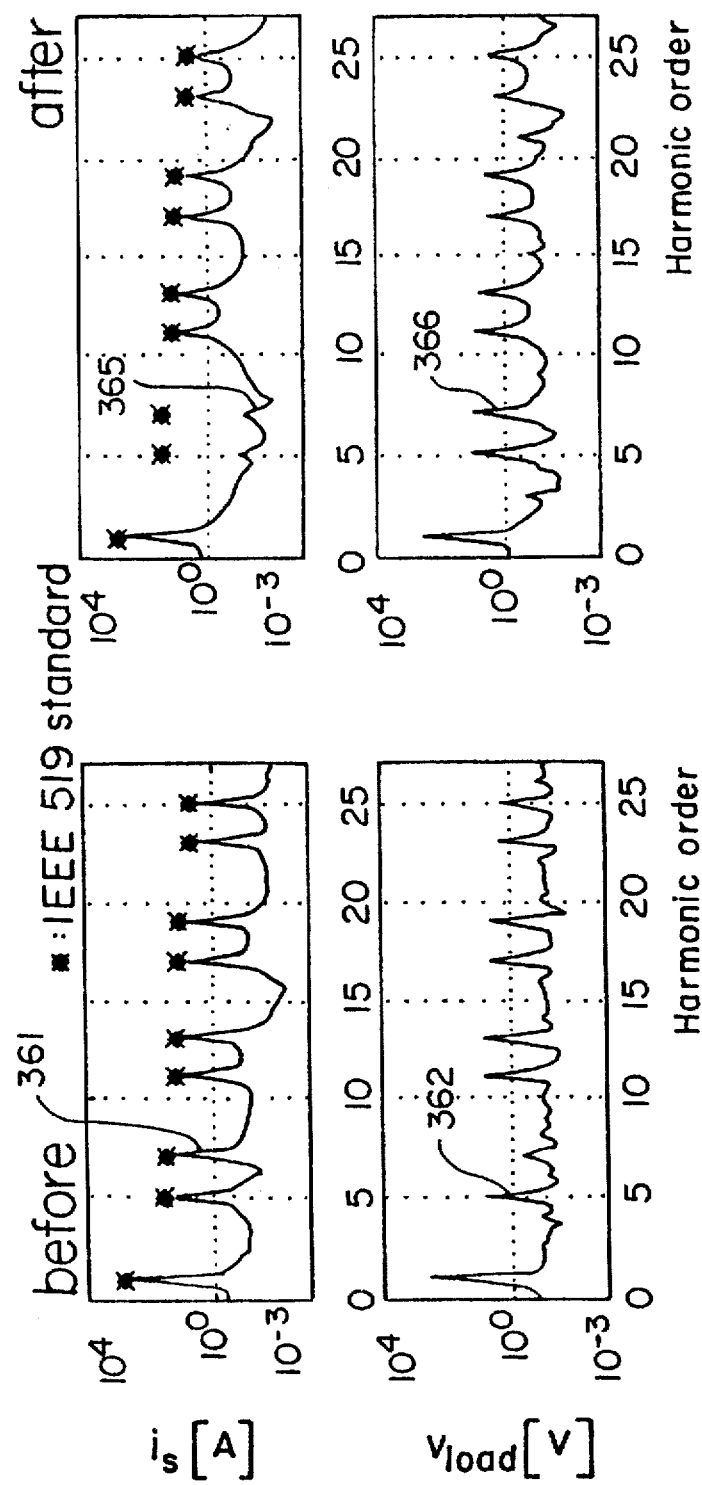

Time domain waveforms and frequency domain spectra of voltages and currents for simulation of the hybrid filter application of FIG. 4, with tuned passive filters and 3% of fifth and seventh supply voltage harmonics, are illustrated in FIGS. 18(a) and 18(b), respectively. These simulation results show supply current $i_s$ THD of 12.6% (waveform 360, spectra 361) and load voltage $v_{load}$ THD of 4.5% (spectra 362) before the active filter inverters 54 and 56 are started. After the active filter inverters 54 and 56 are started, the SRF based controller 152 regulates the fifth and seventh supply current harmonics to zero by generating inverter voltages to track the supply voltage harmonics. Thus, the supply current $i_s$ at the fifth and seventh harmonics is regulated to zero, and the supply current THD is reduced from 12.6% to 3.3% after the active filter inverters are started (waveform 364, spectra 365). The load voltage $v_{load}$ spectrum 366 shows the increase in the fifth and seventh harmonic voltage components that is employed to counteract the supply voltage harmonics. Hence, load voltage $v_{load}$ THD increases from 4.5% to 6.0% after the active filter inverters 54 and 56 are started.

The foregoing simulation results illustrate that the objective of harmonic isolation is achieved by a hybrid parallel active/passive filter system in accordance with the present invention under any supply, passive filter, or load conditions. In the absence of supply voltage harmonics; the active filter inverters 54 and 56 are controlled to achieve tuning of the passive filters 50 and 52 by regulating the dominant supply current harmonics to zero. This method of controlling the active filter inverters also serves the harmonic isolation function of isolating load current harmonics from the supply line 37. Hence, the present invention achieves both harmonic isolation and harmonic compensation. This is in contrast with previously known parallel hybrid active/passive filter systems that provide harmonic compensation by tuning of the passive filters by regulating dominant load voltage harmonics to zero. These systems are not effective if supply voltage harmonic distortion exists.

The alternative hybrid parallel active/passive filter system topology of FIG. 7 was also simulated. The simulation circuit model employed is presented in FIG. 19. In this simulated hybrid parallel active/passive filter system 140, the passive filter is realized by a simple and cost-effective power factor correction capacitor 142. The active filter 82, in series with the passive filter capacitor 142, is implemented by a 5 kHz, PWM voltage source inverter (VSI). The active filter inverter 82 is controlled to achieve harmonic isolation in the supply current at both the fifth and seventh dominant harmonic frequencies. A PWM inverter is preferred for this topology, because the inverter 82 has to simultaneously produce fifth and seventh harmonic voltages in response to fifth and seventh harmonic inverter voltage command signals. The inductance 370 in the hybrid filter 140 represents the output inductance of the active filter inverter 82, and includes the leakage inductance of a coupling transformer (not shown) that couples the active filter inverter 82 in series with the passive filter capacitor 142. The simulated PWM VSI inverter 82 did not include a switching ripple filter at the inverter output.

The hybrid parallel active/passive filter 140 is simulated as being installed on the high voltage (primary) side of a rectifier transformer 372 which provides isolation between the hybrid filter 140 and the load 38. The transformer 372 also enables use of a lower filter inductance value $L_f$, by reducing the voltage notching effect at the passive filter terminal voltage $v_{load}$. This facilitates use of a larger power factor correction capacitor 142, for required reactive power demand of the load 38.

The short circuit ratio (SCR) of the simulated system is 17. The corresponding IEEE 519 supply current THD limit is 5%, with 4% harmonic current limits on the fifth and seventh harmonics. The simulated supply 36 is the same as for the previously described simulations, with 3% of fifth and seventh supply voltage harmonic distortion. The load 38 includes a 360 kVA, 433 Amp (rms); thyristor rectifier based front-end 42, with $L_{dc}$=250.0 µH, $C_{dc}$=50 mF, and $R_{dc}$=1.0Ω. The delay angle is 30°. The power factor correction capacitor 142 is 1700 µF, with the effective filter inductance $L_f$=200 µH. A source inductance $L_s$=100 µH, with a source resistance of $R_s$=2.0 mΩ. $X_{transformer}$=11.8%.

Figure 19:
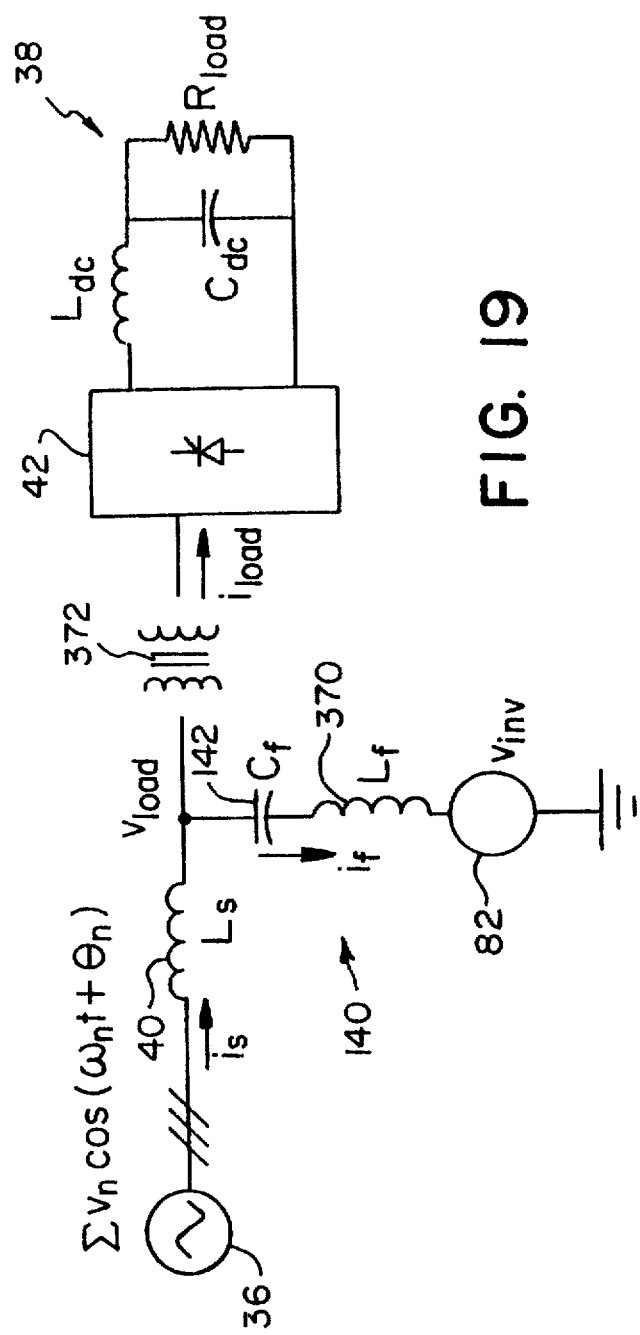
FIG. 19 is a schematic circuit diagram of a simulation model for the alternative topology hybrid parallel active/passive filter system of FIG. 7.
Figure 20A:
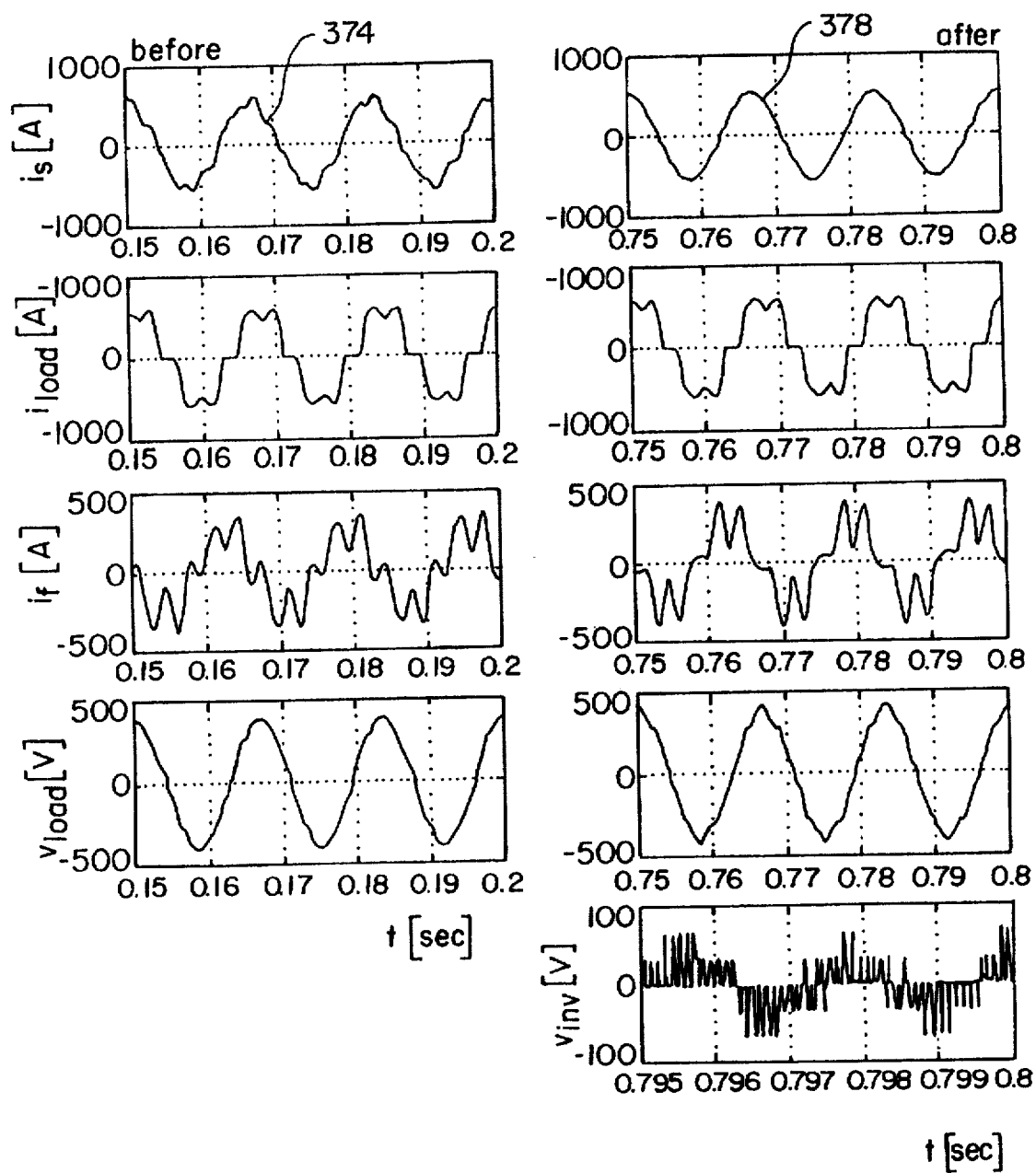
FIGS. 20(a) and 20(b) show graphs illustrating simulated voltage and current waveforms in the time domain and frequency domain, respectively, for operation of the simulation model of FIG. 19 under supply voltage harmonic distortion and load current harmonic conditions.
Figure 20B:
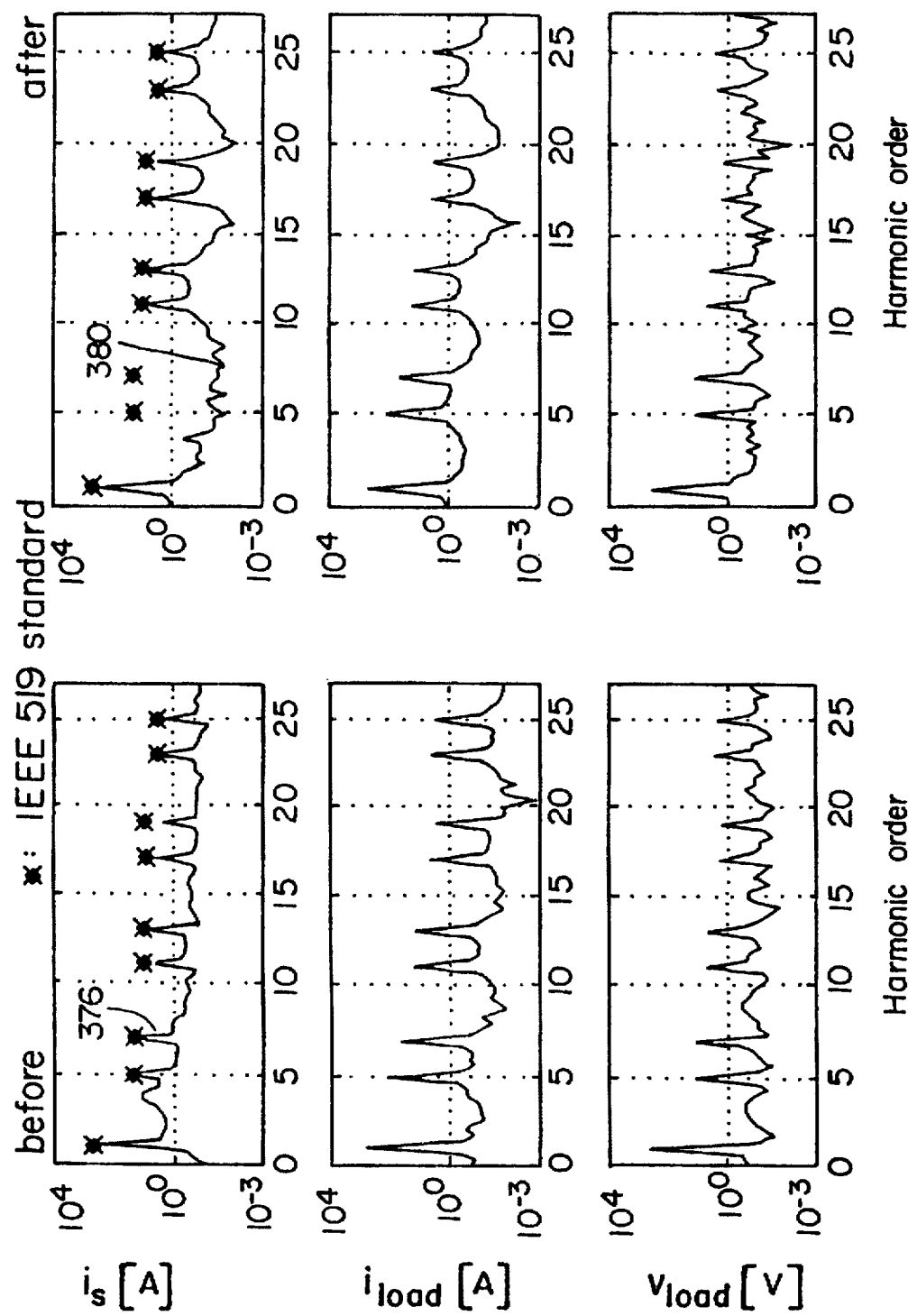

FIGS. 20(a) and 20(b) show time domain waveforms and frequency domain spectra, respectively, for simulation of the alternative hybrid active/passive filter circuit topology of FIG. 19. Waveforms and spectra on the left side of FIGS. 20(a) and 20(b) are for operation of the circuit before the active filter inverter 82 is started, with the waveforms and spectra on the right side of these figures for operation of the circuit after the active filter inverter 82 has been started.

Before the active filter inverter 82 is started, the supply current $i_s$ is distorted due to the supply voltage distortion and load harmonic currents (waveform 374). The fifth and seventh harmonic component in the supply current $i_s$ exceeds the IEEE 519 limits before the active filter inverter 82 is started, as shown in spectrum 376.

After the active filter inverter 82 is started, the fifth and seventh harmonic components in the supply current $i_s$ are suppressed significantly by the harmonic isolator action of the active filter inverter 82 (waveform 378, spectrum 380). The higher order harmonics ($\geq$11th) are attenuated by the high pass power factor correction capacitor passive filter 142 to meet IEEE 519 limits at PCC. The THD improves from 23.1% before the active filter inverter 82 is started, to 3.3% after the active filter inverter 82 is started. The nominal DC bus voltage of the PWM VSI inverter 82 is 100 V.

Control of square-wave active filter inverters to achieve harmonic isolation in accordance with the present invention requires that the inverter DC bus voltage, from which the inverter voltage signal is synthesized, be maintained. For PWM inverters a constant DC bus voltage must be maintained. For square wave inverters the DC bus must be controlled to provide the required inverter output voltage. This may be achieved in a conventional manner using an input rectifier voltage supply to provide the DC bus voltage. However, in the preferred embodiment of a hybrid parallel active/passive filter system in accordance with the present invention, a DC bus control scheme that achieves power balancing of the DC bus is employed. In accordance with the present invention, power balancing of the DC bus is achieved by exchanging energy at the fundamental frequency and at the dominant harmonic frequency that is being filtered, e.g., the fifth harmonic for the fifth harmonic active filter 54. This DC bus control scheme is different from previously known DC bus control schemes used in parallel active filters and other hybrid active filter systems such as hybrid series active filter systems. In previous systems, the DC bus voltage is maintained by generating either a fundamental current in phase with the fundamental voltage across the active filter inverter or by generating a fundamental voltage output by the active filter inverter in phase with the fundamental current through the active filter inverter to provide the required real power to compensate for the losses of the inverter. Hence, in these previously known system topologies, real power flow occurs only at the fundamental frequency. In a hybrid parallel active/passive filter system in accordance with the present invention, however, there is preferably a real power flow due to the interaction (product) of the dominant harmonic frequency current and the harmonic frequency voltage signal generated by the active filter.

DC bus control to achieve power balancing of the DC bus will be described with reference to an active filter inverter 54 operating at the fifth harmonic frequency. It should be understood that a very similar control scheme may be employed for active filter inverters operating at other dominant harmonic frequencies for which harmonic compensation and isolation is required.

In accordance with the present invention, and as described previously, the active filter inverter 54 generates a harmonic voltage signal so as to achieve harmonic isolation between the supply 36 and the load 38. This causes real power flow into the inverter at the dominant harmonic frequency which charges/discharges the inverter DC bus voltage across the DC bus capacitor 160. This real power flow into the inverter 54, due to the product of the dominant harmonic frequency voltage and current in the filter branch, cannot be actively controlled, and hence requires balancing by real power at some other frequency. This real power balancing cannot be achieved at any other selected dominant harmonic frequency because of the resulting conflict in attempting to control an inverter at the other harmonic frequency to provide power balancing while simultaneously attempting to achieve the primary function of harmonic isolation at the other dominant harmonic frequency. Attempted real power balancing at other harmonic frequencies will also result in supply current harmonics. Hence, the function of balancing the DC bus is preferably achieved only at the fundamental frequency.

In accordance with the present invention, the active filter inverter 54 is controlled to generate a fundamental frequency voltage in phase with the fundamental frequency current in the filter 32 to achieve real power balancing, and to compensate for the losses of the inverter. The harmonic isolation function of the hybrid filter system 32 is not affected by adding a fundamental voltage in the inverter output because the fundamental frequency voltage signal generated is independent of the harmonic frequency voltage signal generated by the active filter inverter 54. This control scheme for the operation of a hybrid parallel active/passive filter system in accordance with the present invention eliminates the need for any energy storage device or additional power supply to support the inverter DC bus in such systems. This is a key advantage of a hybrid parallel active/passive filter system in accordance with the present invention over previous hybrid parallel active filter systems that require DC energy storage devices or additional power supplies for the DC bus, and that also cannot achieve harmonic isolation in the presence of supply voltage distortion. The injection of a fundamental voltage signal onto the power supply line 37 has no significant effect on the reactive power compensation of the system because the injected voltage is very small compared to the fundamental voltage across the passive filter capacitor 58.

Figure 21A:
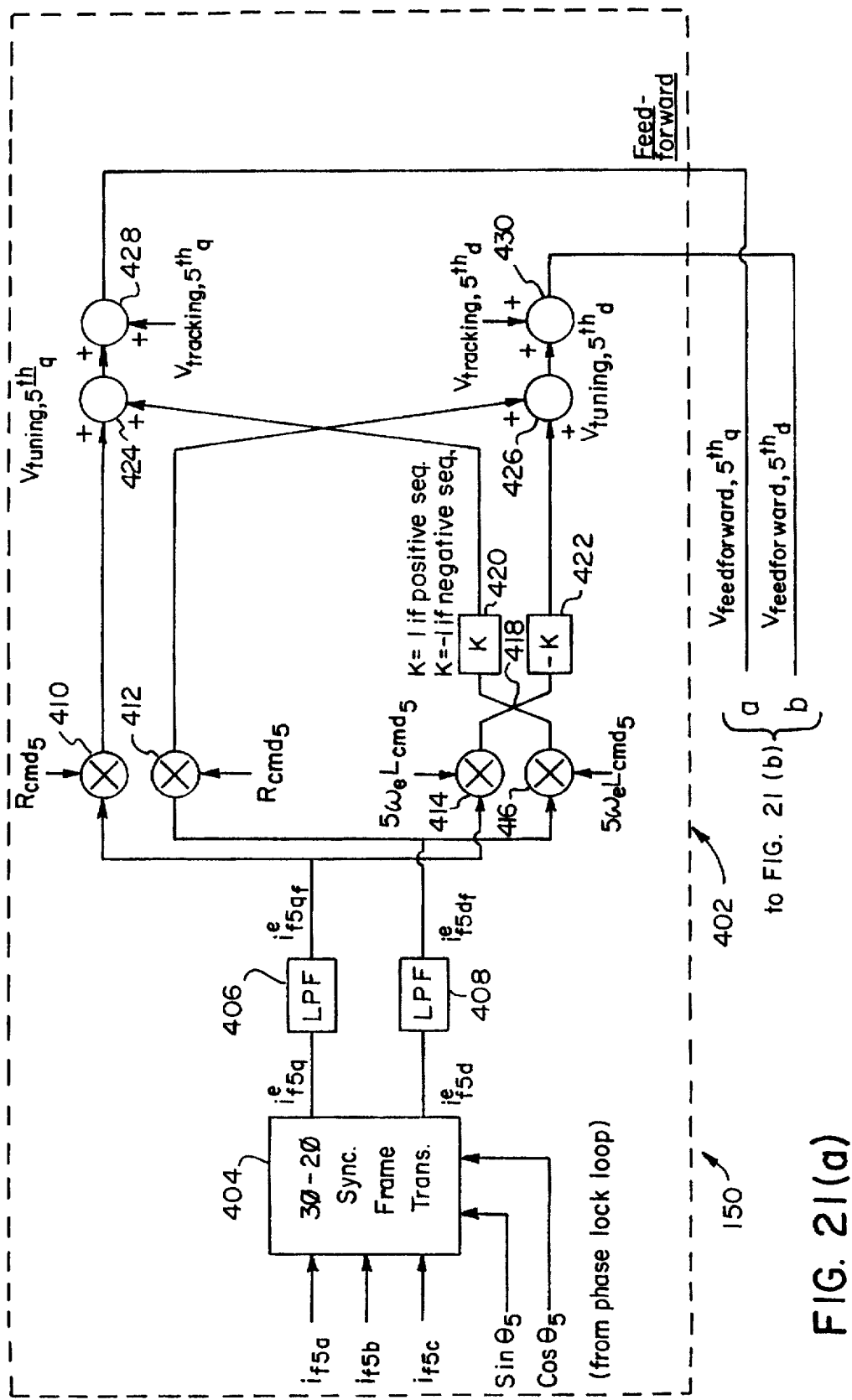
FIG. 21 is a block diagram of a synchronous reference frame based controller for a hybrid parallel active/passive filter system in accordance with the present invention, including DC bus control elements.
Figure 21B:
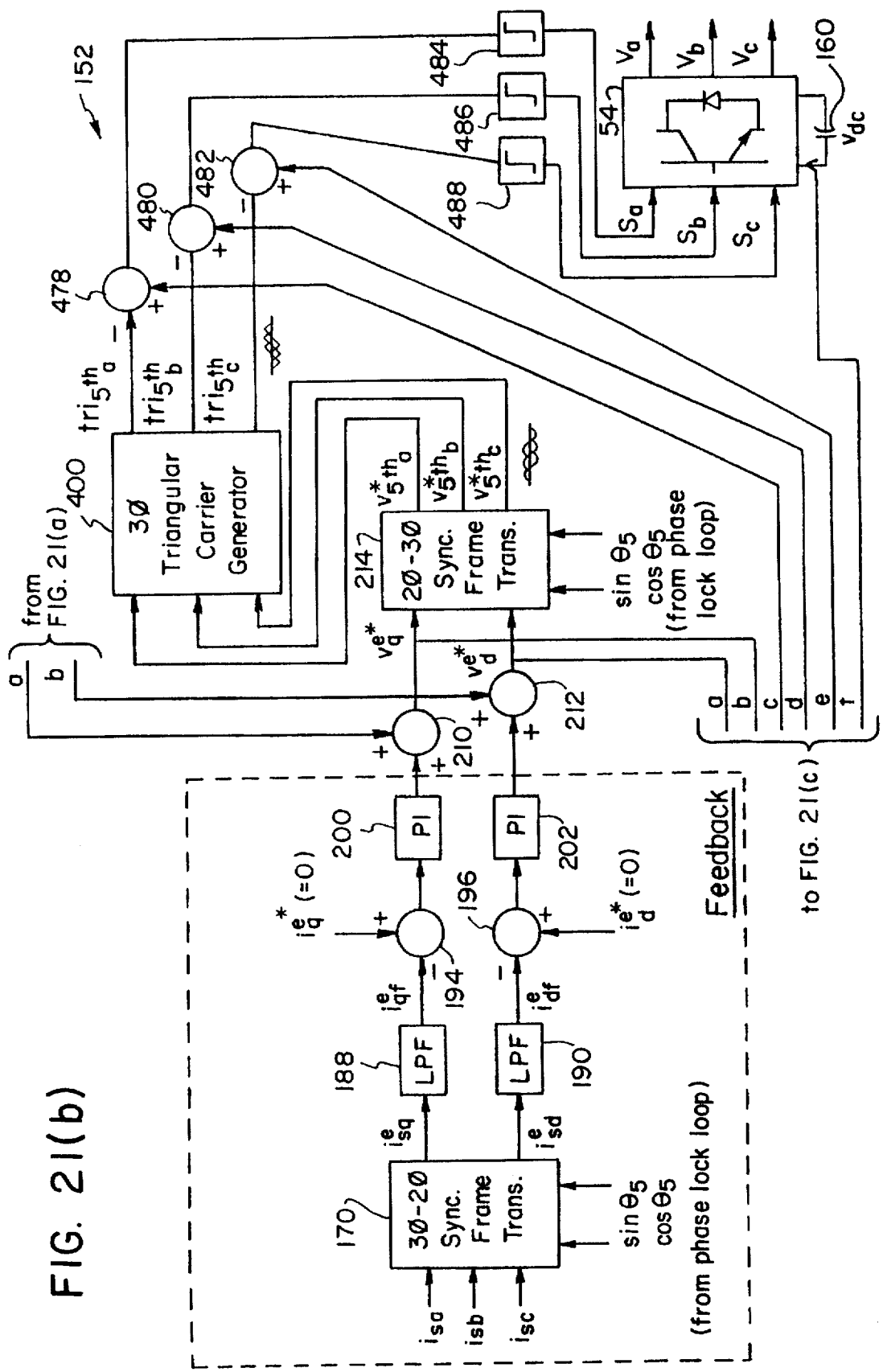
Figure 21C:
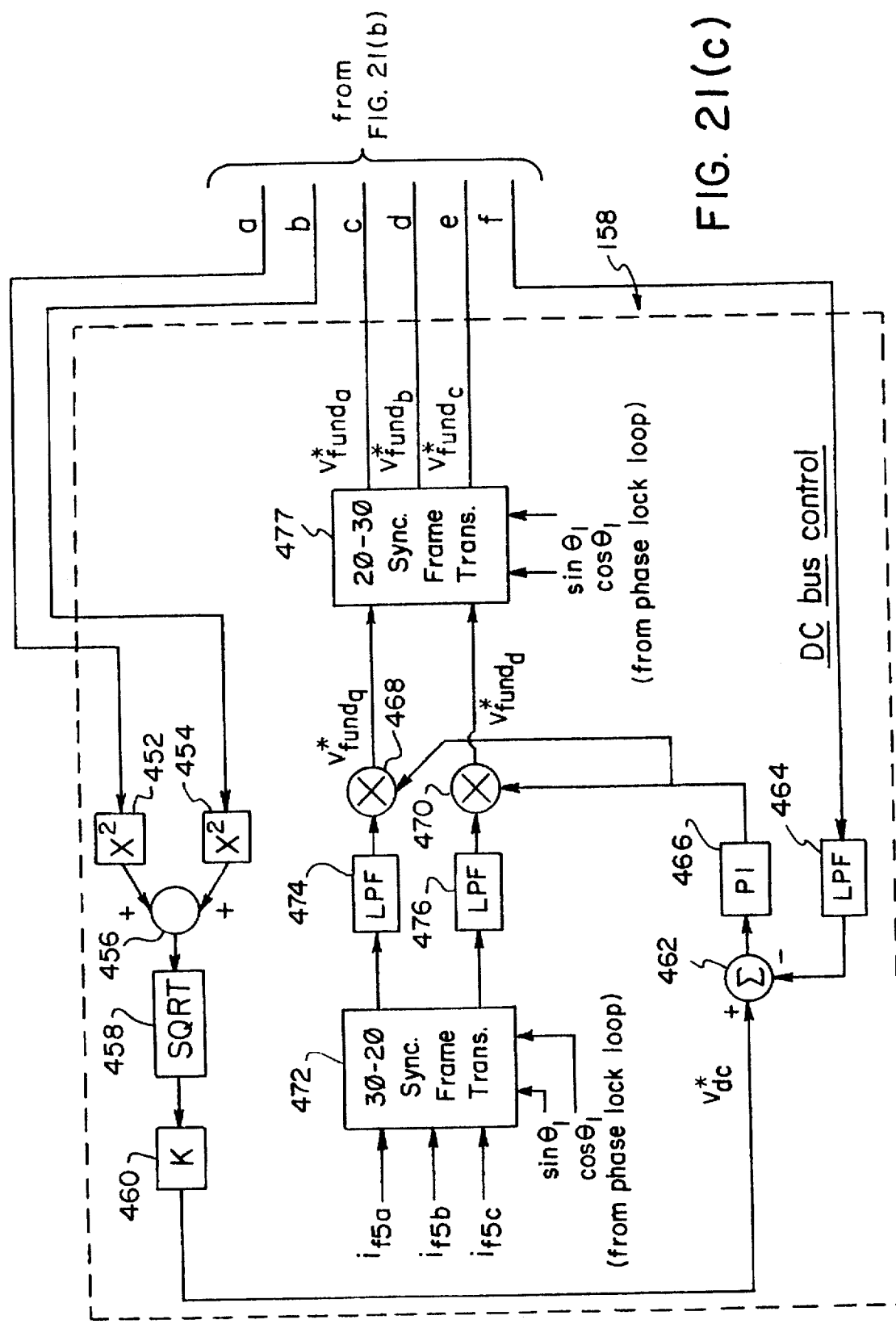

An SRF based controller 150 for controlling the active filter inverter 54 to achieve power balancing of the inverter DC bus in accordance with the present invention is illustrated in FIG. 21. The SRF based controller 150, includes harmonic controller 152 and DC bus controller 158 elements to control the active filter inverter 54 to provide harmonic isolation and compensation at the dominant harmonic frequency as well as DC bus control. Control of the active filter inverter 54 to provide harmonic compensation and isolation is provided by the harmonic SRF controller components 152, which, as described previously, includes feedback control and, optionally, feedforward control elements. The operation of the feedback control elements were described previously with respect to FIG. 9. As described previously, the three phase supply currents $i_{sa-c}$ are measured and transformed into two-phase synchronously rotating reference frame signals at the fifth harmonic frequency by the three-phase to two-phase synchronous frame transformation 170. This transforms the fifth harmonic component of the supply current into a DC signal value that is extracted by low pass filters 188 and 190. The supply current harmonic error signals generated by taking the difference 194 and 196 between the filtered DC signal values $i_q^e$ and $i_d^e$, corresponding to the fifth harmonic current component, and the reference values $i_q^{e*}$ and $i_d^{e*}$, which are set to zero, are applied to the PI regulators 200 and 202. The PI regulators 200 and 202 generate harmonic inverter voltage command signals $V_q^{e*}$ and $V_d^{e*}$ in the two-phase synchronously rotating reference frame. The harmonic inverter voltage command signals correspond to the active filter inverter voltage signal that will be generated to achieve harmonic isolation. The two phase harmonic inverter voltage command signals are transformed into three-phase inverter voltage command signals $V_{stha}^*$, $V_{sthb}^*$ and $V_{sthc}^*$ in the three-phase reference frame by three-phase to two-phase synchronous frame transformation 214 at the dominant (fifth) harmonic frequency. Three phase carrier waveforms, $tri_{stha}$, $tri_{sthb}$, and $tri_{sthc}$, may be generated from the three phase harmonic inverter voltage command signals by a three phase triangular waveform carrier generator 400. The three phase carrier waveforms $tri_{stha-c}$ are triangular waveforms phase-shifted from each other by 120° and synchronized 180° out of phase to the fifth harmonic inverter voltage command signals.

Feedforward command signals may be combined with the two phase harmonic inverter voltage command signals at summing junctions 210 and 212. As described previously, the use of feedforward command signals is an optional feature that enhances the performance of the harmonic controller 152. It should be noted that the feedforward command signal generator described previously with respect to FIG. 9 may not appropriately be used with the SRF controller including DC bus control in accordance with the present invention of FIG. 21. However, the feedforward command signal generator 402 to be described with reference to the controller of FIG. 21 may be used in the controller structure described previously with respect to FIG. 9, wherein a DC bus controller 158 of the type to be described is not used.

Figure 22:
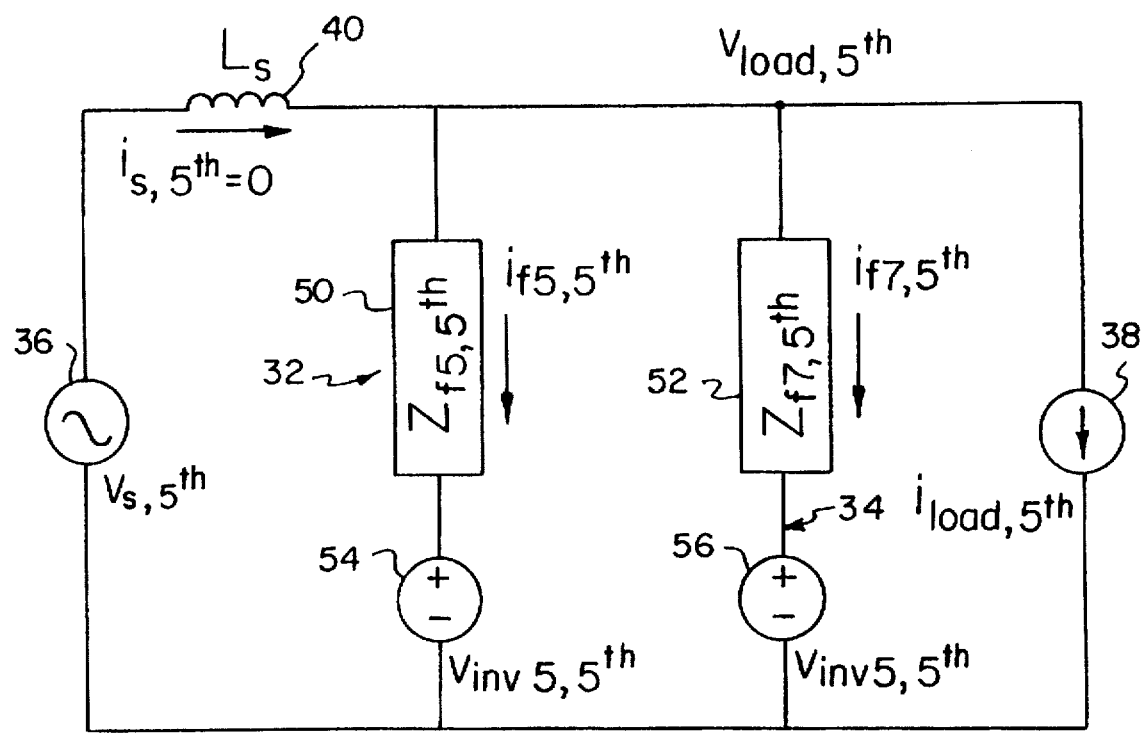
FIG. 22 is a schematic circuit diagram of a fifth harmonic equivalent circuit of a parallel hybrid active/passive filter system in accordance with the present invention as used to derive feedforward command signals for the active filter controller of FIG. 21.

Operation of the feedforward command signal generator 402 illustrated in FIG. 21 may best be described with reference to FIG. 22, which is a fifth harmonic frequency equivalent circuit of the hybrid parallel active/passive filter application of FIG. 4. With reference to the equivalent circuit at the fifth harmonic frequency of FIG. 22, if harmonic isolation is achieved, $i_{s,5th}=0$, the fifth harmonic filter current can be expressed as:

$$i_{f5,5th} = \frac{-Z_{f7,5th} i_{load,5th}}{Z_{f5,5th}+Z_{f7,5th}} + \frac{-V_{inv5,5th}+V_{inv7,5th}}{Z_{f5,5th}+Z_{f7,5th}} \tag{17}$$

where $Z_{f5,5th}$ and $Z_{f7,5th}$ are the passive filter impedances at the fifth harmonic frequency of the fifth harmonic passive filter 50 and seventh harmonic passive filter 52, respectively, as defined previously in equations 8 and 9. Note that, for a typical 60 Hz system, $\omega_5 = -300 \times 2\pi$ (or $\omega_5 = 5\omega_e$, where $\omega_e$ represents the fundamental frequency). A negative value is used because the fifth harmonic current generated by the rectifier load 38 is in negative sequence. $V_{inv5,5th}$ and $V_{inv7,5th}$ represent the fifth harmonic voltage components of the fifth and seventh harmonic active filter inverters 54 and 56. Equation 17 shows that supply voltage harmonics $V_{s,5}$ do not affect filter current harmonics $i_{f5,5th}$ under conditions of harmonic isolation. The current rating of the passive filter components will thus be independent of the supply voltage harmonics if harmonic isolation between the supply and the load can be achieved.

To prevent harmonic current from flowing into the supply 36, the fifth harmonic voltage at the load terminal, $v_{load,5th}$, has to track the supply harmonic voltage $v_{s,5th}$. Thus:

$$v_{load,5th}=v_{s,5th}=i_{f5,5}Z_{f5,5th}+v_{inv5,5th}, \tag{18}$$

$$v_{inv5,5th}=v_{s,5th}-i_{f5,5}Z_{f5,5th}. \tag{19}$$

Based on equations 17–19, the inverter voltage required for achieving harmonic isolation is derived:

$$V_{inv5,5th} = \left(1 + \frac{Z_{p5,5th}}{Z_{f7,5th}}\right)(V_{s,5th}) + Z_{p5,5th}i_{load,5th} + \frac{-Z_{p5,5th}}{Z_{f7,5th}} V_{inv7,5th}. \quad (20)$$

Equation 20 shows the feasibility of achieving harmonic isolation with the hybrid parallel active/passive filter system of the present invention. It also indicates that the seventh harmonic active filter inverter voltage at the fifth harmonic frequency $V_{inv7,5th}$ does not have significant effect on the harmonic isolation if the fifth harmonic passive filter impedance $Z_{p5,5th}$ is small.

Feedforward control may be used to improve overall inverter control in two respects. Feedforward control may be used to correct mis-tuning of the passive filter 50, as well as to provide improved tracking of the supply voltage harmonics to achieve harmonic isolation.

The first component of the feedforward controller provides tuning of the passive filter 50. Equation 20 indicates that tuning the passive filter ($Z_{p5,5th}$=0) can isolate the side-band voltage $V_{inv7,5th}$ of the active filter inverter 56 of the other filter branch. The tuning voltage command signal $V_{tuning,5}$ is preferably based on controlling the active filter inverter 54 to provide an active impedance at the selected dominant harmonic frequency to compensate for mis-tuning of the passive filter elements. The concept of using an active impedance for such purpose, along with a controller topology and control method for implementing the active impedance concept, is described in more detail in U.S. patent application Ser. No. 08/609,445, by Po-Tai Cheng, et al., entitled "Hybrid Parallel Active/Passive Filter System with Dynamically Variable Inductance", the disclosure of which is hereby incorporated by reference. In such a control system, active impedance commands are generated and used to generate control signals for controlling an active filter inverter to tune the impedance of a parallel connected passive filter at a selected harmonic frequency. In accordance with the present invention, active impedance commands are used to generate tuning voltage command signals $V_{tuning,5}$ at the selected dominant harmonic frequency. In accordance with the present invention, active inductance command $L_{cmd5}$, and active resistance command $r_{cmd5}$ are calculated from the load terminal voltage component $V_{load,5}$ and the filter current component $i_{f5,5}$ at the selected dominant harmonic frequency. These harmonic voltage and current component signals may be obtained from measured values of the three phase load voltage and filter currents that are transformed to two phase synchronously rotating reference frame signal values at the selected dominant harmonic frequency in the manner described previously herein. Thus:

$$L_{cmd5} = -IM\left[\frac{V_{load,5q}^{th} - j \times V_{load,5d}^{th}}{i_{f5,q}^{th} - j \times i_{f5,d}^{th}}\right] \times \frac{1}{\omega_5}, \quad (21)$$

$$r_{cmd5} = -RE\left[\frac{V_{load,5q}^{th} - j \times V_{load,5d}^{th}}{i_{f5,q}^{th} - j \times i_{f5,d}^{th}}\right]. \quad (22)$$

Note that the active impedance commands $L_{cmd5}$ and $r_{cmd5}$ are calculated before the active filter inverters 54 and 56 are started.

Given the active impedance commands, the desired tuning voltagee required to be synthesized by the active filter inverter 54 to tune the passive filter 50 to the fifth harmonic frequency, may be calculated as:

$$V_{tuning,5th} = L_{cmd5}\frac{di_{f5,5th}}{dt} + r_{cmd5}i_{f5,5th}. \quad (23)$$

Equation 23 is implemented by the feedforward command generator circuit 402 illustrated in FIG. 21. Measured three phase filter currents $i_{f5a-c}$ are transformed into two phase synchronously rotating reference frame values $i_{f5q}^e$ and $i_{f5d}^e$, at the fifth harmonic frequency, by three phase to two phase synchronous frame transformation 404. The three phase filter currents may be measured in a conventional manner using, for example, a current transformer, etc. The three phase to two phase transformation 404 may be accomplished in the manner described previously with respect to FIG. 1, using $sin\theta_5$ and $cos\theta_5$ signal values provided by a PLL 154 on the filter terminal voltage and look-up table 156. The fifth harmonic component of the measured filter current, which has been transformed into a DC signal value by the three phase to two phase transformation 404, is extracted without time delay in the manner described previously by low pass filters 406 and 408. Equation 23 is implemented by first simply multiplying the active resistance command $r_{cmd5}$ by the extracted fifth harmonic component of the filter current at junctions 410 and 412. The differentiation required by Equation 23 may be achieved by first multiplying the active inductance command signal $L_{cmd5}$, multiplied by five times the fundamental frequency $5\omega_e$, with the fifth harmonic component of the measured filter current at junctions 414 and 416. The differentiation is then effectively achieved by exchanging 418 the two phase d-q signal quantities, and multiplying the results by a constant K or -K 420 and 422. The constant K will be 1 for positive sequences and -1 for negative sequences. Since the fifth harmonic frequency is a negative sequence, in this case, K=-1. It is apparent that the exchange of the two phase d-q values in combination with the multiplication by K and -K values effects a 90-degree phase shift of the two-phase signal quantities, thereby, in combination with multiplication by the frequency $5\omega_e$, effecting the required differentiation of the filter current fifth harmonic component.

The active inductance command multiplied by the effectively differentiated fifth harmonic component of the filter current is combined with the active resistance command multiplied by the fifth harmonic component of the filter current at summing junctions 424 and 426 to produce the tuning voltage command signal $V_{tuning,5th}$ as defined by equation 23. It is apparent that the structure described for synthesizing the tuning voltage command signal $V_{tuning,5}$ implements the following equation:

$$V_{tuning,5}^k = (r_{cmd5} + j\omega_5 \times L_{cmd5})(i_{f5,5}^k - j \times i_{f5,5}^k). \quad (24)$$

By injecting the tuning voltage $V_{tuning,5th}$, via the active filter inverter 54, any mis-tuning of the passive filter 50 will be corrected. Thus, the fifth harmonic side band voltage $V_{inv7,5th}$ of the seventh harmonic active filter inverter 56 will not affect the harmonic isolation at the fifth harmonic frequency.

The second component of the feedforward controller 402 provides improved tracking of the supply voltage harmonics. The fifth harmonic current in the supply can be eliminated if $V_{load,5}=V_{s,5}$. A tracking voltage command signal $V_{tracking,5th}$ can be set equal to the supply voltage at the fifth harmonic frequency $V_{s,5th}$ to achieve the desired harmonic isolation. The supply voltage harmonic $V_{s,5}$ does not vary rapidly and thus may be obtained by performing a Fast Fourier Transform (FFT) analysis on the voltage measured at the PCC transformer terminal using a digital signal processor (DSP). Alternatively, the fifth harmonic component of the source voltage may be obtained by transforming the measured three phase supply voltage into two phase synchronously rotating reference frame signals at the fifth harmonic frequency, thereby transforming the fifth harmonic component of the supply voltage to a DC value, and then low pass filtering to extract the fifth harmonic component of the supply voltage.

The tuning voltage command signals $v_{tuning,5th}$ and the tracking voltage command signals $v_{tracking,5th}$ are added together at summing junctions 428 and 430 to form the feedforward command signals $v_{feedforward,5th}$ for the harmonic controller 152. The feedforward command signals are combined with the feedback control signals at summing junctions 210 and 212 to form the two phase inverter voltage command signals $v_q^{e*}$ and $V_d^{e*}$.

A DC bus voltage reference signal $V_{dc}^*$ is derived from the harmonic inverter voltage command signals $V_q^{e*}$ and $V_d^{e*}$ in the two phase synchronously rotating reference frame. The DC bus voltage reference signal $v_{dc}^*$ is derived from the required 5th harmonic voltage magnitude. The DC bus voltage reference signal $v_{dc}^*$ may thus be derived by calculating the magnitude of the two phase harmonic inverter voltage command signals $v_q^{e*}$ and $v_d^{e*}$. The inverter voltage command signals $V_q^{e*}$ and $V_d^{e*}$ are squared at 452 and 454, the squared signals are summed at 456, and the square root of the sum is taken at 458. The squaring 452 and 454, summing 456, and square root 458 functions may be implemented in a conventional manner using analog or digital circuitry, including the use of commercially available integrated circuit components to perform the squaring and square root functions. The result is the magnitude of the two-phase harmonic inverter voltage command signals that may be multiplied by a scaling factor constant K at 460 to derive the DC bus voltage reference signal $V_{dc}^*$.

The DC bus voltage reference signal $V_{dc}^*$ is compared at a summing junction 462 with a measured signal value corresponding to the actual DC bus voltage. The measured DC bus voltage signal may be obtained in a conventional manner by measuring the voltage across the DC bus capacitor 160, and filtering the measured signal using a low pass filter 464 to eliminate unwanted noise from the measured voltage signal. The difference between the DC bus voltage command $V_{dc}^*$ and the measured DC bus voltage, the DC bus voltage error, is provided to a DC bus controller PI regulator 466. The output of the DC bus controller PI regulator 466 is a DC bus voltage command signal. The DC bus voltage command signal is multiplied at junctions 468 and 470 with signals corresponding to the fundamental frequency component of the current in the hybrid filter 32.

The fundamental frequency component of the filter current is derived from measured three phase filter currents $i_{psa}$, $i_{psb}$ and $i_{psc}$, through, in this case, the fifth harmonic hybrid filter 32. The three phase filter currents may be measured in a conventional manner using, for example, a current transformer. The three phase measured filter current signals are transformed by a three-phase to two-phase synchronous frame transformation 472 into two phase synchronously rotating reference frame signals at the fundamental frequency. Thus, the three phase to two phase transformation 472 employs $\sin\theta_1$ and $\cos\theta_1$ signal values in the manner described previously with respect to FIG. 1. The $\sin\theta_1$ and $\cos\theta_1$ values may be provided by PLL 162 on the measured filter terminal voltage, and look-up table 164. The three phase to two phase synchronous reference frame transformation, at the fundamental frequency, converts the fundamental frequency component of the three phase filter current to a DC value. This DC value is extracted by low pass filters 474 and 476 without any phase delay. The low pass filters 474 and 476 may be implemented, as described previously, by maximally flat butterworth or switched capacitor low-pass filters.

The outputs of the low-pass filters 474 and 475, corresponding to the fundamental frequency component of the measured filter current, is multiplied at nodes 468 and 470 by the output of the DC bus controller PI regulator 466, the DC bus voltage command signal, to generate DC bus control inverter voltage command signals in the two phase synchronously rotating reference frame. These two phase voltage command signals are transformed to three phase DC bus control inverter voltage command signals $V_{funda}^*$, $V_{fundb}^*$ and $V_{fundc}^*$ by a two phase to three phase synchronous frame transformation 477. The two phase to three phase synchronous frame transformation 477 operates in the manner described previously with respect to FIG. 3. The two phase to three phase transformation 477 employs $\sin\theta_1$ and $\cos\theta_1$ signal values, at the fundamental frequency, that may be provided by the PLL 162 on the measured passive filter terminal voltage, and the look-up table 164.

Inverter gating or switching signals $s_a$, $s_b$ and $s_c$ are derived from the combination of the low frequency (e.g., 60 Hz) DC bus control inverter voltage command signals $V_{funda}^*$, $V_{fundb}^*$ and $V_{fundc}^*$, generated at the fundamental frequency by the DC bus controller 158, with the three phase carrier waveforms at the dominant harmonic frequency (e.g., 300 Hz), generated by the triangle carrier generator 400 based on the three phase harmonic inverter voltage command signals provided by the harmonic controller 152. The DC bus control inverter voltage command signals are combined with the triangular carrier waveforms at summing junctions 478, 480, and 482, where the carrier waveforms are subtracted from the DC bus control inverter voltage command signals. Note that the carrier signals are synchronized to the harmonic inverter voltage command signals, but are 180° out of phase therewith in order to accommodate the minus sign in the comparison 478, 480, and 482 with the 60 Hz DC bus control inverter voltage command signals. The result of the comparison 478, 480, and 482 is provided to threshold switching devices 484, 486, and 488 that generate the square wave switching signals $s_{a-c}$. The process for generating the switching signals is thus a PWM process involving the three-phase fundamental frequency references ($v^*_{funda-c}$) and the three-phase harmonic frequency carriers ($tri_5^*_{a-c}$).

The switching signals $s_{a-c}$ are provided to the three phase active filter inverter 54 to control the inverter 54 to generate three phase inverter voltage signals $V_{a-c}$ in series with the passive filter 50. The three phase voltage signals $V_{a-c}$ provided by the inverter 54 are such that the filter terminal voltage, or load voltage $V_{load}$, tracks the supply voltage harmonics at the dominant harmonic frequency to achieve harmonic isolation between the supply 36 and load 38 at the selected dominant harmonic frequency, in this case, the fifth harmonic. Simultaneously, this control scheme achieves real power balancing of the inverter DC bus 160 and compensation of the inverter losses by exchanging energy at the fundamental and at the dominant harmonic frequency.

Note that in the control system topology illustrated in FIG. 21, the inverter 54 is directly controlled by the voltage command signals generated by the harmonic controller 152 and DC bus controller 158 elements. This is contrasted with usual control methods for high bandwidth current regulated active filter inverter implementations, wherein the harmonic and DC bus voltage commands are provided to a modulator that generates high frequency inverter switching signals to synthesize the required active filter inverter output voltages. This is a significant advantage of hybrid parallel active/passive filter systems in accordance with the present invention, as low bandwidth, and hence higher efficiency inverters, including square-wave inverters, can be used. This increases the practical viability and cost-effectiveness of a hybrid parallel active/passive filter system in accordance with the present invention, especially for high power applications.

Figure 23:
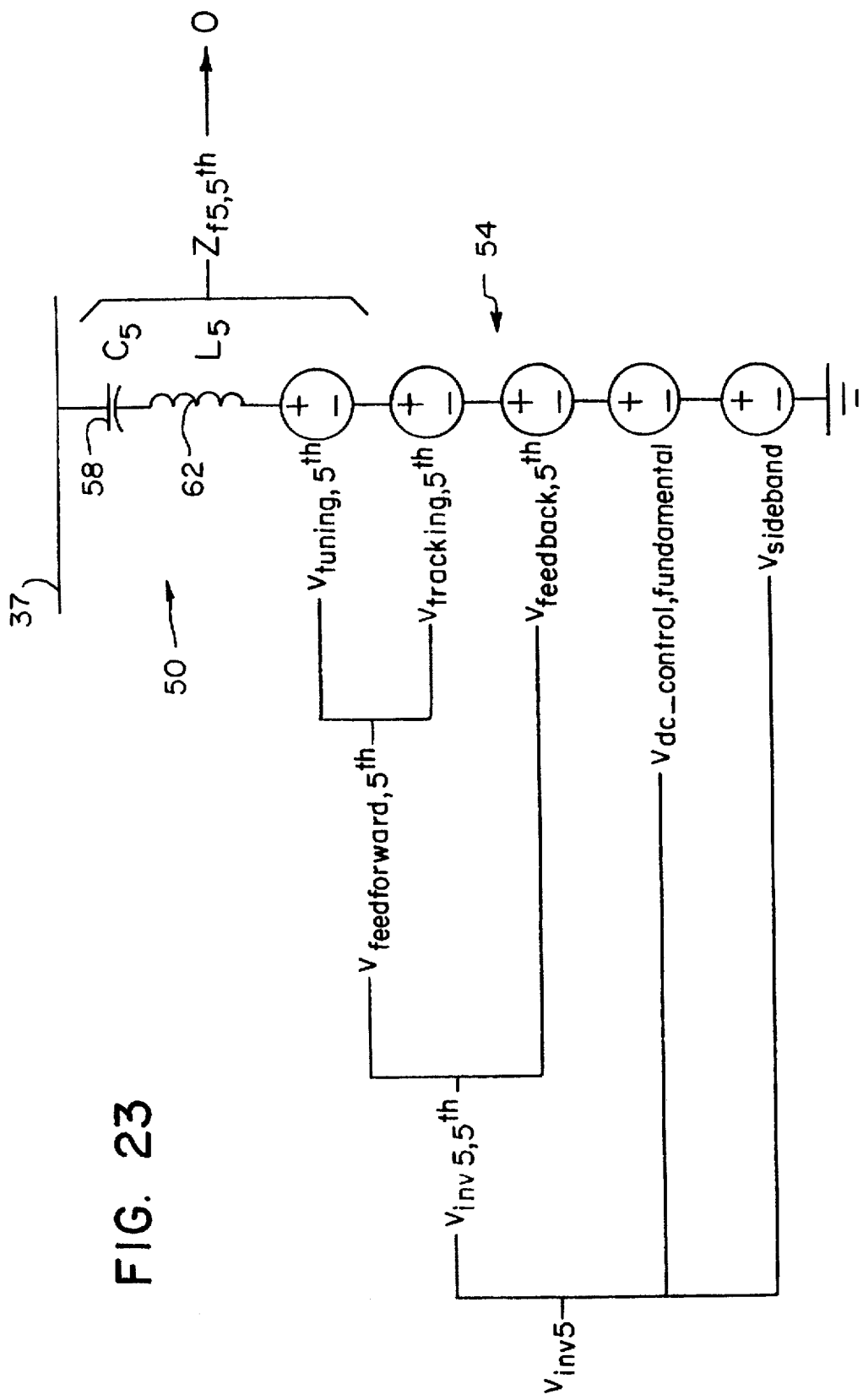
FIG. 23 is a schematic diagram of active filter inverter voltage components produced by an active filter inverter controlled by an active filter inverter controller with DC bus control in accordance with the present invention.

FIG. 23 is a schematic illustration of the voltage components produced by the active filter inverter 54 under control of the harmonic and DC bus control system illustrated in FIG. 21. The total voltage of the active filter inverter 54 $V_{inv5}$ includes a fifth harmonic component $V_{inv5,5th}$, a fundamental component $V_{dc-control,fundamental}$ for DC bus compensation, and a sideband component $v_{sideband}$. The fifth harmonic component of the inverter voltage $V_{inv5,5th}$ includes harmonic voltage components generated in response to feedback control signals $v_{feedback,5th}$ and feedforward control signals $V_{feedforward,5th}$. The feedforward components of the fifth harmonic frequency voltage includes tuning voltage $V_{tuning,5th}$ and tracking voltage $V_{tracking,5th}$ components. As described previously, the tuning voltage $V_{tuning,5th}$ will correct the mistuning of the passive filter components 58 and 62. Thus, $V_{tuning,5th}$, $C_5$, and $L_5$ combined will make the fifth harmonic impedance of the fifth harmonic passive filter 50 $Z_{p5,5th}$ approximately zero. This prevents the switching sideband of the seventh harmonic active filter inverter 56 from affecting the harmonic isolation at the fifth harmonic frequency, as shown in Equation 20. The tracking voltage $V_{tracking,5th}$ is controlled to follow the fifth supply voltage harmonics $V_{s,5th}$ to achieve harmonic isolation. $V_{tuning,5th}$ and $V_{tracking,5th}$ form the feedforward command voltage component $V_{feedforward,5th}$ of the fifth harmonic inverter voltage. The feedback voltage component $V_{feedback,5th}$ of the fifth harmonic inverter voltage is generated by the PI closed loop control on the fifth harmonic component of the supply current described previously. This primary feedback control makes the system more robust against parameter variations. The feedforward $V_{feedforward,5th}$ and feedback $v_{feedback,5th}$ voltage components form the total fifth harmonic voltage output $V_{inv5,5}$ of the active filter inverter 54. The inverter fifth harmonic voltage output $V_{inv5,5th}$, and the fifth harmonic filter current $i_{p5,5th}$, create a real power flow at the fifth harmonic frequency. The active filter DC bus controller 158 controls the inverter 54 to generate a voltage at the fundamental frequency $V_{dc-control,fundamental}$ to form a power flow at the fundamental frequency to balance the power flow at the fifth harmonic frequency. Thus, no energy storage device is needed on the DC side of the active filter inverter. $V_{sideband}$ is generated by the modulation process of the fundamental reference and the fifth harmonic triangular carrier as described previously. The output of the fifth harmonic active filter inverter 54 contains seventh harmonic sideband, the output of the seventh harmonic active filter inverter 56 contains fifth harmonic sideband. $V_{sideband}$ is thus a side-effect of the modulation process, it does not have any serious effect on the harmonic isolation provided by a hybrid parallel active/passive filter system in accordance with the present invention, and the power flow associated with it is small compared to the other voltage components.

Figure 24:
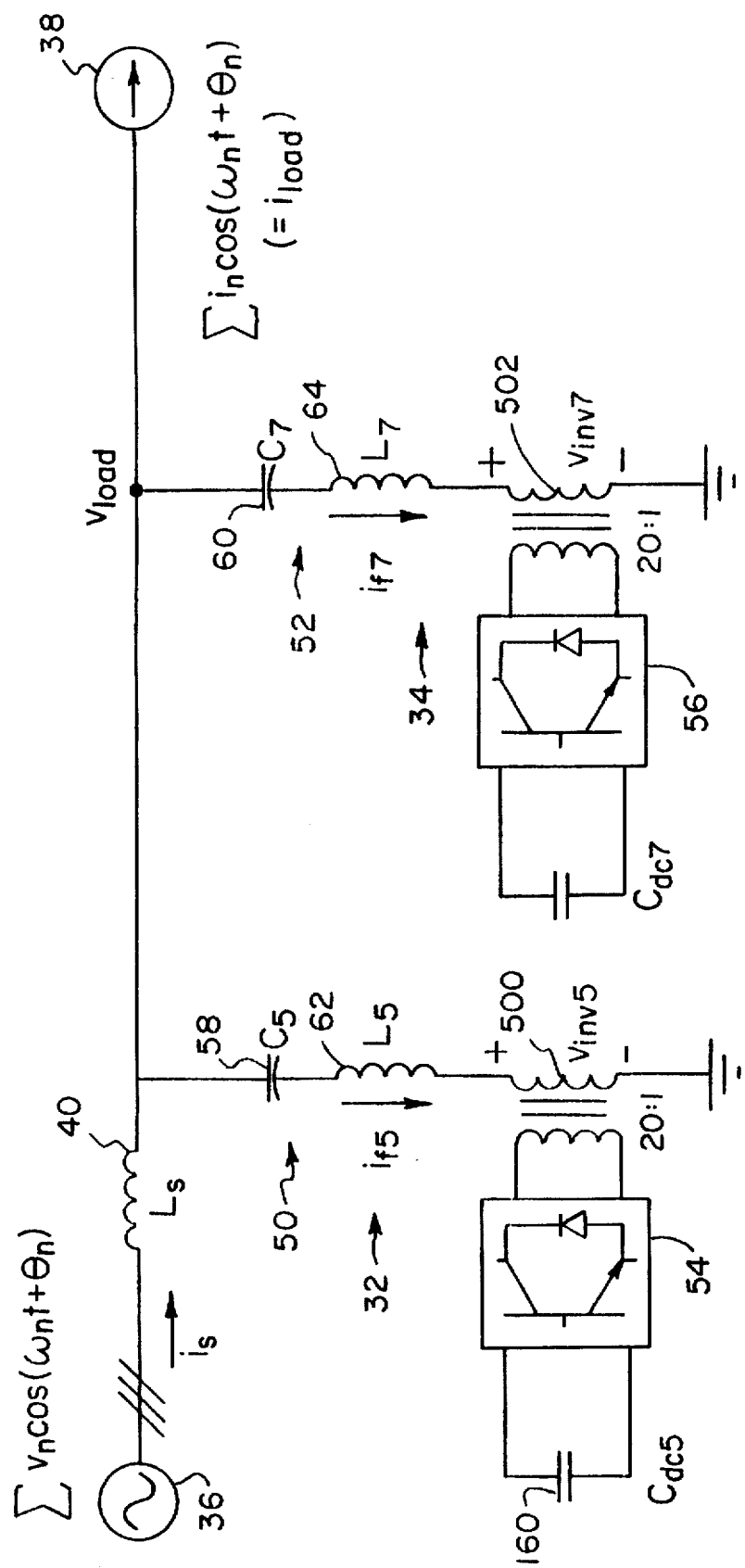
FIG. 24 is a schematic circuit diagram of a simulation model of a parallel hybrid active/passive filter system in accordance with the present invention.

The model circuit topology illustrated in FIG. 24 was simulated to verify operation of the combined harmonic and DC bus controller of FIG. 21. The circuit topology of FIG. 24 is similar to the parallel hybrid active/passive filter system application of FIG. 4, having separate hybrid parallel active/passive filters 32 and 34 for providing harmonic compensation and isolation at the fifth and seventh harmonic frequencies in accordance with the present invention. Note that in the simulated circuit topology, the fifth harmonic and seventh harmonic active filter inverters 54 and 56 are connected in series with the fifth and seventh harmonic passive filters 50 and 52 by coupling transformers 500 and 502, respectively, having primary to secondary turns ratios of 20:1. The voltage supply 36 was simulated as a 480 volt (line to line RMS) voltage source with 3% of fifth and seventh harmonic distortion. The load 38 was simulated as a 300 kVA, 370 Amp (RMS) load with 23% of fifth, 8% of seventh, and higher order harmonic distortion, with a THD of 26.0%. The passive filter components were simulated using the mis-tuned values provided previously in Table 1. Thus, the capacitive and inductive components of both fifth and seventh harmonic passive filters 50 and 52 were mistuned by +10%, resulting in tuning at 4.6 and 6.4, respectively. The short circuit ratio (SCR) for the simulated circuit, is 19.9. The IEEE 519 standard requires the THD of the supply current to be less than 5%, with 4% limits on the fifth and seventh harmonics.

Figure 25A:
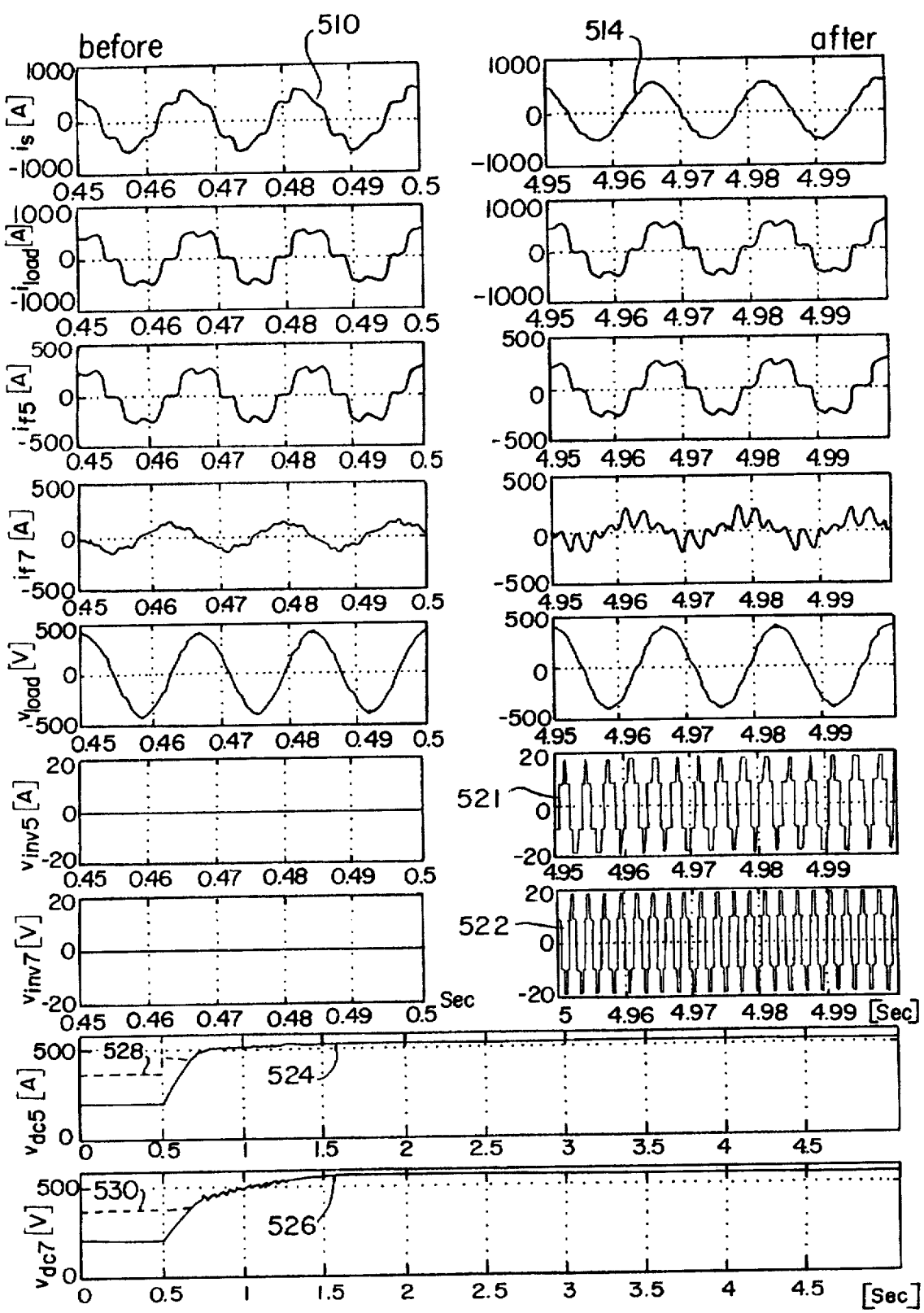
FIGS. 25(a) and 25(b) show graphs illustrating simulated voltage and current waveforms in the time domain and frequency domain, respectively, for operation of the simulation model of FIG. 24 using the active filter controller of FIG. 21 under mis-tuned passive filter and supply voltage harmonic distortion conditions.
Figure 25B:
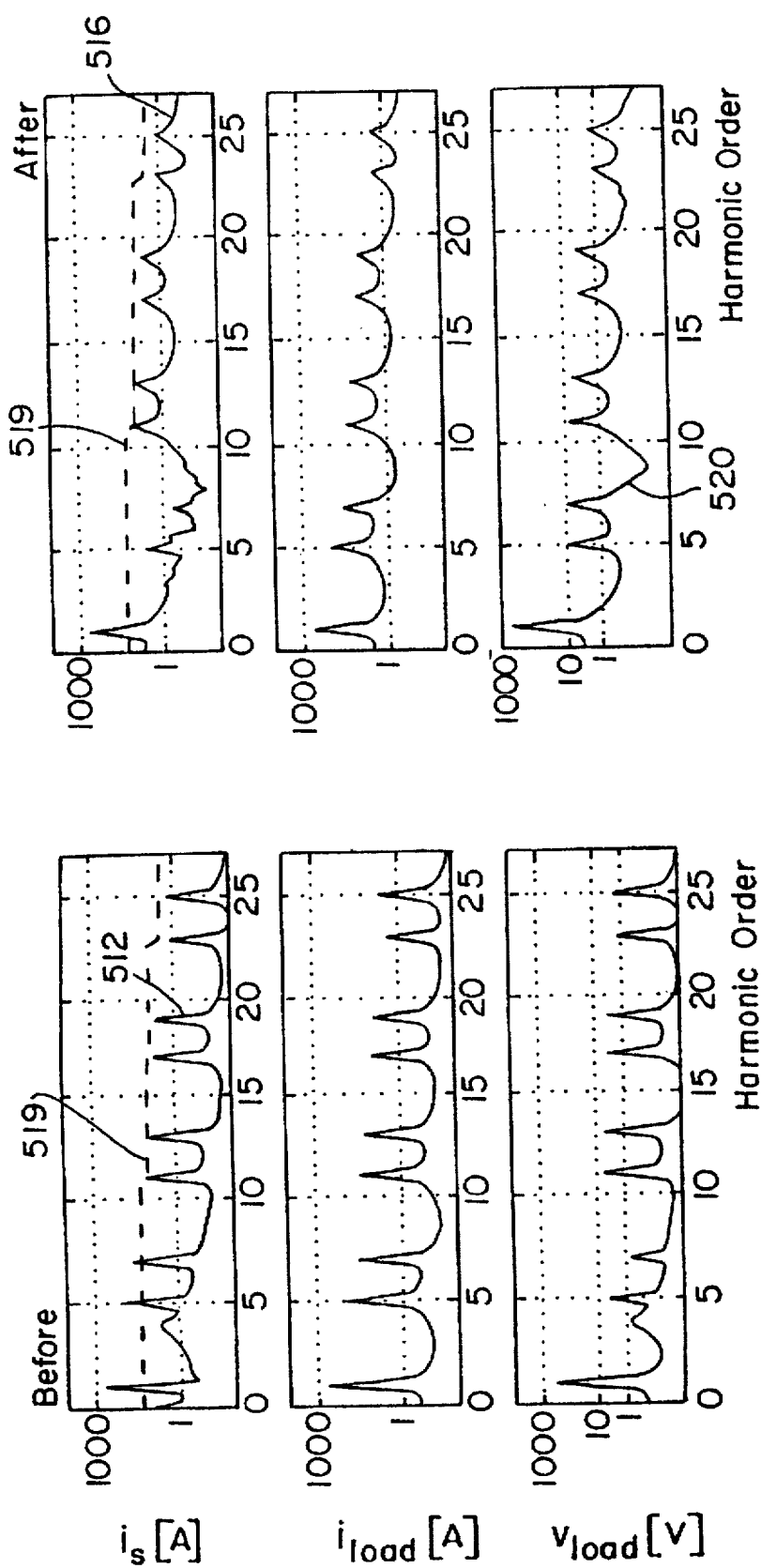

FIGS. 25(a) and 25(b) illustrate time domain waveforms and frequency domain spectra, respectively, for operation of the simulated circuit of FIG. 24 with 3% of fifth and seventh supply voltage harmonics and mis-tuned passive filters. Waveforms and spectra for before the active filter inverters 54 and 56 are started are presented on the left side of FIGS. 25(a) and 25(b), with waveforms and spectra for conditions after the active filter inverters 54 and 56 have been started provided on the right side of these figures. Before the active filter inverters 54 and 56 are started, the supply current $i_s$ shows large distortion (THD=17.6%) due to the supply voltage harmonic distortions (waveform 510, spectra 512). After the active filter inverters 54 and 56 are started the supply current distortion is reduced (THD=4.77%) and is more sinusoidal as the active filters 54 and 56 reduce the fifth and seventh harmonic components from the supply current (waveform 514, spectrum 516). Note that the supply current $i_s$ still contains higher order harmonics that are not eliminated by the fifth and seventh harmonic active filters 54 and 56. However, the passive filters 50 and 52 of the hybrid active/passive filter systems 32 and 34 will absorb significant portions of these higher order harmonics. The frequency spectra 512 and 516 of the source current show that the fifth and seventh harmonic components are significantly reduced after the active filter inverters 54 and 56 are started. After the active filter inverters 54 and 56 are started, the dominant harmonic components are significantly reduced within the IEEE 519 limit, illustrated as dashed lines 519. Note that the other higher order harmonic components are also reduced below the IEEE 519 limits by the passive portions of the filter system. Spectra of the load voltage 520 show that the 5th and 7th harmonic components of $V_{load}$ are equal to supply voltage harmonics ($V_{s,5th}=V_{s,7th}=11.8V$) to achieve harmonic isolation after the active filter inverters 54 and 56 are started.

The inverter output voltage waveforms $v_{inv5}$ and $v_{inv7}$ are very similar to 6-step waveforms, except that they both contain small amounts of 60 Hz components for controlling their DC bus voltages in the manner described previously (waveforms 521 and 522). The DC bus voltages $V_{dc5}$ and $V_{dc7}$ for the fifth and seventh harmonic active filter inverters 54 and 56 are illustrated at waveforms 524 and 526, respectively. The DC bus voltage commands $v_{dc5}^*$ and $v_{dc7}^*$, for the fifth and seventh harmonic active filter inverters 54 and 56, respectively, are illustrated by dashed lines 528 and 530. Control of the DC bus voltage 524 and 526 in accordance with the present invention is achieved by extracting energy from the fundamental component of the filter current in the manner described previously. With the active filter inverters 54 and 56 started at time t=0.5 seconds, the simulation results show that the actual DC bus voltages 524 and 526 track their respective DC bus voltage references 528 and 530 within a 5% error.

Figure 26A:
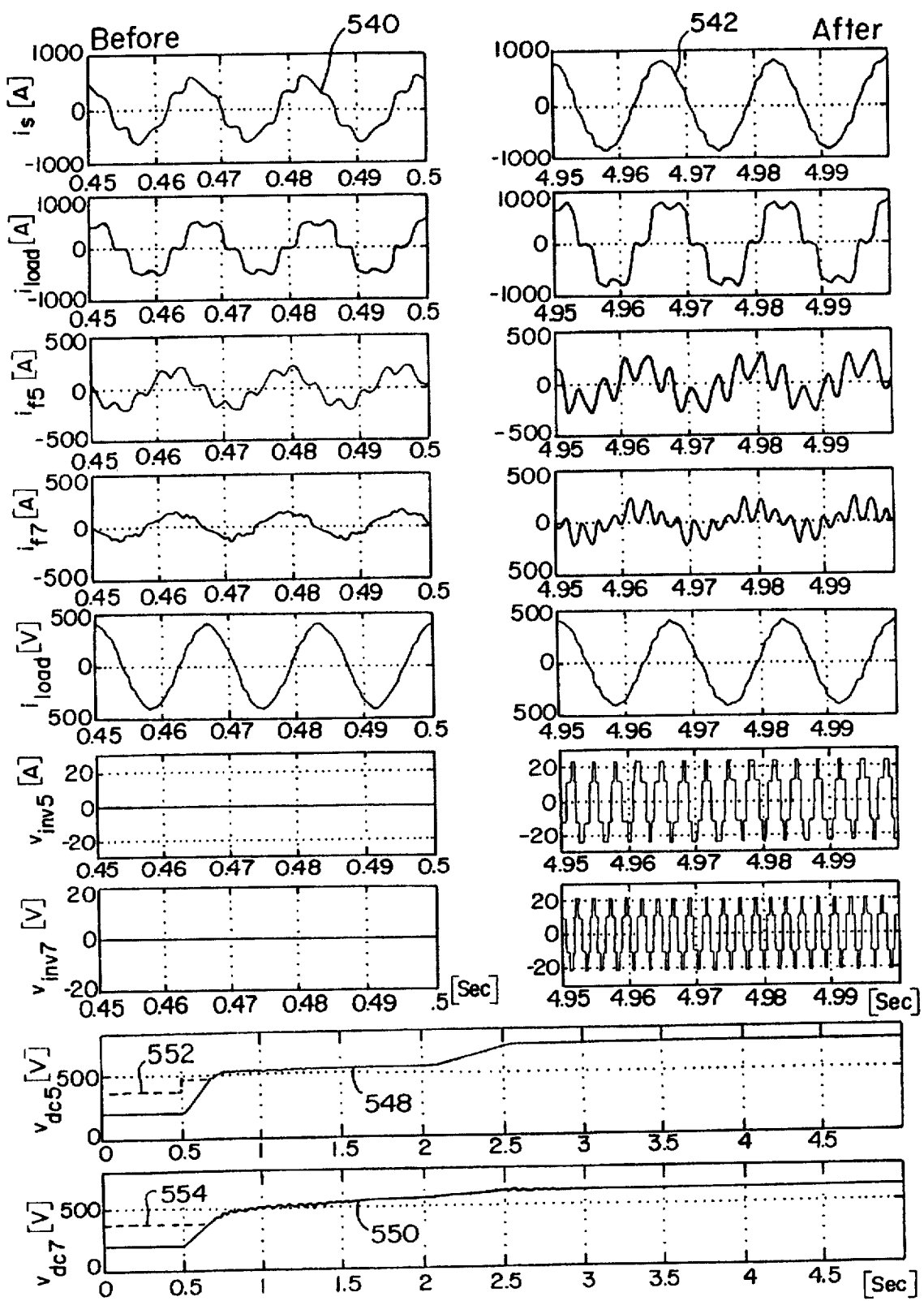
FIGS. 26(a) and 26(b) show graphs illustrating simulated voltage and current waveforms in the time domain and frequency domain, respectively, for operation of the simulation model of FIG. 24 using the active filter controller of FIG. 21 under mis-tuned passive filter and supply voltage harmonic distortion conditions with a ramped up load increase.
Figure 26B:
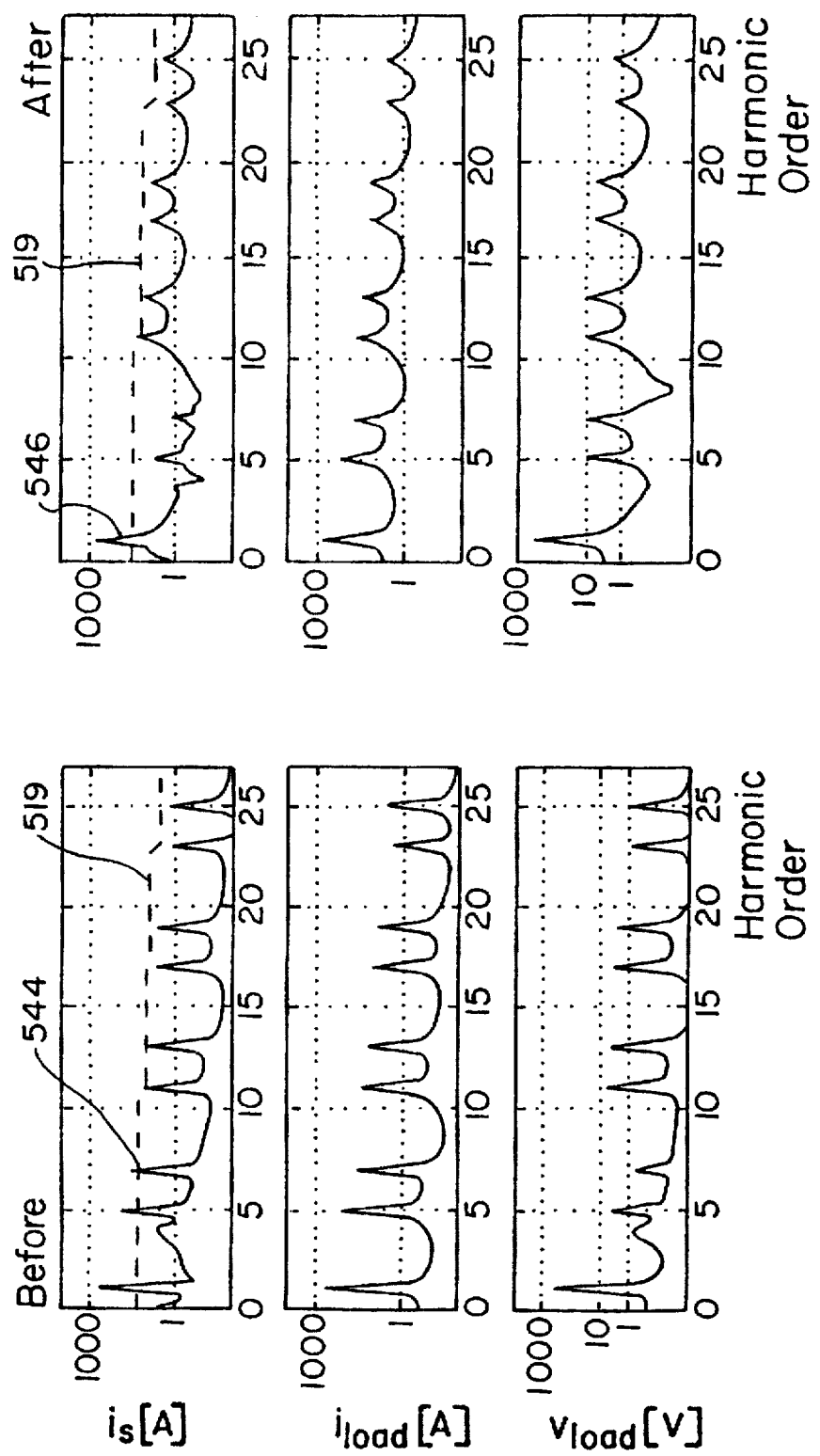

FIGS. 26(a) and 26(b) show time domain waveforms and frequency domain spectra, respectively, for simulation of the hybrid parallel active/passive filter system topology of FIG. 24 under the operating conditions described previously, but with a 50% load increase ramping up from time t=2.0 seconds to time t=2.5 seconds. All of the circuit parameters and other operating conditions remain the same as in the previous simulation whose results are presented in FIG. 25. Waveforms and spectra for a period before the active filter inverters 54 and 56 are started are presented on the left of FIGS. 26(a) and 26(b), with time domain waveforms and frequency spectra for conditions after the active filter inverters 54 and 56 are started presented on the right of FIGS. 26(a) and 26(b). The time domain waveforms 540 and 542 show that there is less distortion in the supply current $i_s$ after the active filter inverters 54 and 56 are started. The spectra of the supply current $i_s$ illustrated at 544 and 546 indicate that, after the active filter inverters 54 and 56 are started, the fifth and seventh harmonic current components are suppressed to a level below the IEEE 519 limits. The harmonic isolation function is in no way affected by the load change. Waveforms 548 and 550 show the DC bus voltages $v_{dc5}$ and $v_{dc7}$ for the fifth and seventh harmonic active filter inverters 54 and 56, respectively. The corresponding DC bus reference voltage signals $V_{dc5}^*$ and $V_{dc7}^*$ (dashed lines 552 and 554) increase due to the load change because higher 5th and 7th harmonic voltages from the active filter inverters 54 and 56 are needed to achieve harmonic isolation at the higher load level. Waveforms 548 and 550 show that the DC bus voltages track their corresponding DC bus reference voltages closely throughout the time period of the load change. The DC bus controller in accordance with the present invention thus maintains the DC bus voltages without being disturbed by the load change.

Figure 27A:
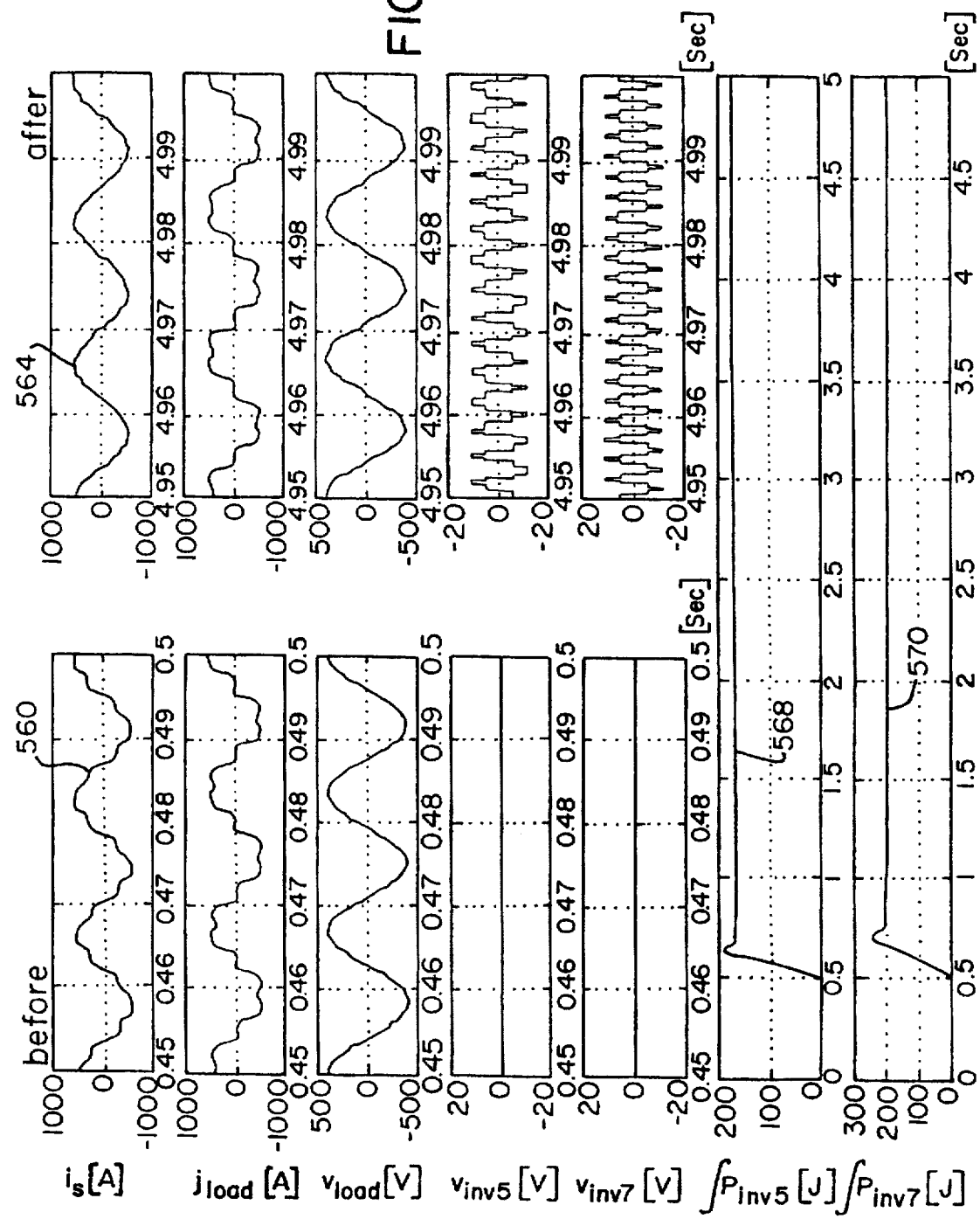
FIGS. 27(a) and 27(b) show graphs illustrating simulated voltage and current waveforms in the time domain and frequency domain, respectively, for operation of the simulation model of FIG. 24 using the active filter controller of FIG. 21 with tuned passive filters and under supply voltage harmonic distortion conditions.
Figure 27B:
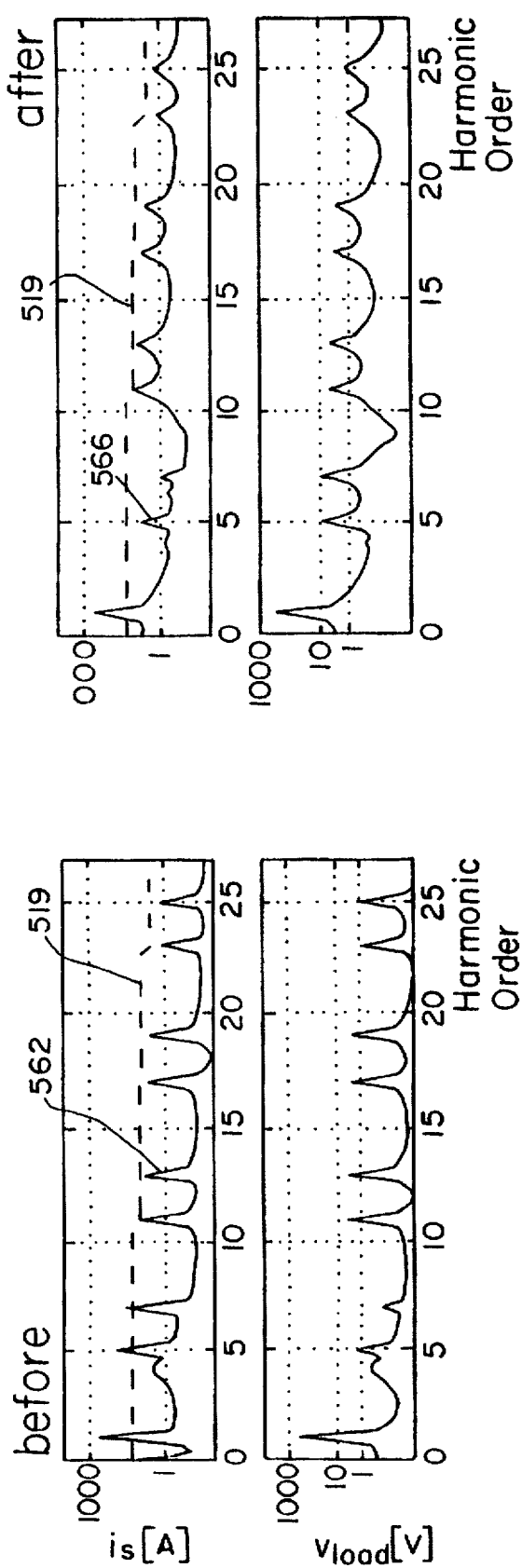

FIGS. 27(a) and 27(b) illustrate time domain waveforms and frequency domain spectra, respectively, for simulation of the hybrid parallel active/passive filter system topology of FIG. 24 with tuned passive filters 50 and 52 and under operating conditions of 3% of fifth and seventh supply harmonic voltages. The time domain waveforms and frequency domain spectra on the left side of FIGS. 27(a) and 27(b) are for a time period before the active filter inverters 54 and 56 are started, with time domain waveforms and frequency domain spectra on the right side of FIGS. 27(a) and 27(b) corresponding to a time period after the active filter inverters 54 and 56 have been started. Before the active filter inverters 54 and 56 are started, the supply current $i_s$ has severe harmonic distortion due to the fifth and seventh supply voltage harmonics (waveform 560, spectra 562). The fifth and seventh harmonic components of the supply current $i_s$ exceed IEEE 519 harmonic standards 519, as indicated in the spectrum 562. At time t=0.5 seconds, the active filter inverters 54 and 56 are started. As shown by time domain waveform 564 and frequency domain spectra 566, the hybrid parallel active/passive filter systems 32 and 34 of the present invention successfully reduce the fifth and seventh harmonics in the supply current $i_s$ by making the load voltage at the fifth and seventh dominant harmonic frequencies equal to the supply voltage at the fifth and seventh dominant harmonic frequencies.

Waveforms 568 and 570 illustrate the energy curves of the fifth and seventh harmonic active filter inverters 54 and 56. The energy curves of the active filter inverters are defined by:

$$\int P_{inv5} = \int (v_{inv5a}i_{fsa} + v_{inv5b}i_{fsb} + v_{inv5c}i_{fsc})dt \quad (27)$$

$$\int P_{inv7} = \int (v_{inv7a}i_{f7a} + v_{inv7b}i_{f7b} + v_{inv7c}i_{f7c})dt \quad (28)$$

As illustrated by waveforms 568 and 570, the DC bus control mechanism of the present invention controls the active filter inverters 54 and 56 to absorb real power from the fundamental component to balance the real power flow at harmonic frequencies. Thus, the energy curves 568 and 570 of the active filter inverters 54 and 56 remain constant at steady state. The initial jump of these two curves 568 and 570 at time t=0.5 seconds is the result of charging up of the DC bus from an initial value (200V) to the DC bus voltage reference values. The slight overshoot in the curves 568 and 570 is due to DC bus controller dynamics. For previous hybrid parallel active/passive filter systems, that are controlled to provide harmonic compensation by controlling the active filter inverter to cancel the voltage drop of the passive filter resistance at the dominant harmonic frequency, the corresponding energy curves will keep going downward after the active filter inverters are started. This is because the active filter inverters will be required to pump real power into the system, because they are emulating negative resistors. In such systems an energy storage device is required to support the DC bus because there isn't any other power balancing mechanism in the system.

Figure 28:
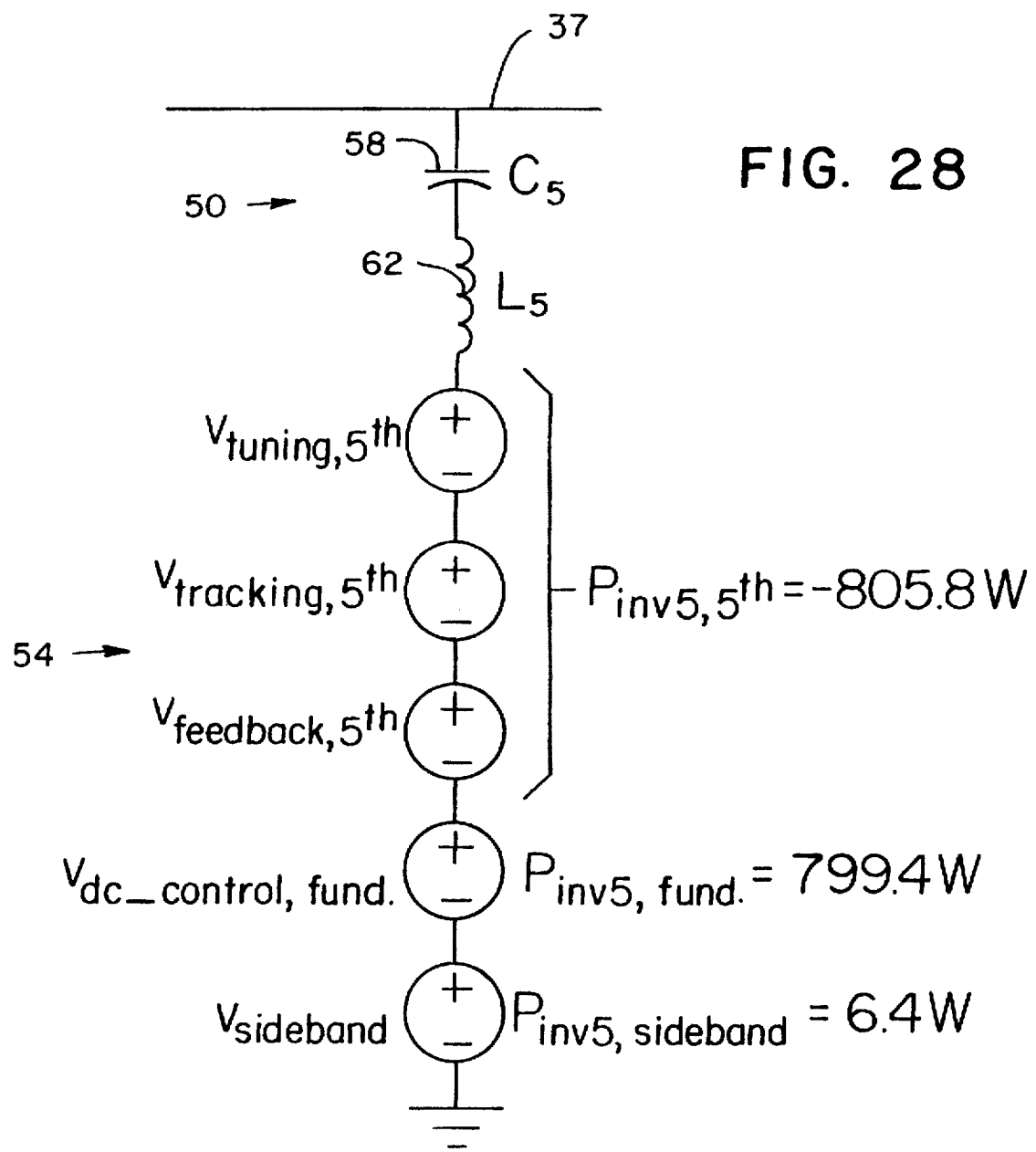
FIG. 28 is a schematic diagram of active filter inverter power flow produced by an active filter inverter controlled by an active filter inverter controller with DC bus control in accordance with the present invention.

A schematic illustration of the simulated power flow for the fifth harmonic hybrid parallel active/passive filter 32 of the present invention is depicted in FIG. 28. As shown, a DC bus controller in accordance with the present invention balances real power flow at the selected dominant harmonic frequency $P_{inv5,5th}$, by introducing another real power flow at the fundamental frequency $P_{inv5,fund}$, so that the DC bus capacitor 160 will not be charged up or discharged during inverter operation. Inverter power flow at the fifth harmonic frequency $P_{inv5,5th}=-805.8$ W is caused by the 5th harmonic output voltage of the active filter inverter 54 and the 5th harmonic filter current. This power flow at the 5th harmonic frequency is balanced mostly by another power flow $P_{inv5,fund}=799.4$ W introduced by the fundamental output voltage of the active filter inverter 54. Sideband power $P_{inv,sideband}$ also contributes slightly to the power balancing, and is caused by higher order harmonic currents from the load and active filter inverter switching sideband voltages. The sideband power is relatively small compared to the inverter power exchanged at the selected dominant harmonic and fundamental frequencies, because the high order current harmonics and the inverter switching sideband voltages are both small. The total power flow into the active filter inverter 54 is zero so that the DC bus capacitor 160 will not be charged up or discharged.

The foregoing simulation results reveal active filter inverter ratings of 1.77% and 1.35% for the fifth and seventh harmonic active filter inverters 54 and 56, respectively, under operation of the inverters with mis-tuned passive filters and under 3% of fifth and seventh supply voltage harmonics. Inverter ratings of 1.01% and 0.25% of load kVA are achieved for operation of the hybrid parallel active/passive filter inverter systems under mis-tuned passive filter conditions but without supply voltage harmonics. The active filter inverter ratings are affected by the supply voltage harmonics, because the active filter inverters 54 and 56 are controlled to manipulate the load voltage at the selected dominant harmonic frequencies to track the supply voltages at the corresponding selected dominant harmonic frequencies to achieve harmonic isolation. If the passive filter is better tuned, then the rating of the active filter inverters 54 and 56 will drop even lower. The small inverter ratings, combined with the use of square wave active filter inverters 54 and 56, makes parallel hybrid active/passive filter systems in accordance with the present invention feasible for high power non-linear load applications. For example, for a 50 MW non-linear load, 900 kVA and 700 kVA square wave inverters are required to implement the fifth and seventh harmonic frequency active filter inverters 54 and 56, respectively, based on +10% mis-tuned passive filter components and 3% fifth and seventh supply voltage harmonic operating conditions.

Figure 29:
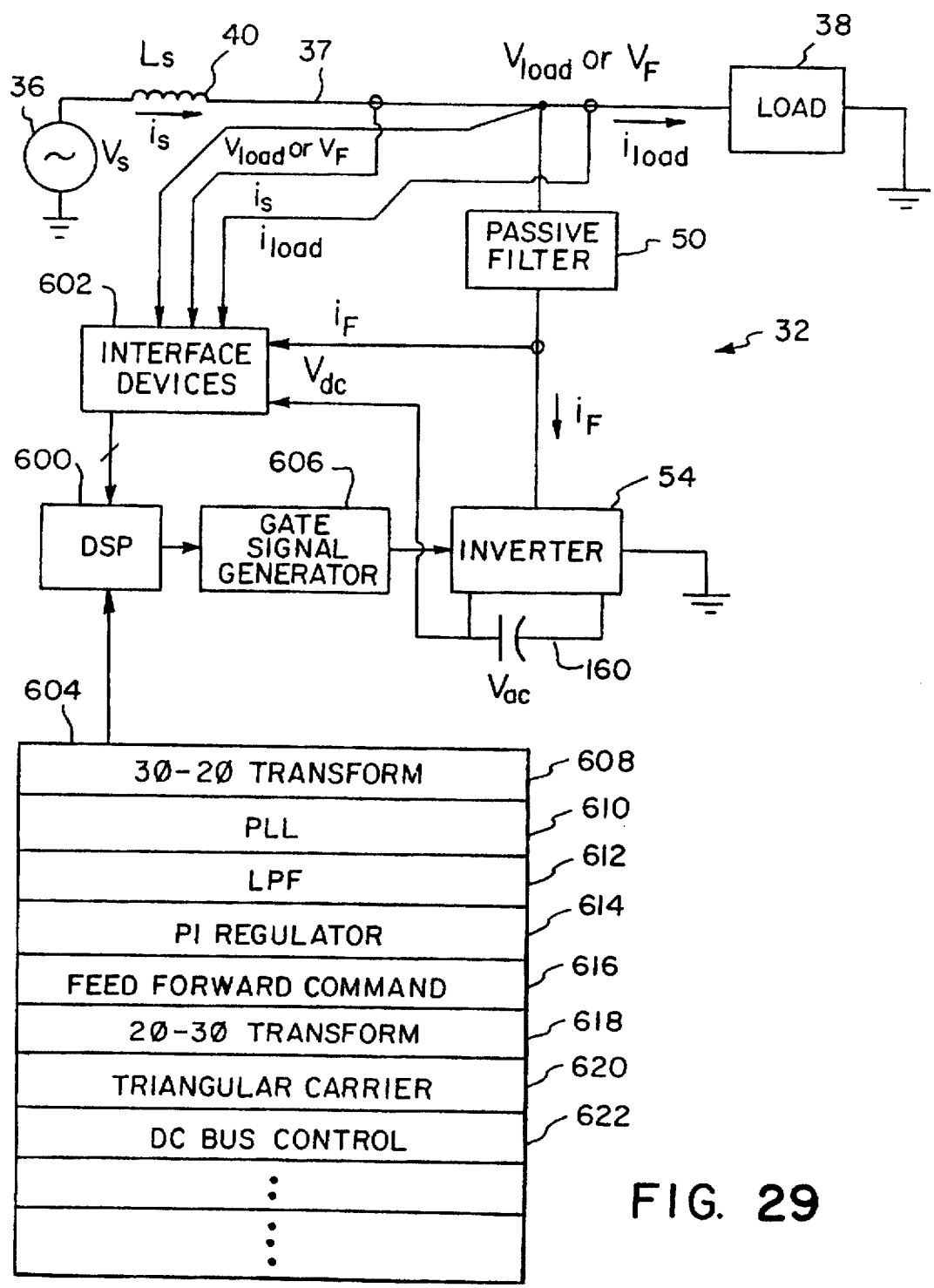
FIG. 29 is a block diagram of a parallel hybrid active/passive filter system in accordance with the present invention wherein the main functional components of the active filter inverter control system are implemented using a digital processor.

It should be understood that the SRF based harmonic 152 and DC bus 158 controllers, illustrated schematically in FIGS. 9 and 21, may be implemented using analog components, digital components, or a combination thereof. FIG. 29 is a block diagram of a parallel hybrid active filter system 32 in accordance with the present invention wherein the harmonic and DC bus controller functions are implemented using a digital signal processor 600 or similar programmable digital device. Measured system parameters, such as the filter terminal voltage $V_{load}$, the supply current $i_s$, the load current $i_{load}$, the filter current if, and the measured DC bus voltage $V_{dc}$, are provided to the DSP 600 through interface devices 602 that, for example, convert the measured analog signals into digital signals for use by the DSP 600. The DSP employs a software program 604 to generate inverter control signals that will control the active filter inverter 54 to perform the harmonic isolation and DC bus control functions of the present invention as previously described. A gate signal generator 606 may typically be employed to generate switching signals for the inverter switching devices from the low voltage control signals generated by the DSP 600. The DSP software program 604 implements the harmonic and DC bus controller functions previously described, including, for example, three phase to two phase synchronous frame transformation 608, phase locked loop 610, low-pass filter 612, PI regulation 614, feedforward command generation 616, two-phase to three-phase transformation 618, triangular carrier generation 620, DC bus control 622, etc.

It is understood that this invention is not confined to the particular embodiments, implementations, and applications herein illustrated and described, but embraces all such modified forms thereof as come within the scope of the following claims.

What is claimed is:

1. A hybrid active/passive filter system for harmonic isolation of a power supply providing a supply voltage and a supply current to a load, comprising:

(a) a passive filter;

(b) an active filter inverter connected in series with the passive filter, the series connected active and passive filters adapted to be connected at a filter terminal in parallel with the load, the active filter inverter responsive to control signals to generate an inverter voltage signal in series with the passive filter; and (c) an active filter harmonic controller means for generating control signals that are applied to the active filter inverter to control the active filter inverter to generate an inverter voltage signal such that a filter terminal voltage tracks the supply voltage at a selected dominant harmonic frequency to regulate the supply current at the selected dominant harmonic frequency to approximately zero.

2. The hybrid filter system of claim 1 wherein the passive filter includes an inductor and a capacitor and is tuned approximately to the selected dominant harmonic frequency, and the active filter inverter is a square-wave inverter.

3. The hybrid filter system of claim 1 wherein the passive filter includes a first capacitor and a first inductor and a second capacitor and a second inductor connected in parallel with the first capacitor and first inductor, and wherein the active filter harmonic controller means generates control signals to control the active filter inverter to generate an inverter voltage signal such that the filter terminal voltage tracks the supply voltage at multiple selected dominant harmonic frequencies simultaneously to regulate the supply current at the multiple selected dominant harmonic frequencies to approximately zero.

4. The hybrid filter system of claim 3 wherein the active filter inverter is a PWM inverter.

5. The hybrid filter system of claim 1 wherein the passive filter includes a power factor correction capacitor, and wherein the active filter harmonic controller means generates control signals to control the active filter inverter to generate an inverter voltage signal such that the filter terminal voltage tracks the supply voltage at multiple selected dominant harmonic frequencies simultaneously to regulate the supply current at the multiple selected dominant harmonic frequencies to zero.

6. The hybrid filter system of claim 5 wherein the active filter inverter is a PWM inverter.

7. The hybrid filter system of claim 1 wherein the passive filter includes a capacitor, and comprising additionally:

(a) a second passive filter including a second capacitor, wherein a total capacitance in the passive filter and the second passive filter is approximately equally distributed between the passive filter and the second passive filter;

(b) a second active filter inverter connected in series with the second passive filter, the series connected second active and passive filters adapted to be connected at a filter terminal in parallel with the load, the second active filter inverter responsive to control signals to generate a second inverter voltage signal in series with the second passive filter; and (c) a second active filter harmonic controller means for generating control signals that are applied to the second active filter inverter to control the second active filter inverter to generate an inverter voltage signal such that the filter terminal voltage tracks the supply voltage at a second selected dominant harmonic frequency to regulate the supply current at the second selected dominant harmonic frequency to approximately zero.

8. A hybrid active/passive filter system for harmonic isolation of a power supply providing a supply voltage and a supply current to a load, comprising:

(a) a passive filter;

(b) an active filter inverter connected in series with the passive filter, the series connected active and passive filters adapted to be connected at a filter terminal in parallel with the load, the active filter inverter responsive to control signals to generate an inverter voltage signal in series with the passive filter; and (c) an active filter harmonic controller means including a synchronous reference frame based controller for generating control signals that are applied to the active filter inverter to control the active filter inverter to generate an inverter voltage signal such that a filter terminal voltage tracks the supply voltage at a selected dominant harmonic frequency to regulate the supply current at the selected dominant harmonic frequency to approximately zero.

9. The hybrid filter system of claim 8 wherein the synchronous reference frame based active filter harmonic controller means includes a three-phase to two-phase transformation means for transforming measured three phase supply current signals into two-phase synchronously rotating reference frame signal values at the selected dominant harmonic frequency, low pass filters for extracting a DC component corresponding to the supply current component at the selected dominant harmonic frequency from the two-phase signals, means for comparing the filtered two-phase signals to supply current reference command signals to form supply current harmonic error signals, means for deriving two-phase harmonic inverter voltage command signals from the supply current harmonic error signals, and a two-phase to three-phase transformation means for transforming the two-phase harmonic inverter voltage command signals from the two-phase synchronously rotating reference frame to the three-phase reference frame at the selected dominant harmonic frequency to form three-phase harmonic inverter voltage command signals.

10. The hybrid filter system of claim 9 wherein the supply current reference command signals are equal to zero.

11. The hybrid filter system of claim 9 wherein the means for deriving the two-phase inverter voltage command signals from the supply current harmonic error signals includes proportional-integral regulators.

12. The hybrid filter system of claim 9 including additionally a feedforward command generator means for generating feedforward command signals in the two-phase synchronously rotating reference frame, and means for adding the feedforward command signals to the two-phase harmonic inverter voltage command signals.

13. The hybrid filter system of claim 12 wherein the feedforward command generator means includes means for generating a tuning voltage command signal in the two phase synchronously rotating reference frame from measured three phase filter current signals and active impedance command signals, means for generating a tracking voltage command signal from measured supply voltage signals, and means for combining the tuning voltage command signal and tracking voltage command signal to form the feedforward command signals.

14. The hybrid filter system of claim 9 wherein the active filter inverter includes a DC bus, and including additionally a synchronous reference frame based DC bus controller means for generating DC bus control signals that are applied to the active filter inverter to control the active filter inverter to generate an inverter voltage signal to achieve power balancing of the DC bus by exchanging energy at a fundamental frequency and at the selected dominant harmonic frequency.

15. The hybrid filter system of claim 14 wherein the synchronous reference frame based DC bus controller means includes a three-phase to two-phase transformation means for transforming measured three-phase signals corresponding to a current through the hybrid filter into two-phase synchronously rotating reference frame signal values at the fundamental frequency, low pass filter means for extracting a DC component corresponding to a hybrid filter current component at the fundamental frequency from the two-phase signals, means for generating a DC bus voltage command signal from a difference between a DC bus voltage reference signal and a measured DC bus voltage, means for combining the filtered two-phase signals with the DC bus voltage command signal to form two-phase DC bus control inverter voltage command signals, and a two-phase to three-phase transformation means for transforming the two-phase DC bus control inverter voltage command signals from the two-phase synchronously rotating reference frame to the three-phase reference frame at the fundamental frequency to form three-phase DC bus control inverter voltage command signals.

16. The hybrid filter system of claim 15 including additionally means for generating the DC bus voltage reference signal from the two-phase harmonic inverter voltage command signals.

17. The hybrid filter system of claim 15 including additionally means for generating three-phase triangular carrier signals at the selected dominant harmonic frequency from the three-phase harmonic inverter voltage command signals and means for combining the three-phase DC bus control inverter voltage command signals at the fundamental frequency with the three-phase triangular carrier signals to form switching control signals for controlling the active filter inverter.

18. The hybrid filter system of claim 9 wherein the supply current reference command signals are selected such that the active filter harmonic controller means controls the active filter inverter to regulate the supply current at the selected dominant harmonic frequency to an amount below the maximum amount of harmonic current allowed by a selected harmonic standard.

19. The hybrid filter system of claim 18 wherein the selected harmonic standard is IEEE-519.

20. A hybrid active/passive filter system for harmonic isolation of a power supply providing a supply voltage and a supply current to a load, comprising:

(a) a passive filter;

(b) an active filter inverter connected in series with the passive filter, the series connected active and passive filters adapted to be connected at a filter terminal in parallel with the load, the active filter inverter responsive to control signals to generate an inverter voltage signal in series with the passive filter; and (c) an active filter harmonic controller means including a digital signal processor for generating control signals that are applied to the active filter inverter to control the active filter inverter to generate an inverter voltage signal such that a filter terminal voltage tracks the supply voltage at a selected dominant harmonic frequency to regulate the supply current at the selected dominant harmonic frequency to approximately zero.

21. A hybrid active/passive filter system for harmonic isolation of a power supply providing a supply voltage and a supply current to a load, comprising:

(a) a passive filter;

(b) a square wave active filter inverter including a DC bus connected in series with the passive filter, the series connected active and passive filters adapted to be connected at a filter terminal in parallel with the load, the active filter inverter responsive to control signals to generate an inverter voltage signal in series with the passive filter; and (c) a synchronous reference frame based active filter harmonic and DC bus control controller means for generating control signals that are applied to the active filter inverter to control the active filter inverter to generate an inverter voltage signal such that the filter terminal voltage tracks the supply voltage at a selected dominant harmonic frequency to regulate the supply current at the selected dominant harmonic frequency to approximately zero and to achieve power balancing of the DC bus by exchanging energy at a fundamental frequency and at the selected dominant harmonic frequency.

22. The hybrid filter system of claim 21 wherein the passive filter includes an inductor and a capacitor and is tuned approximately to the selected dominant harmonic frequency.

23. The hybrid filter system of claim 21 wherein the synchronous reference frame based controller means includes a digital signal processor.

24. The hybrid filter system of claim 21 wherein the synchronous reference frame based active filter controller means includes a three-phase to two-phase transformation means for transforming measured three-phase supply current signals into two-phase synchronously rotating reference frame signal values at the selected dominant harmonic frequency, low pass filter means for extracting a DC component corresponding to a supply current component at the selected dominant harmonic frequency from the two-phase signals, means for comparing the filtered two-phase signals to supply current reference command signals to form supply current harmonic error signals, means for deriving two-phase harmonic inverter voltage command signals from the supply current harmonic error signals, a two-phase to three-phase transformation means for transforming the two phase harmonic inverter voltage command signals from the two-phase synchronously rotating reference frame to the three-phase reference frame at the selected dominant harmonic frequency to form three-phase harmonic inverter voltage command signals, means for generating three-phase triangular carrier signals from the three-phase harmonic inverter voltage command signals, a three-phase to two-phase transformation means for transforming measured three phase signals corresponding to a current through the hybrid filter into a two-phase synchronously rotating reference frame at the fundamental frequency, low pass filter means for extracting a DC component corresponding to a hybrid filter current component at the fundamental frequency from the two-phase signals, means for generating a DC bus voltage command signal from a difference between a DC bus voltage reference signal and a measured DC bus voltage, means for combining the filtered two-phase signals with the DC bus voltage command signal to form two-phase DC bus control inverter voltage command signals, a two-phase to three-phase transformation means for transforming the two-phase DC bus control inverter voltage command signals from the two-phase synchronously rotating reference frame to the three-phase reference frame at the fundamental frequency to form three-phase DC bus control inverter voltage command signals, and means for combining the three-phase DC bus control inverter voltage command signals with the three-phase triangular carrier signals to form switching control signals for controlling the active filter inverter.

25. The hybrid filter system of claim 24 wherein the supply current reference command signals are equal to zero.

26. The hybrid filter system of claim 24 wherein the means for deriving the two-phase inverter voltage command signals from the supply current harmonic error signals includes proportional-integral regulators.

27. The hybrid filter system of claim 24 including additionally means for generating the DC bus voltage reference signal from the two-phase harmonic inverter voltage command signals.

28. The hybrid filter system of claim 24 including additionally a feedforward command generator means for generating feedforward command signals in the two phase synchronously rotating reference frame, and means for adding the feedforward command signals to the two-phase harmonic inverter voltage command signals.

29. The hybrid filter system of claim 28 wherein the feedforward command generator means includes means for generating a tuning voltage command signal in the two phase synchronously rotating reference frame from measured three phase filter current signals and active impedance command signals, means for generating a tracking voltage command signal from measured supply voltage signals, and means for combining the tuning voltage command signal and tracking voltage command signal to form the feedforward command signals.

30. The hybrid filter system of claim 24 wherein the supply current reference command signals are selected such that the active filter harmonic controller means controls the active filter inverter to regulate the supply current at the selected dominant harmonic frequency to an amount below the maximum amount of harmonic current allowed by a selected harmonic standard.

31. The hybrid filter system of claim 30 wherein the selected harmonic standard is IEEE-519.

32. An active filter system with DC bus control to provide harmonic compensation at a selected dominant harmonic frequency to a power supply connected to a non-linear load, comprising:
 (a) an active filter inverter responsive to control signals to generate an inverter voltage signal, the active filter inverter having a DC bus; and
 (b) an active filter harmonic and DC bus controller means for generating control signals that are applied to the active filter inverter to control the active filter inverter to generate an inverter voltage signal to provide harmonic compensation at the selected dominant harmonic frequency and to achieve power balancing of the DC bus by exchanging energy at a fundamental frequency and at the selected dominant harmonic frequency.

33. An active filter system with DC bus control to provide harmonic compensation at a selected dominant harmonic frequency to a power supply connected to a non-linear load, comprising:
 (a) an active filter inverter responsive to control signals to generate an inverter voltage signal, the active filter inverter having a DC bus;
 (b) an active filter harmonic and DC bus controller means for generating control signals that are applied to the active filter inverter to control the active filter inverter to generate an inverter voltage signal to provide harmonic compensation at the selected dominant harmonic frequency and to achieve power balancing of the DC bus by exchanging energy at a fundamental frequency and at the selected dominant harmonic frequency; and
 (c) a passive filter connected in series with the active filter inverter, the series connected active and passive filters adapted to be connected at a filter terminal in parallel with the load, and wherein the active filter controller means includes means for generating control signals that are applied to the active filter inverter to control the active filter inverter to generate an inverter voltage signal in series with the passive filter such that a load terminal voltage tracks a supply voltage at the selected dominant harmonic frequency to regulate a supply current at the selected dominant harmonic frequency to approximately zero.

34. An active filter system with DC bus control to provide harmonic compensation at a selected dominant harmonic frequency to a power supply connected to a non-linear load, comprising:
 (a) an active filter inverter responsive to control signals to generate an inverter voltage signal, the active filter inverter having a DC bus; and
 (b) an active filter harmonic and DC bus controller means including a synchronous reference frame based controller for generating control signals that are applied to the active filter inverter to control the active filter inverter to generate an inverter voltage signal to provide harmonic compensation at the selected dominant harmonic frequency and to achieve power balancing of the DC bus by exchanging energy at a fundamental frequency and at the selected dominant harmonic frequency.

35. The active filter system of claim 34 wherein the synchronous reference frame based controller means includes a three-phase to two-phase transformation means for transforming measured three phase signals corresponding to a current through the filter into two-phase synchronously rotating reference frame signal values at the fundamental frequency, low pass filter means for extracting a DC component corresponding to a filter current component at the fundamental frequency from the two-phase signals, means for generating a DC bus voltage command signal from a difference between a DC bus voltage reference signal and a measured DC bus voltage, means for combining the filtered two-phase signals with the DC bus voltage command signal to form two-phase DC bus control inverter voltage command signals, and a two-phase to three-phase transformation means for transforming the two-phase DC bus control inverter voltage command signals from the two-phase synchronously rotating reference frame to the three-phase reference frame at the fundamental frequency to form three-phase DC bus control inverter voltage command signals.

36. The active filter system of claim 35 including additionally a second synchronous reference frame based controller means for generating three-phase harmonic inverter voltage command signals at the selected dominant harmonic frequency for controlling the active filter inverter to provide harmonic compensation at the selected dominant harmonic frequency, means for generating three-phase triangular carrier signals at the selected dominant harmonic frequency from the three-phase harmonic inverter voltage command signals, and means for combining the three-phase DC bus control inverter voltage command signals with the three-phase triangular carrier signals to form switching signal control signals for controlling the active filter inverter.

37. An active filter system with DC bus control to provide harmonic compensation at a selected dominant harmonic frequency to a power supply connected to a non-linear load, comprising:

(a) an active filter inverter responsive to control signals to generate an inverter voltage signal, the active filter inverter having a DC bus; and (b) an active filter harmonic and DC bus controller means including a digital signal processor for generating control signals that are applied to the active filter inverter to control the active filter inverter to generate an inverter voltage signal to provide harmonic compensation at the selected dominant harmonic frequency and to achieve power balancing of the DC bus by exchanging energy at a fundamental frequency and at the selected dominant harmonic frequency.

38. A method for providing harmonic isolation of a power supply providing a supply voltage and a supply current to a load, comprising the steps of:

(a) connecting a passive filter in parallel with the load; and (b) generating a voltage signal in series with the passive filter such that a load terminal voltage tracks the supply voltage at a selected dominant harmonic frequency to regulate the supply current at the selected dominant harmonic frequency to approximately zero.

39. The method of claim 38 wherein the passive filter is tuned approximately to the selected dominant harmonic frequency.

40. The method of claim 38 wherein the step of generating a voltage signal in series with the passive filter includes the steps of connecting an active filter inverter in series with the passive filter, and controlling the active filter inverter to generate the voltage signal.

41. The method of claim 40 wherein the active filter inverter is a square-wave inverter.

42. The method of claim 38 wherein the passive filter includes a first capacitor and a first inductor, and comprising additionally the steps of connecting a second passive filter including a second capacitor and a second inductor in parallel with the first capacitor and first inductor, and generating a voltage signal in series with the parallel connected passive filters such that the load terminal voltage tracks the supply voltage at multiple selected dominant harmonic frequencies simultaneously to regulate the supply current at the two dominant harmonic frequencies to approximately zero.

43. The method of claim 38 wherein the passive filter includes a power factor correction capacitor, and comprising additionally the step of generating a voltage signal in series with the passive filter such that the load terminal voltage tracks the supply voltage at multiple selected dominant harmonic frequencies simultaneously to regulate the supply current at the multiple selected dominant harmonic frequencies to approximately zero.

44. A method for providing harmonic isolation of a power supply providing a supply voltage and a supply current to a load, comprising the steps of:

(a) connecting a passive filter in parallel with the load;

(b) connecting an active filter inverter in series with the passive filter; and (c) controlling the active filter to generate a voltage signal in series with the passive filter such that a load terminal voltage tracks the supply voltage at a selected dominant harmonic frequency to regulate the supply current at the selected dominant harmonic frequency to approximately zero by transforming measured three-phase supply current signals into two-phase synchronously rotating reference frame signal values at the selected dominant harmonic frequency;

extracting a DC component corresponding to the supply current component at the selected dominant harmonic frequency from the two-phase signals;

comparing the extracted supply current component at the selected dominant harmonic frequency to supply current reference command signals to form supply current harmonic error signals;

deriving two-phase harmonic inverter voltage command signals from the supply current harmonic error signals; and transforming the two-phase harmonic inverter voltage command signals from the two-phase synchronously rotating reference frame to the three-phase reference frame to form three-phase harmonic inverter voltage command signals.

45. The method of claim 44 wherein the supply current reference command signals are equal to zero.

46. The method of claim 44 including additionally the steps of generating feedforward command signals in the two-phase synchronously rotating reference frame, and adding the feedforward command signals to the two-phase harmonic inverter voltage command signals.

47. The method of claim 46 wherein the step of generating feed forward command signals includes the steps of generating a tuning voltage command signal in the two phase synchronously rotating reference frame from measured three phase filter current signals and active impedance command signals, generating a tracking voltage command signal from measured supply voltage signals, and combining the tuning voltage command signals and tracking voltage command signals to form the feedforward command signals.

48. The method of claim 44 wherein the active filter inverter includes a DC bus, and including additionally the step of controlling the active filter inverter to generate an inverter voltage signal to achieve power balancing of the DC bus by exchanging energy at a fundamental frequency and at the selected dominant harmonic frequency.

49. The method of claim 48 wherein the step of controlling the active filter inverter includes the additional steps of:
 (a) transforming measured three phase signals corresponding to a current through the filter into two-phase synchronously rotating reference frame signal values at the fundamental frequency;
 (b) extracting a DC component corresponding to a filter current component at the fundamental frequency from the two-phase signals;
 (c) generating a DC bus voltage command signal from a difference between a DC bus voltage reference signal and a measured DC bus voltage;
 (d) combining the extracted filter current component at the fundamental frequency with the DC bus voltage command signal to form two-phase DC bus control inverter voltage command signals; and
 (e) transforming the two-phase DC bus control inverter voltage command signals from the two-phase synchronously rotating reference frame to the three-phase reference frame at the fundamental frequency to form three-phase DC bus control inverter voltage command signals.

50. The method of claim 49 including additionally the step of generating the DC bus voltage reference signal from the two-phase harmonic inverter voltage command signals.

51. The method of claim 49 including additionally the steps of:

(a) generating three-phase triangular carrier signals from the three-phase harmonic inverter voltage command signals; and
 (b) combining the three-phase DC bus control inverter voltage commands with the three-phase triangular carrier signals to form switching signal control signals for controlling the active filter inverter.

52. The method of claim 44 wherein the supply current reference command signals are selected such that the step of controlling the active filter inverter generates a voltage signal in series with the passive filter such that the supply current at the selected dominant harmonic frequency is regulated to an amount below the maximum amount of harmonic current allowed by a selected harmonic standard.

53. The method of claim 52 wherein the selected harmonic standard is IEEE-519.

54. A hybrid active/passive filter system for harmonic isolation of a power supply providing a supply voltage and a supply current to a load, comprising:
 (a) a passive filter that is mis-tuned to a frequency near a selected dominant harmonic frequency;
 (b) an active filter inverter in series with the passive filter, the series connected active and passive filters adapted to be connected at a filter terminal in parallel with the load, the active filter inverter responsive to control signals to generate an inverter voltage signal in series with the passive filter; and
 (c) an active filter harmonic controller means for generating control signals that are applied to the active filter inverter to control the active filter inverter to generate an inverter voltage signal such that a filter terminal voltage tracks the supply voltage at the selected dominant harmonic frequency to thereby effectively tune the passive filter to the selected dominant harmonic frequency.

* * * * *

UNITED STATES PATENT AND TRADEMARK OFFICE
CERTIFICATE OF CORRECTION

PATENT NO. : 5,731,965
DATED     : March 24, 1998
INVENTOR(S): Cheng, et al.

It is certified that error appears in the above-identified patent and that said Letters Patent is hereby corrected as shown below:

In column 1, after the title and before "FIELD OF THE INVENTION," please add the following paragraph:

--This invention was made with United States government support awarded by the following agencies: ONR Grant No. N00014-95-1-1128. The United States has certain rights in this invention.--

Signed and Sealed this

Ninth Day of June, 1998

Attest:

BRUCE LEHMAN

Attesting Officer

Commissioner of Patents and Trademarks